(12) United States Patent
Bober et al.

(10) Patent No.: US 12,003,122 B2
(45) Date of Patent: Jun. 4, 2024

(54) WIRELESS CHARGING NAVIGATION SYSTEM

(71) Applicant: WBTEC, LLC, Sarasota, FL (US)

(72) Inventors: Wieslaw Bober, Hopewell Junction, NY (US); Kamil Sienkiel, Wegrzce (PL); Dominik Stanislaw Sienkiel, Ostrowiec Swietokrzyski (PL)

(73) Assignee: WBTEC, LLC, Sarasota, FL (US)

( * ) Notice: Subject to any disclaimer, the term of this patent is extended or adjusted under 35 U.S.C. 154(b) by 0 days.

(21) Appl. No.: 18/342,278

(22) Filed: Jun. 27, 2023

(65) Prior Publication Data
US 2023/0344285 A1 Oct. 26, 2023

Related U.S. Application Data

(63) Continuation-in-part of application No. 17/850,445, filed on Jun. 27, 2022, now Pat. No. 11,689,068, which is a continuation-in-part of application No. 16/681,487, filed on Nov. 12, 2019, now Pat. No. 11,374,417.

(60) Provisional application No. 62/758,239, filed on Nov. 9, 2018.

(30) Foreign Application Priority Data

Jul. 16, 2021 (PL) .......................... 438515

(51) Int. Cl.
*H01M 10/44* (2006.01)
*H01M 10/46* (2006.01)
*H02J 50/10* (2016.01)
*H02J 50/80* (2016.01)
*H02J 50/90* (2016.01)

(52) U.S. Cl.
CPC .............. *H02J 50/90* (2016.02); *H02J 50/10* (2016.02); *H02J 50/80* (2016.02)

(58) Field of Classification Search
CPC ........ H02J 7/0042; H02J 50/10; H02J 50/005; H02J 50/90; H02J 50/80
USPC ................. 320/107, 108, 114, 115
See application file for complete search history.

(56) References Cited

FOREIGN PATENT DOCUMENTS

CN 103329387 A * 9/2013 .............. H02J 50/90

OTHER PUBLICATIONS

Translation of CN 103329387A (Sep. 25, 2013) (Year: 2013).*

* cited by examiner

*Primary Examiner* — Edward Tso
(74) *Attorney, Agent, or Firm* — The Farrell Law Firm, P.C.

(57) ABSTRACT

A wireless charging system is provided. The wireless charging system includes a charger panel including a usable surface and a transmitting coil, and an electronic device including a display screen, a receiving coil, and a processor. The processor is configured to execute instructions for establishing a near navigation system that cause the electronic device to determine, at least one of, a distance from the transmitting coil to the receiving coil or an angle between the transmitting coil and the receiving coil, and output a notification based on the distance from the transmitting coil to the receiving coil or the angle between the transmitting coil and the receiving coil.

18 Claims, 44 Drawing Sheets

WIRELESS CHARGING NAVIGATION SYSTEM

PRIORITY

This application is a Continuation in Part Application of U.S. application Ser. No. 17/850,445, filed in the U.S. Patent and Trademark Office on Jun. 27, 2022, which claims priority under 35 U.S.C. § 119 to Polish Patent Application No. 438,515, filed in the Polish Patent Office on Jul. 16, 2021, which is a Continuation in Part Application of U.S. application Ser. No. 16/681,487, filed in the U.S. Patent and Trademark Office on Nov. 12, 2019, which claims priority under 35 U.S.C. § 119 to Provisional Application No. 62/758,239, filed in the U.S. Patent and Trademark Office on Nov. 9, 2018, the entire content of each of which are incorporated herein by reference in their entireties.

BACKGROUND OF THE DISCLOSURE

1. Field of the Disclosure

The present disclosure relates generally to charging electronic devices.

2. Description of the Related Art

Due to the increasing use of electronic devices (i.e., mobile phones, tablets, and personal computers (PCs)), more and more charging locations are needed. Recently, many electronic devices are capable of wired or wireless charging, however, convenient charging locations may not exist.

Users of electronic devices frequently use their electronic devices while sitting on or around furniture (i.e., sofas). Thus, there is a need for charging locations to be situated on or around furniture, and not simply at a desk or table.

Therefore, there is a need to place a charger on or around a piece of furniture that can be characterized by various forms or different sizes. If the user is not interested in obtaining a piece of furniture with a charger built into it, it may be necessary to use a separate device for charging.

Further, wireless charging is increasing in popularity. Wireless charging is beneficial to users due to convenience. Users can place their electronic device in a wireless charging zone to start charging the device without plugging it, as in the case of wall chargers and other traditional charging devices. However, ordinarily a wireless charging induction coil is stationary. Therefore, wireless chargers may be limited since they require the electronic device to be placed in a specific area for charging. Frequently, the charging area is small and a user must be careful when placing the electronic device in the appropriate charging area.

In addition, traditional chargers may be plugged into wall outlets, and the charging locations are limited by the length of the charging cable extending out from the wall outlet.

Thus, there is a need to manufacture more convenient charging devices that are adaptable to various locations, and can change positions to a resting position when not in use.

SUMMARY

The present disclosure has been made to address the above-mentioned problems and disadvantages, and to provide at least the advantages described below.

According to an aspect of the disclosure, a wireless charging system is provided. The wireless charging system includes a charger panel including a usable surface and a transmitting coil, and an electronic device including a display screen, a receiving coil, and a processor. The processor is configured to execute instructions for establishing a near navigation system that cause the electronic device to determine, at least one of, a distance from the transmitting coil to the receiving coil or an angle between the transmitting coil and the receiving coil, and output a notification based on the distance from the transmitting coil to the receiving coil or the angle between the transmitting coil and the receiving coil.

According to another aspect of the disclosure, a method for operating a wireless charging navigation system is provided. The wireless charging navigation system includes a charger panel having a usable surface and a transmitting coil and an electronic device having a display screen, a receiving coil, and a processor. The method is performed by the electronic device to establish a near navigation system and includes determining at least one of a distance from the transmitting coil to the receiving coil or an angle between the transmitting coil and the receiving coil, and outputting a notification based on the determined distance from the transmitting coil to the receiving coil or the angle between the transmitting coil and the receiving coil.

According to another aspect of the disclosure, a wireless charging navigation system includes an electronic device including a display screen and a receiving coil, and a charger panel including a usable surface, a transmitting coil, and a processor. The process is configured to execute instructions for establishing a near navigation system that causes the charger panel to determine at least one of a distance from the transmitting coil to the receiving coil or an angle between the transmitting coil and the receiving, and output a notification based on the distance from the transmitting coil to the receiving coil or the angle between the transmitting coil and the receiving coil.

BRIEF DESCRIPTION OF THE DRAWINGS

Aspects, features and advantages of the present disclosure will become more apparent from the following detailed description when taken in conjunction with the accompanying drawings in which.

DETAILED DESCRIPTION

Figure 1:
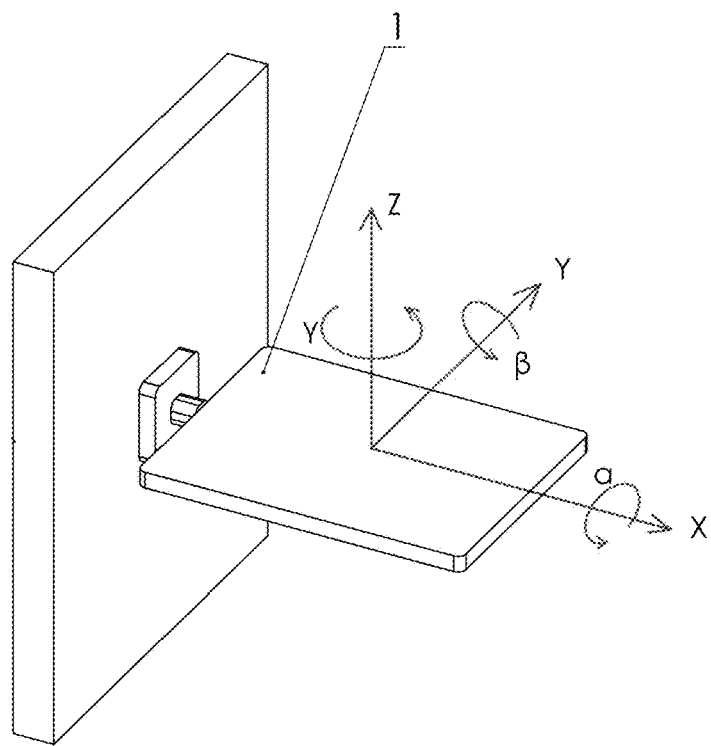
FIG. 1 shows a diagram illustrating a top perspective view of a charger shelf movable along X, Y, and Z axes, according to an embodiment of the present disclosure.

The present disclosure is directed to providing a charging device for an electronic device and is described in detail with reference to the accompanying drawings. Detailed descriptions of constructions or processes known in the art may be omitted to avoid obscuring the subject matter of the present disclosure.

The descriptions of similar elements are omitted when those elements have already been described with respect to a previous figure.

The present disclosure provides a wireless charging device that may be detachably mounted in various rooms of, for example, a house, vehicle, airplane, or boat, and/or on any piece of furniture. The wireless charging device may be an intelligent device, with automatic detection of the position of a device to be charged and movement of an inductive coil towards the device to be charged.

Further, the present disclosure provides a charger that may be mounted on a bracket-member that attaches to a wall of a room, vehicle, or a piece of furniture. The charger (also referred to as "charging module") may include at least one coil for supplying power to an electronic device, and have a designated area on a surface of the charger in which charging may occur. Additionally, the charger may be connected to a power source for charging.

Additionally, the charger may include a shelf and can be configured to move along or within at least one plane of the shelf, from a resting position to an optimal charging position. The expression "charger shelf" may refer to the charger and the shelf.

The charger can be moved along, at least, one axis from among X, Y, and/or Z axes corresponding to multiple planes. For example, the charger can be moved from a rest position to an optimal charging position. Further, the charger can rotate around each axis by an angle $\alpha$, $\beta$, or $\gamma$. Accordingly, a shelf may be equipped with an internal drive unit to move and rotate the charger and/or shelf.

The shelf may be configured to search for an electronic device to be charged that is located on a surface of the shelf. The shelf may include at least one power coil movable on the shelf plane, and provided with a locator that adjusts the position of the power coil to the position of the electronic device to be charged. For example, the power coil may be adjusted vertically (e.g., towards or away from the electronic device to be charged) or along a plane that is parallel to the surface on which the electronic device to be charged is located.

Accordingly, an induction coil may be displaced (moved) to a charging area where an induction process (e.g., wireless charging) may occur. A locator may include a base, a first motor place on the base, a base unit embedded in the base containing the wireless charging coil and a second motor.

The second motor may be configured to move the coil that is attached to a base unit (also referred to as the "coil base unit") from a first position to a second position. The first motor may be configured to move the coil base unit in a first direction, and the second motor may be configured to move the coil base unit in a second direction. The first direction may be perpendicular to the second direction.

The charger can have many variants. For example, the charger can be a shelf that is raised and lowered as a hinged pivot member mounted on a hinge handle, with the charging area located at any angle between a horizontal or vertical position. Additionally, the charger can be a shelf rotatable around a vertical axis by a desired angle, fixed on a rotary handle. Further, the charger can be a shelf rising and falling vertically along a guide holder. In addition, the charger can be a shelf simultaneously movable in three dimensions on a hinged handle. Also, the charger can be a shelf pulling out and sliding in as a drawer along parallel guides. Additionally, the charger can be a shelf fixed in a magnetic holder.

The shelf may be equipped with a clamp for mounting mobile devices.

The charger may be powered by the mains, a battery, a rechargeable battery or a solar cell.

A device to be charged may be a smartphone, smartwatch or computer. The shelf may also be a display monitor. A device to be charged may be any electronic or electrical device equipped with a power receiver cooperating with the coil to supply the device with the electric current. The shelf of the charger can also be a heating station using radiation energy for heating.

The charger can also include a ventilating, humidifying or air-conditioning device that is mountable on the shelf.

The shelf of the charger can be equipped with a perimeter illumination, downwardly directed illumination, upwardly directed illumination, downwardly and upwardly directed illumination, or sideward directionally directed illumination along a periphery, with selectable illumination modes that allow a user to control the direction of the light output. The shelf can also be equipped with a motion sensor cooperating with the illumination.

An advantage of the solution is that the charger can be mounted on any support member, in any room and in any vehicle. The angle at which the charger is mounted, or a location of the charger may be selected freely by a user. The charger may simultaneously offer many additional functions, being a universal wireless charging station for any electronic or electrical device equipped with a receiver adapted to receive wireless power in the inductive charging area.

The charger may assume a shape of a separate shelf movable along, at least, one axis and within, at least, one plane from the rest position to the charging position, and may be provided with an attachment unit to the carrier in the form of a handle to enable such a movement.

Figure 2:
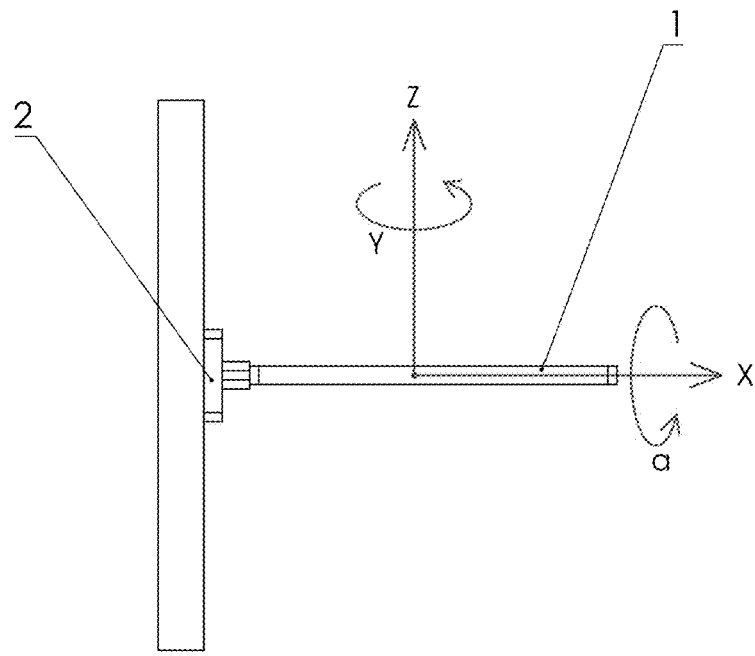
FIG. 2 shows a diagram illustrating a profile view of a charger shelf movable along X, Y, and Z axes showing angles or rotations $\alpha$, $\beta$, and $\gamma$, respectively, according to an embodiment of the present disclosure.

FIG. 1 shows a diagram illustrating a top perspective view of a charger shelf movable along X, Y, and Z axes, according to an embodiment of the present disclosure. FIG. 2 shows a diagram illustrating a profile view of a charger shelf movable along X, Y, and Z axes showing angles or rotations $\alpha$, $\beta$, and $\gamma$, respectively, according to an embodiment of the present disclosure.

Referring to FIGS. 1-2, the shelf 1 of the charger is attached to a holder 2 and can be moved along one or more of the axes X, Y, Z. Additionally, the shelf 1 can be rotated around each of the axes by an angle $\alpha$, $\beta$, $\gamma$, respectively.

Figure 3:
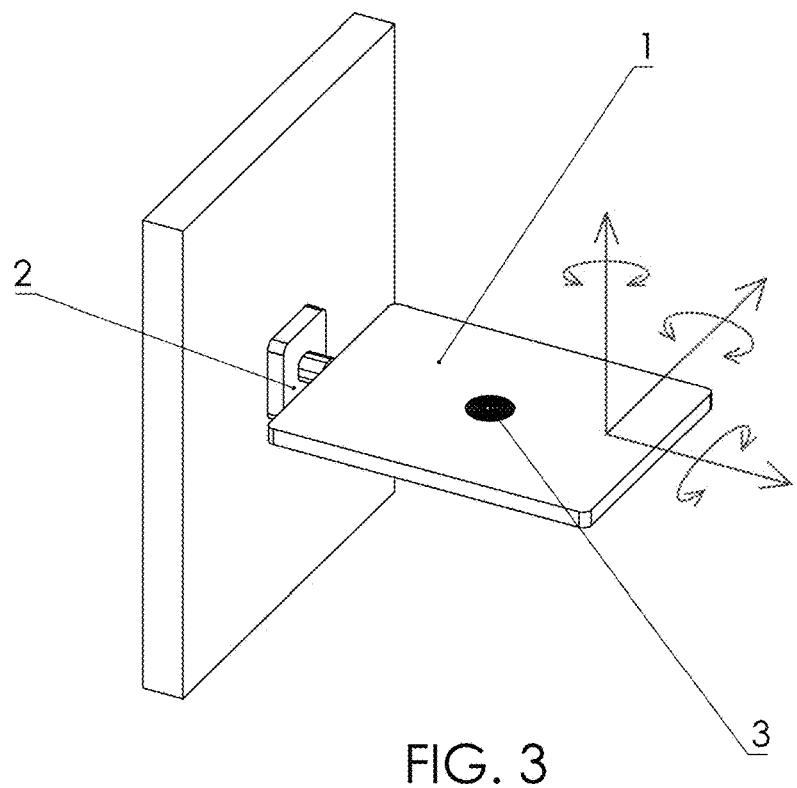
FIG. 3 shows a diagram illustrating a top perspective view of a charger shelf with a charging/energy transfer zone, according to an embodiment of the present disclosure.

FIG. 3 shows a diagram illustrating a top perspective view of a charger shelf with a charging/energy transfer zone, according to an embodiment of the present disclosure.

Referring to FIG. 3, the charger includes a shelf 1 mounted to a holder 2, enabling the charger to be displaced by bringing the charger from a rest position to a charging operating position and enabling linear and angular positioning of a charging area with respect to a mounting area of the charger. The charger may be mounted to a piece of furniture, a wall of a room, a wall of the interior of a car body, or a wall of a water vehicle or an air vehicle.

Figure 6:
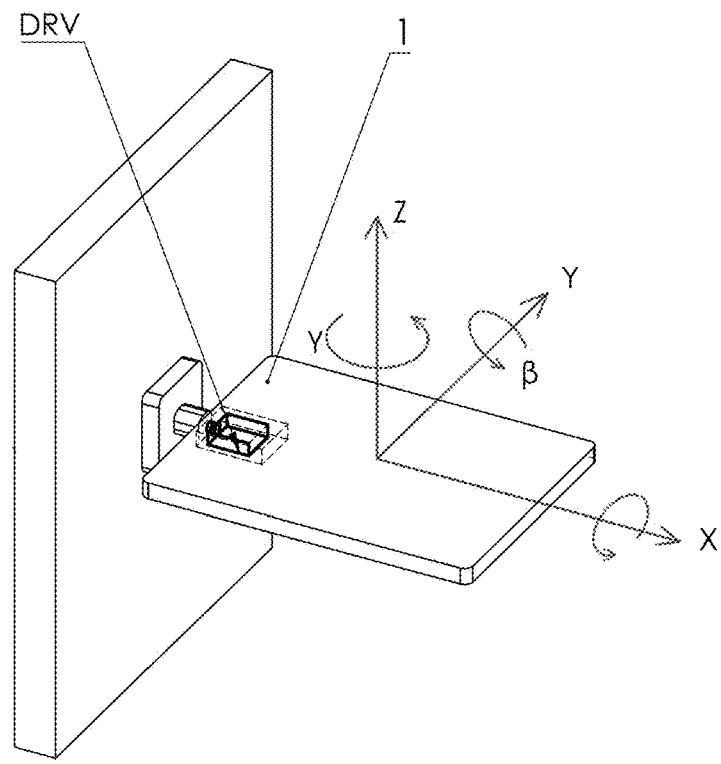
FIG. 6 shows a diagram illustrating a top perspective view of a charger shelf with an internal drive assembly, according to an embodiment of the present disclosure.

An internal drive unit DRV, shown in FIG. 6, may be used to displace or rotate the charger.

Figure 4:
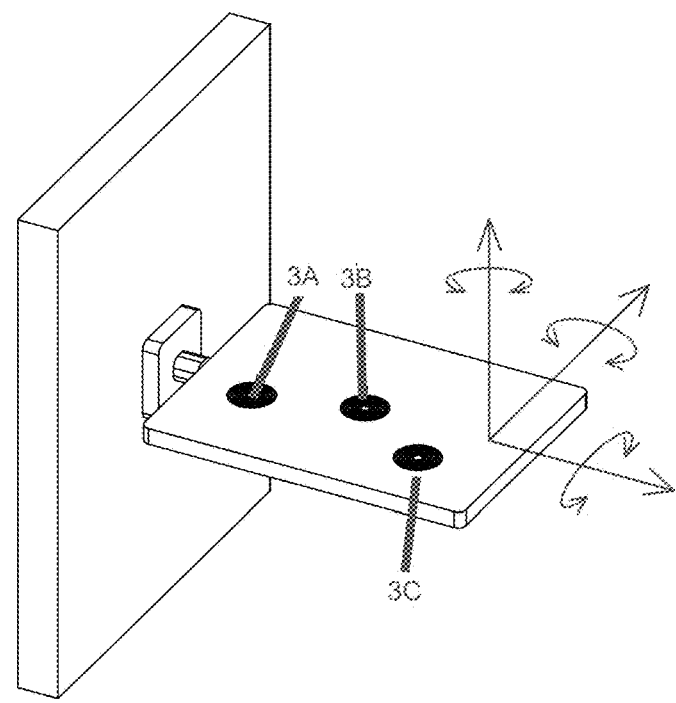
FIG. 4 shows a diagram illustrating a top perspective view of a charger shelf with multiple stationary charging/energy transfer zones, according to an embodiment of the present disclosure.

FIG. 4 shows a diagram illustrating a top perspective view of a charger shelf with multiple stationary charging/energy transfer zones, according to an embodiment of the present disclosure.

Referring to FIG. 4, several inductive coils 3A, 3B, and 3C are arranged in the shelf 1, so as to increase the area to charge electronic device by induction (the charging area).

Figure 5:
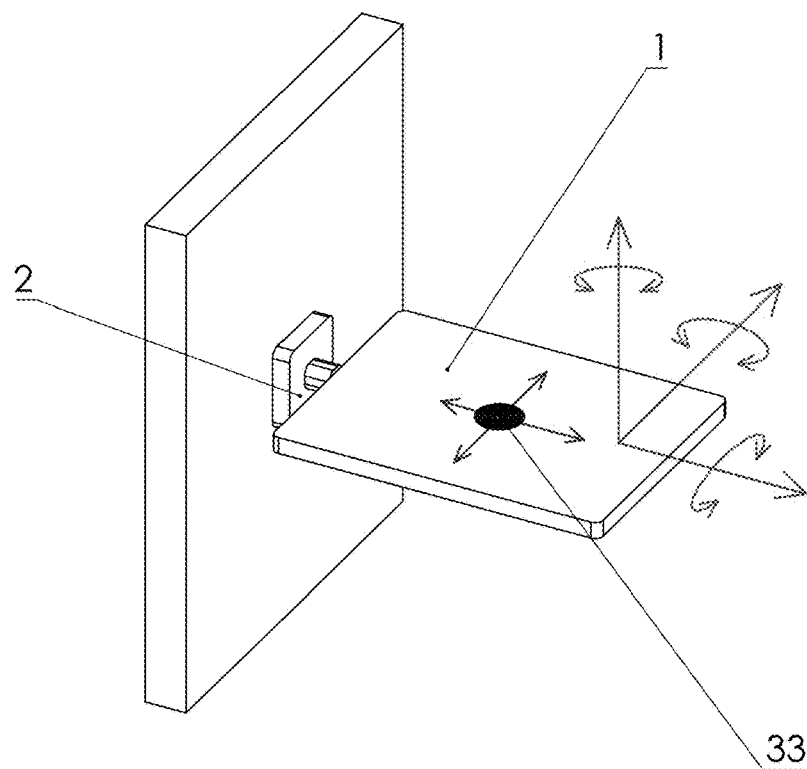
FIG. 5 shows a diagram illustrating a top perspective view of a charger shelf with a movable charging/energy transfer zone, according to an embodiment of the present disclosure.

FIG. 5 shows a diagram illustrating a top perspective view of a charger shelf with a movable charging/energy transfer zone, according to an embodiment of the present disclosure.

Referring to FIG. 5, a charger including an inductive coil 33 is located inside the shelf 1, movable along the two axes of the shelf 1. The induction coil 33 is movable, and thus may expand the charging area for charging a device. The induction coil may be positioned on a wireless base with a motor to move the wireless base and the induction coil along one or more of the axes.

FIG. 6 shows a diagram illustrating a top perspective view of a charger shelf with an internal drive assembly, according to an embodiment of the present disclosure.

Referring to FIG. 6, the shelf 1 is provided with an internal drive unit DRV. In such a case, the shelf 1 may be attached to the holder and configured to move in the direction of, at least, one axis among the X, Y, and Z axes and, at least, from a rest position (e.g., a vertical folded-down position) to an optimal charging position (e.g., a horizontal foldout-out position). In addition, the charger 1 may be rotated around the X, Y, and Z axes along angles $\alpha$, $\beta$, and $\gamma$, respectively.

Figure 7:
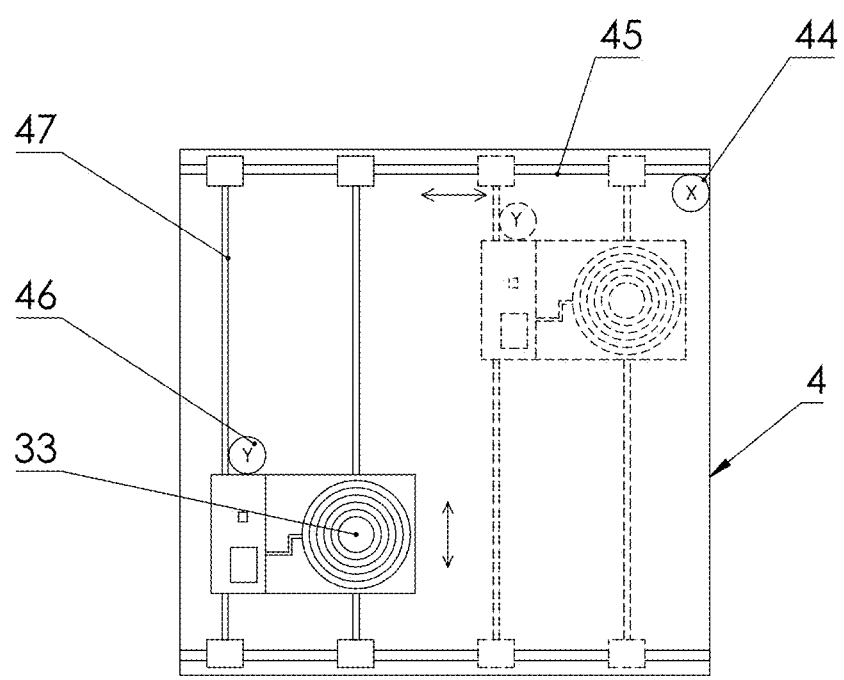
FIG. 7 shows a diagram illustrating a top view of a mobile coil module capable of locating an electronic device to be charged, according to an embodiment of the present disclosure.

FIG. 7 shows a diagram illustrating a top view of a mobile coil module capable of locating an electronic device to be charged, according to an embodiment of the present disclosure. The mobile coil module may be included in the shelf 1 to enable the charger to be move from a first position to a second position to charge a device.

Referring to FIG. 7, the base 4 may include the second motor 46 configured to move the coil base unit 33 from a first position to a second position, along a first guide 47, perpendicular to a second guide 45. The second motor 46 may be attached to the coil base unit or may be positioned somewhere else within the base 4 without being attached to the base unit of the coil 33. Additionally, the first motor 44 may be configured to move the base unit of the coil 33 in a first direction, and the second motor 46 may be configured to move the base unit of the coil 33 in a second direction, perpendicular to the first direction.

In addition, a power stage controller connected to the wireless charging coil may be configured to determine frequency characteristics of the wireless charging coil 33 and to control the power stage driver to provide a specific current to the wireless charging coil 33 based on the frequency characteristics of the coil and an input power value.

Thus, an electronic device may be intelligently searched for and located on the panel device 1 for charging. Accordingly, the induction coil 33 may be moved to redefine a charging zone (or charging area) to be within a predetermined distance of a device to be charged.

Figure 8:
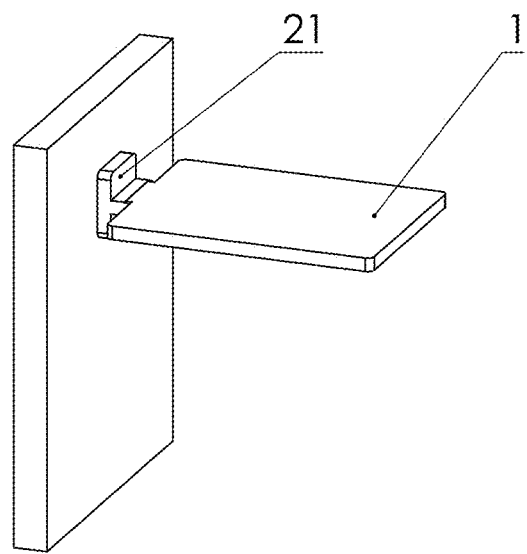
FIG. 8 shows a diagram illustrating a top perspective view of a charger shelf capable of tilting in an operating position, according to an embodiment of the present disclosure.

FIG. 8 shows a diagram illustrating a top perspective view of a charger shelf capable of tilting in an operating position, according to an embodiment of the present disclosure.

Referring to FIG. 8, a handle 21 of a shelf 1 is of a hinged form, and may include a locking device. The shelf 1 is in a horizontal position and may be locked in this position via the locking device of the handle 21.

Figure 9:
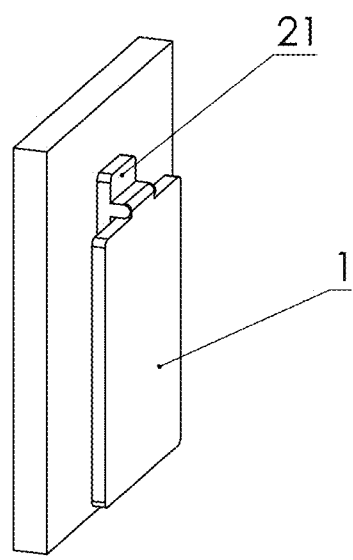
FIG. 9 shows a diagram illustrating a top perspective view of a charger shelf capable of tilting in a resting position, according to an embodiment of the present disclosure.

FIG. 9 shows a diagram illustrating a top perspective view of a charger shelf capable of tilting in a resting position, according to an embodiment of the present disclosure.

Referring to FIG. 9, the shelf 1 is in a vertical position and may be locked in this position via the locking device of the handle 21. The shelf 1 may be rotated 90 degrees from the vertical position to the horizontal position.

Figure 10:
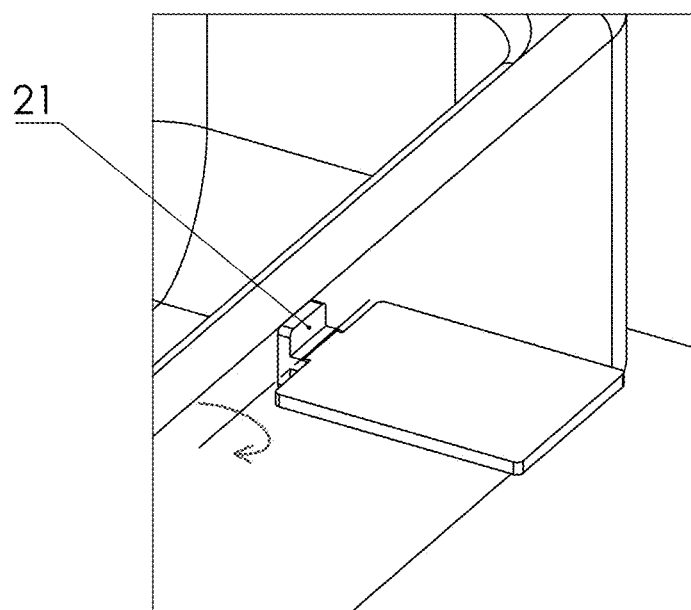
FIG. 10 shows a diagram illustrating a top perspective view of a charger shelf capable of tilting in an operating position, according to an embodiment of the present disclosure.
Figure 11:
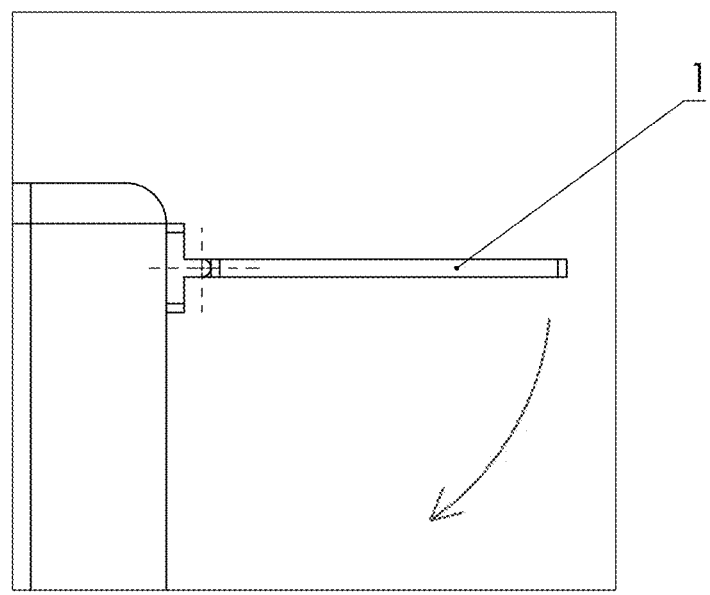
FIG. 11 shows a diagram illustrating a profile view of a charger shelf capable of tilting in an operating position, according to an embodiment of the present disclosure.

FIG. 10 shows a diagram illustrating a top perspective view of a charger shelf capable of tilting in an operating position, according to an embodiment of the present disclosure. FIG. 11 shows a diagram illustrating a profile view of a charger shelf capable of tilting in an operating position, according to an embodiment of the present disclosure.

Referring to FIGS. 10-11, the charger shelf is mounted via the handle 21 to a piece of furniture. The shelf 1 may be rotated from a horizontal position to a vertical position.

Figure 12:
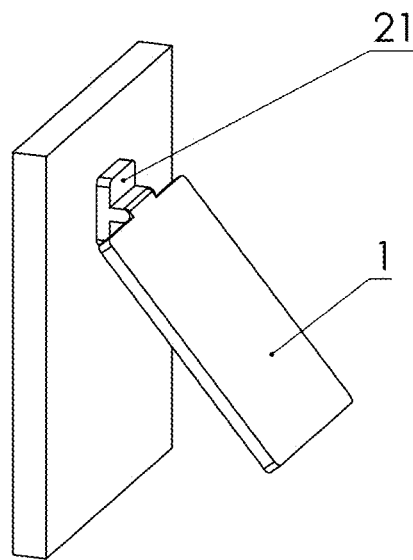
FIG. 12 shows a diagram illustrating a top perspective view of a charger shelf capable of tilting in an angled tilted position, according to an embodiment of the present disclosure.
Figure 13:
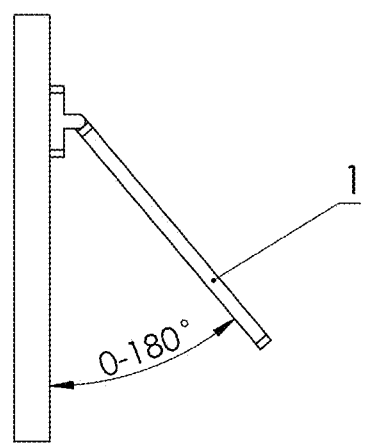
FIG. 13 shows a diagram illustrating a profile view of a charger shelf capable of tilting in an angled tilted position, according to an embodiment of the present disclosure.

FIG. 12 shows a diagram illustrating a top perspective view of a charger shelf capable of tilting in an angled tilted position, according to an embodiment of the present disclosure. FIG. 13 shows a diagram illustrating a profile view of a charger shelf capable of tilting in an angled tilted position, according to an embodiment of the present disclosure.

Referring to FIGS. 12-13, the shelf 1 is shown in a tilted position. The shelf 1 may be moved to any position within a range of 0 degrees to 180 degrees. The shelf may be locked using the locking device of the handle 21 at any position within the range.

Figure 14:
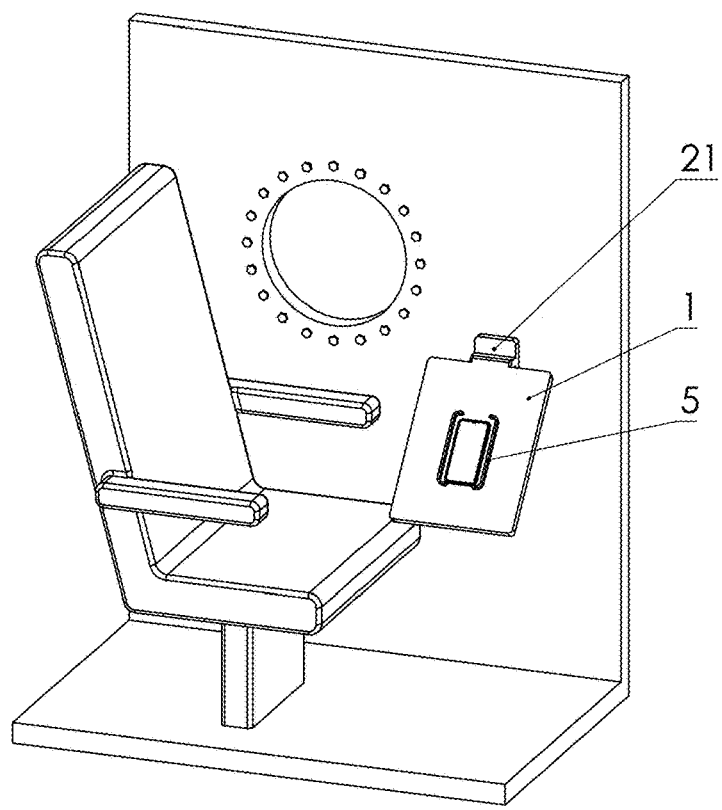
FIG. 14 shows a diagram illustrating a top perspective view of a charger shelf capable of tilting in an angled tilted position located next to a seat, according to an embodiment of the present disclosure.
Figure 15:
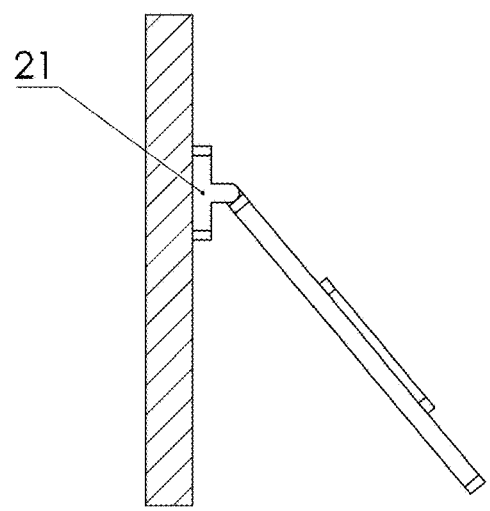
FIG. 15 shows a diagram illustrating a profile view of a charger shelf capable of tilting in an angled tilted position, according to an embodiment of the present disclosure.

FIG. 14 shows a diagram illustrating a top perspective view of a charger shelf capable of tilting in an angled tilted position located next to a seat, according to an embodiment of the present disclosure. FIG. 15 shows a diagram illustrating a profile view of a charger shelf capable of tilting in an angled tilted position, according to an embodiment of the present disclosure.

Referring to FIGS. 14-15, the shelf 1 is mounted to a wall next to a seat. The shelf 1 is in a tilted angular position. The shelf 1 includes a clamp 5 for holding an electronic device to be charged. The clamp 5 is particularly useful when the shelf 1 is in the tilted angular position, because it allows the electronic device to be held in a position for charging.

Figure 16:
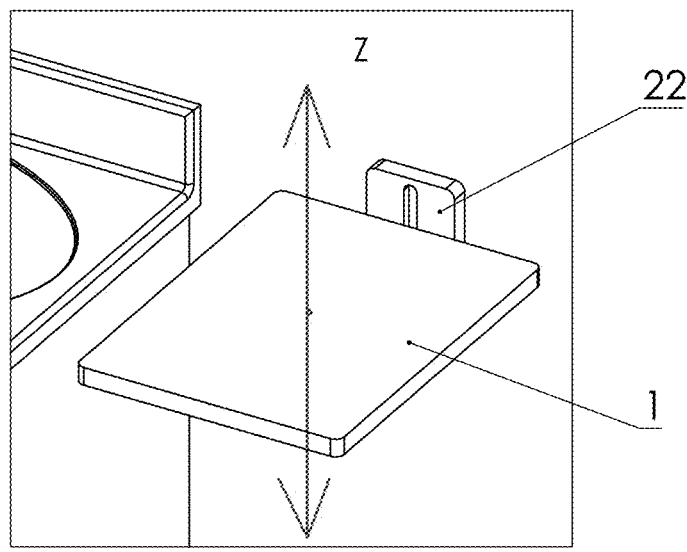
FIG. 16 shows a diagram illustrating a top perspective view of a charger shelf capable of moving vertically along a z axis, according to an embodiment of the present disclosure.
Figure 17:
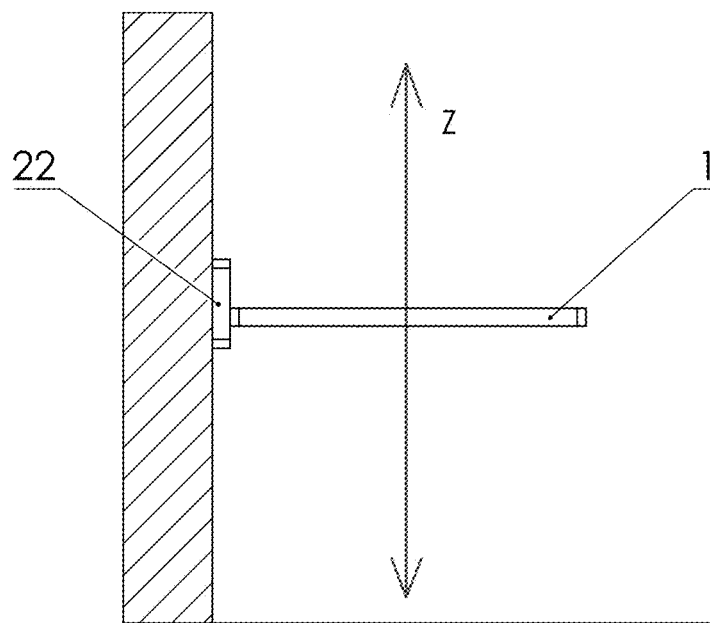
FIG. 17 shows a profile view of a charger shelf capable of moving vertically along a z axis, according to an embodiment of the present disclosure.

FIG. 16 shows a diagram illustrating a top perspective view of a charger shelf capable of moving vertically along a z axis, according to an embodiment of the present disclosure. FIG. 17 shows a profile view of a charger shelf capable of moving vertically along a z axis, according to an embodiment of the present disclosure.

Referring to FIGS. 16-17, the shelf 1 is movable along a vertical axis Z to adjust a height of the shelf 1. The handle 22 may include a vertical guide with a locking device. The locking device may lock the shelf 1 at a particular height along the vertical axis Z.

Figure 18:
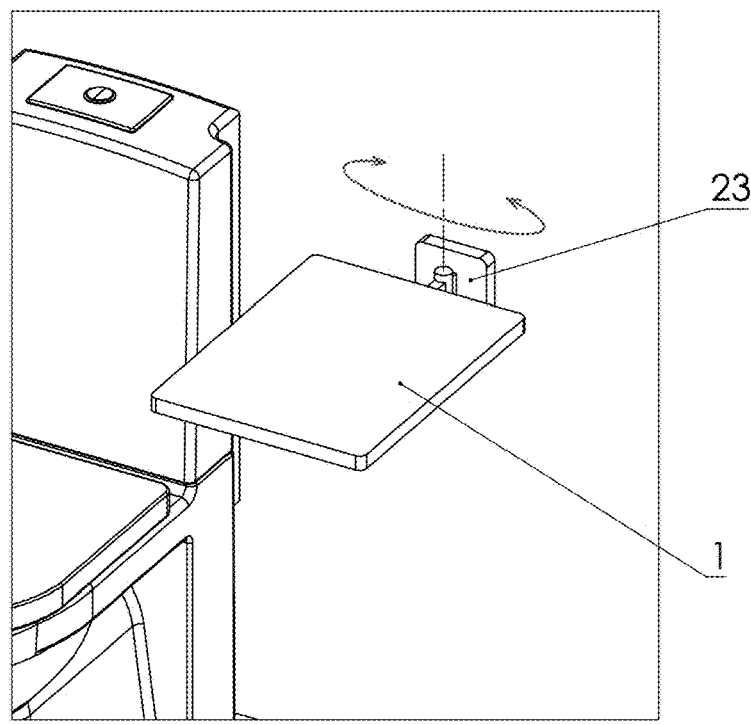
FIG. 18 shows a diagram illustrating a top perspective view of a charger shelf capable of rotating around a vertical axis, according to an embodiment of the present disclosure.
Figure 19:
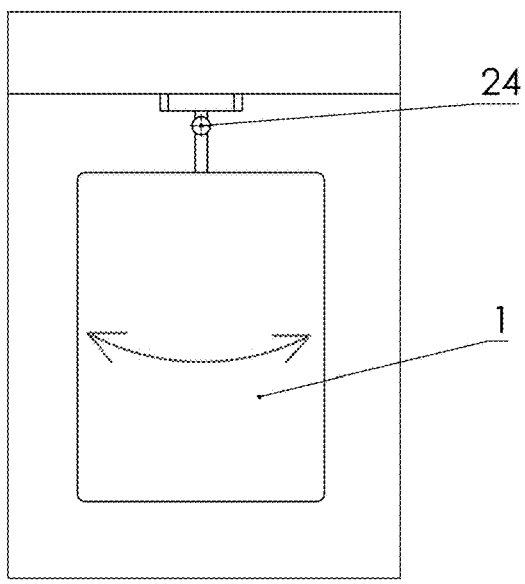
FIG. 19 shows a bird eye view of a charger shelf capable of rotating around a vertical axis, according to an embodiment of the present disclosure.

FIG. 18 shows a diagram illustrating a top perspective view of a charger shelf capable of rotating around a vertical axis, according to an embodiment of the present disclosure. FIG. 19 shows a bird eye view of a charger shelf capable of rotating around a vertical axis, according to an embodiment of the present disclosure.

Referring to FIGS. 18-19, the shelf 1 is rotatable around a vertical axis. A handle 23 includes a pin 24 for enabling the shelf 1 to rotate around the vertical axis.

Figure 20:
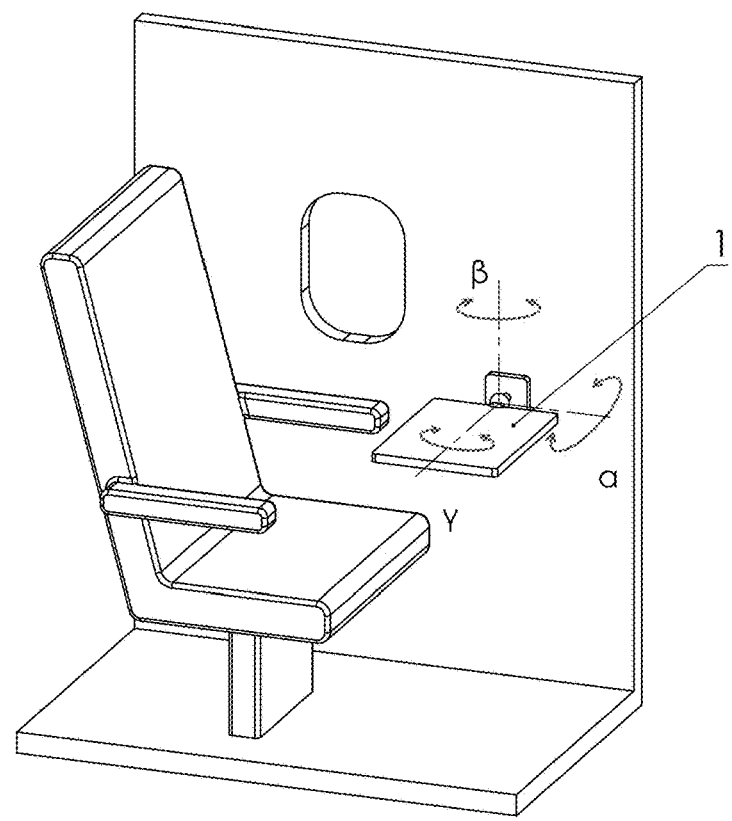
FIG. 20 shows a diagram illustrating a top perspective view of a charger shelf capable of rotating along 3 axes and positioned next to a seat, according to an embodiment of the present disclosure.
Figure 21:
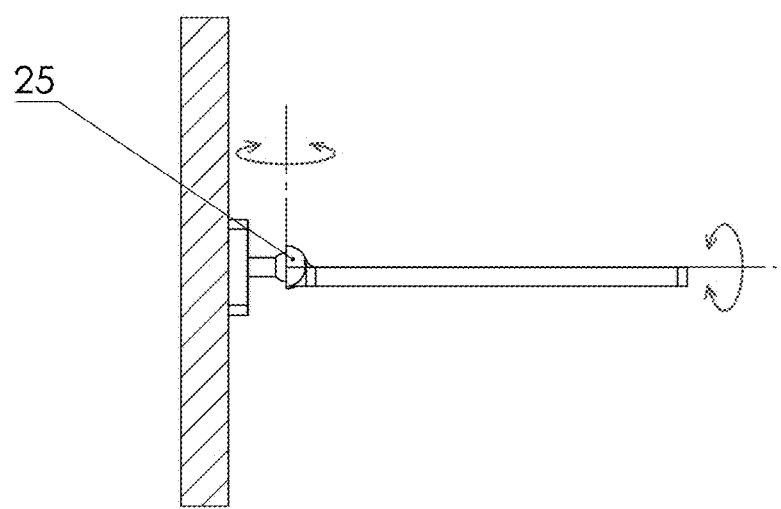
FIG. 21 shows a diagram illustrating a profile view of a charger shelf capable of rotating along a vertical axis and a horizontal axis, according to an embodiment of the present disclosure.

FIG. 20 shows a diagram illustrating a top perspective view of a charger shelf capable of rotating along 3 axes and positioned next to a seat, according to an embodiment of the present disclosure. FIG. 21 shows a diagram illustrating a profile view of a charger shelf capable of rotating along a vertical axis and a horizontal axis, according to an embodiment of the present disclosure.

Referring to FIGS. 20-21, the shelf 1 is rotatable around three axis at angles $\alpha$, $\beta$, and $\gamma$. The handle may include a physical joint 25 (articulating handle) for enabling the shelf 1 to rotate around the three axis at angles $\alpha$, $\beta$, and $\gamma$.

Figure 22:
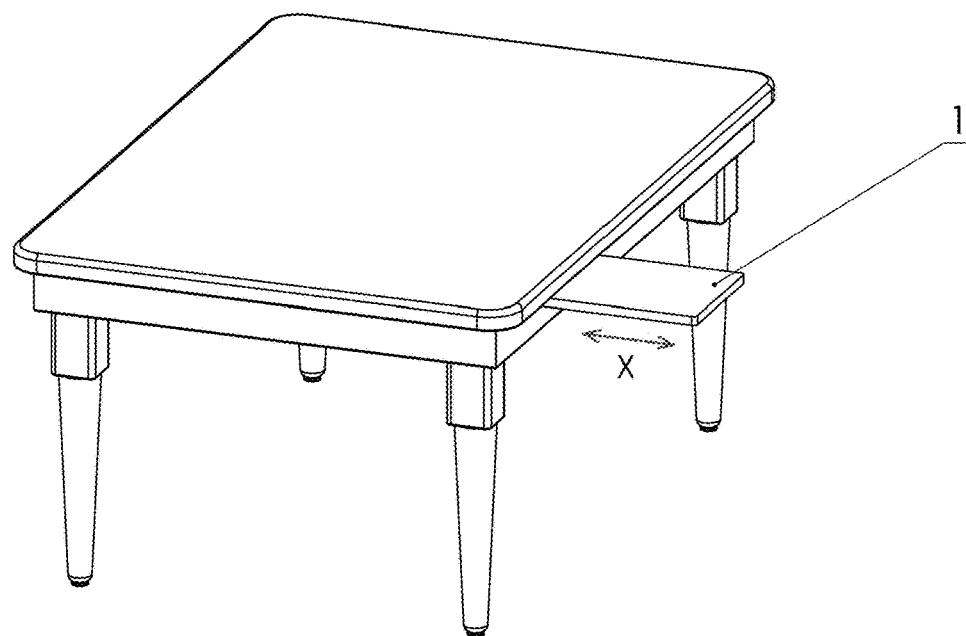
FIG. 22 shows a diagram illustrating a top perspective view of a charger shelf capable of sliding along an x axis, according to an embodiment of the present disclosure.
Figure 23:
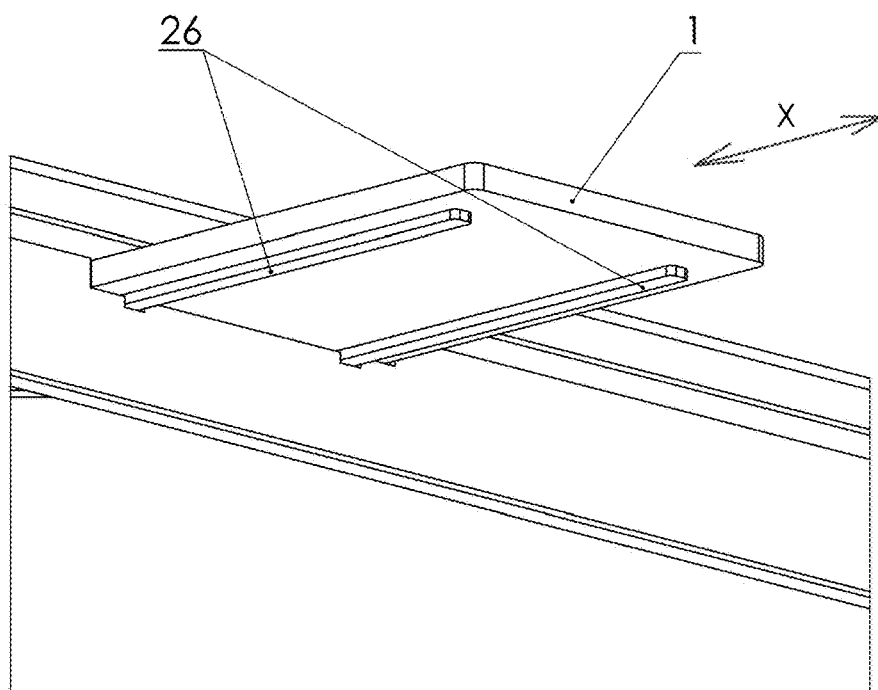
FIG. 23 shows a diagram illustrating a bottom perspective view of a charger shelf capable of sliding along an x axis, according to an embodiment of the present disclosure.

FIG. 22 shows a diagram illustrating a top perspective view of a charger shelf capable of sliding along an x axis, according to an embodiment of the present disclosure. FIG. 23 shows a diagram illustrating a bottom perspective view of a charger shelf capable of sliding along an x axis, according to an embodiment of the present disclosure.

Referring to FIGS. 22-23, the shelf 1 may be extended outwardly from a piece of furniture, a wall, or another object. The shelf 1 may act as a drawer and be movable into and out from the piece of furniture along an X axis. The bottom side of the shelf 1 includes guides 26 for allowing the shelf to extend outwardly or inwardly along a predefined path.

Figure 24:
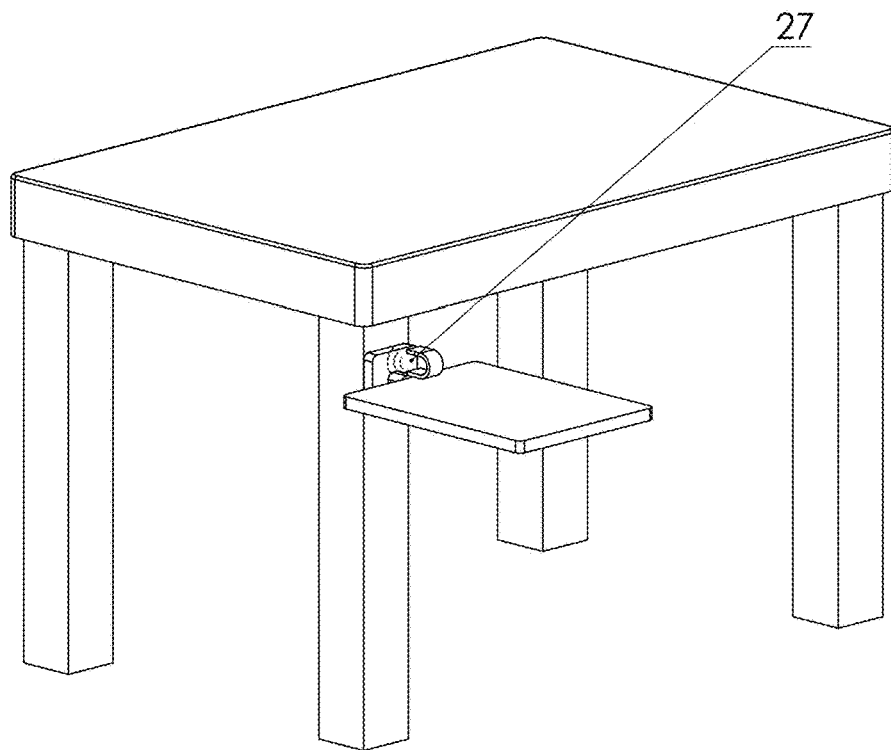
FIG. 24 shows a diagram illustrating a top perspective view of a charger shelf mounted with a magnetic holder, according to an embodiment of the present disclosure.
Figure 25:
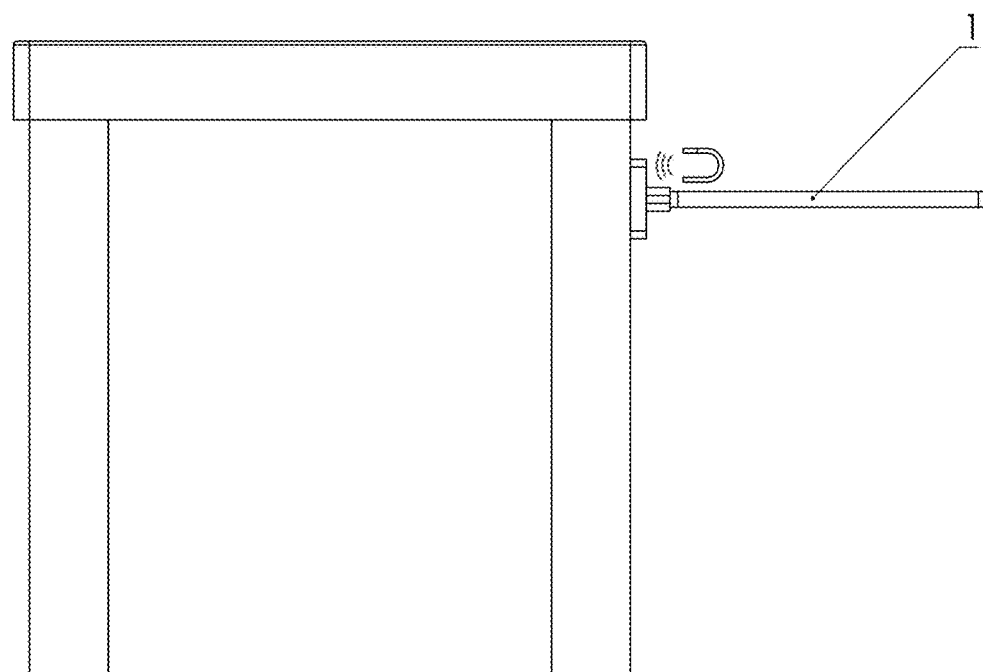
FIG. 25 shows a diagram illustrating a profile view of a charger shelf mounted with a magnetic holder, according to an embodiment of the present disclosure.

FIG. 24 shows a diagram illustrating a top perspective view of a charger shelf mounted with a magnetic holder, according to an embodiment of the present disclosure. FIG. 25 shows a diagram illustrating a profile view of a charger shelf mounted with a magnetic holder, according to an embodiment of the present disclosure.

Referring to FIGS. 24-25, the charger shelf is fastened to the furniture using a magnetic holder 27. The charger shelf can be mounted to a door frame, a desk leg, a chair leg, or a room structural element.

Figure 26:
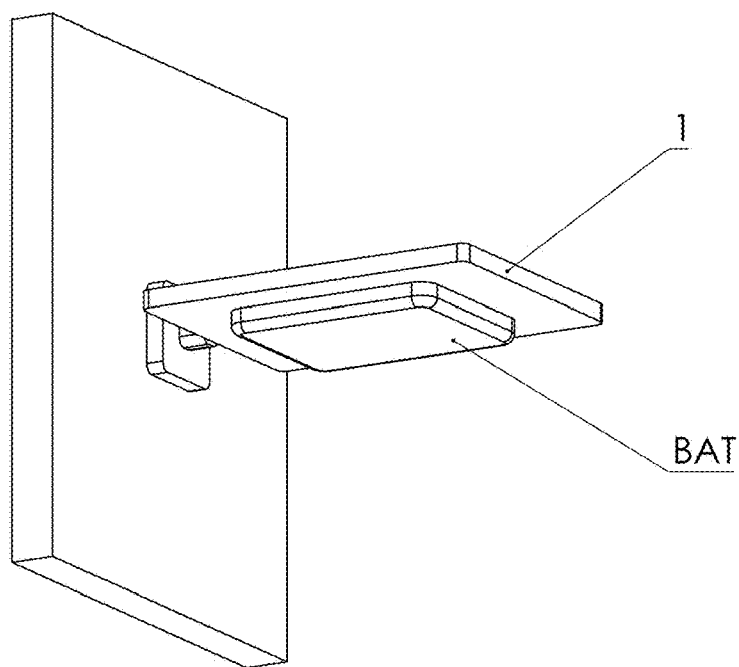
FIG. 26 shows a diagram illustrating a bottom perspective view of a charger shelf with a battery, according to an embodiment of the present disclosure.

FIG. 26 shows a diagram illustrating a bottom perspective view of a charger shelf with a battery, according to an embodiment of the present disclosure.

Referring to FIG. 26, the shelf 1 is equipped with its own power source in the form of a shelf-mounted battery BAT that may provide power to an induction coil for charging a device.

Figure 27:
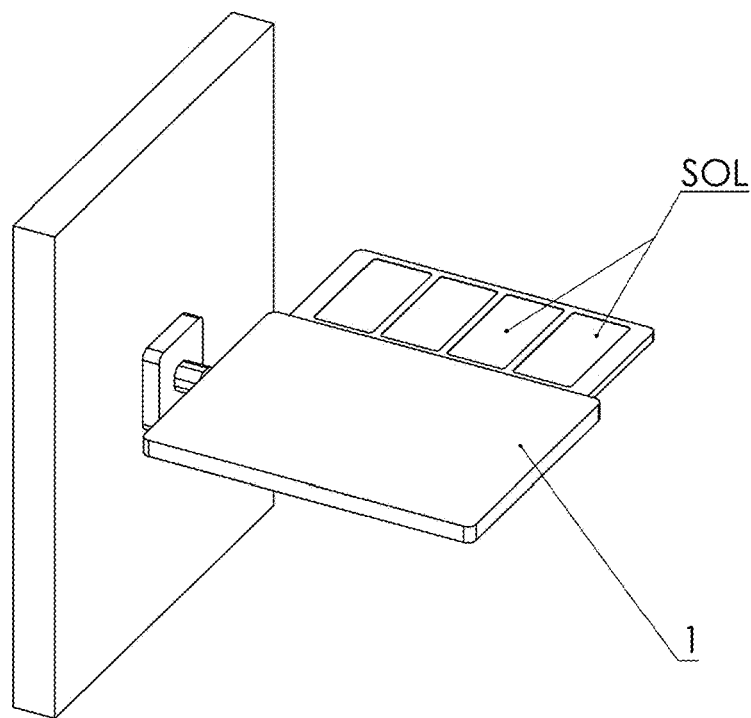
FIG. 27 shows a diagram illustrating a top perspective view of a charger shelf with photo-voltaic solar cells, according to an embodiment of the present disclosure.

FIG. 27 shows a diagram illustrating a top perspective view of a charger shelf with photo-voltaic solar cells, according to an embodiment of the present disclosure.

Referring to FIG. 27, the shelf 1 is equipped with at least one photo-voltaic cell SOL that may provide power to the coils and/or the battery BAT.

Figure 28:
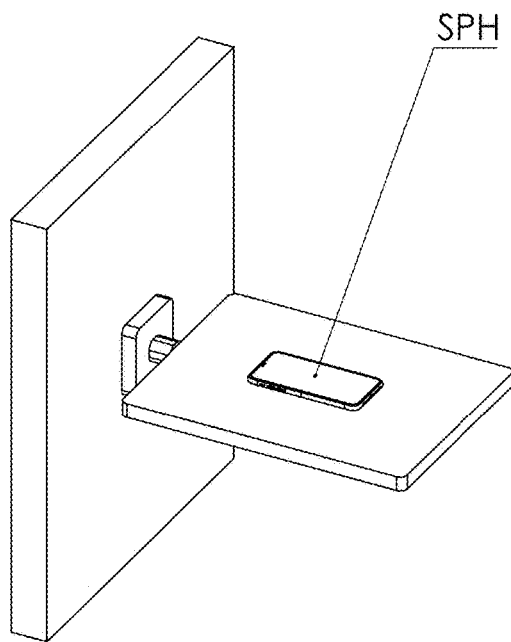
FIG. 28 shows a diagram illustrating a top perspective view of a charger shelf charging a smartphone, according to an embodiment of the present disclosure.

FIG. 28 shows a diagram illustrating a top perspective view of a charger shelf charging a smartphone, according to an embodiment of the present disclosure.

Referring to FIG. 28, the shelf 1 may wirelessly charge a smartphone SPH placed on a top surface of the shelf 1.

Figure 29:
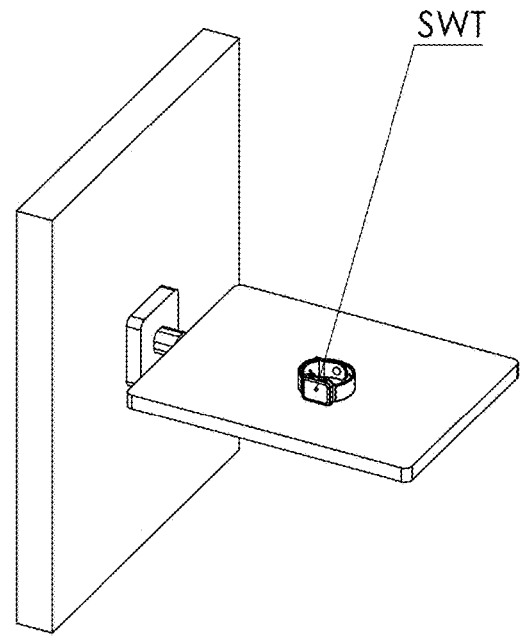
FIG. 29 shows a diagram illustrating a top perspective view of a charger shelf charging a smartwatch, according to an embodiment of the present disclosure.

FIG. 29 shows a diagram illustrating a top perspective view of a charger shelf charging a smartwatch, according to an embodiment of the present disclosure.

Referring to FIG. 29, the shelf 1 may wirelessly charge a smartwatch SWT placed on a top surface of the shelf 1.

Figure 30:
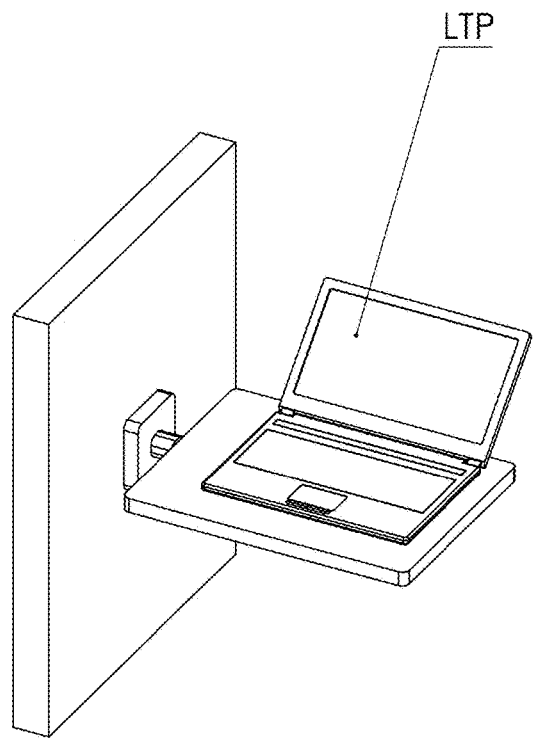
FIG. 30 shows a diagram illustrating a top perspective view of a charger shelf charging a laptop computer, according to an embodiment of the present disclosure.

FIG. 30 shows a diagram illustrating a top perspective view of a charger shelf charging a laptop computer, according to an embodiment of the present disclosure.

Referring to FIG. 30, the shelf 1 may wirelessly charge a laptop LTP placed on a top surface of the shelf 1.

Figure 31:
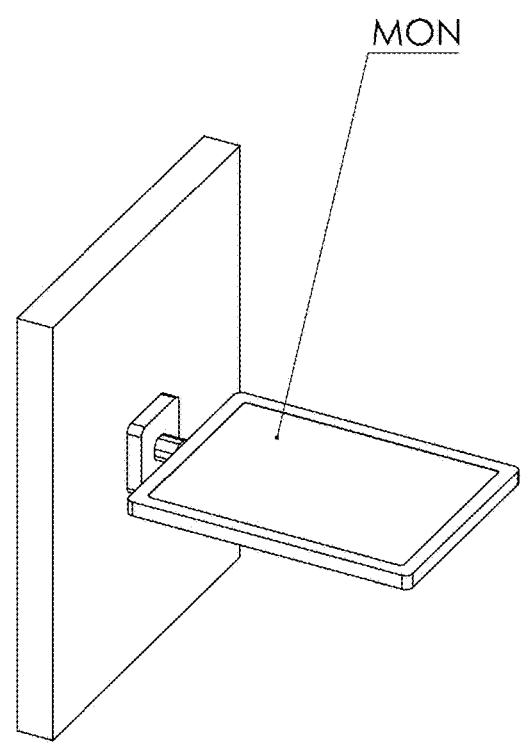
FIG. 31 shows a diagram illustrating a top perspective view of a charger shelf with a display monitor, according to an embodiment of the present disclosure.

FIG. 31 shows a diagram illustrating a top perspective view of a charger shelf with a display monitor, according to an embodiment of the present disclosure.

Referring to FIG. 31, the shelf 1 may include a monitor MON on a top surface of the shelf 1. Alternatively, the monitor MON can be built into other surfaces of the shelf 1. In addition, the shelf 1 may include a built-in modem, which when used with the monitor MON, may display media obtained over the Internet.

Figure 32:
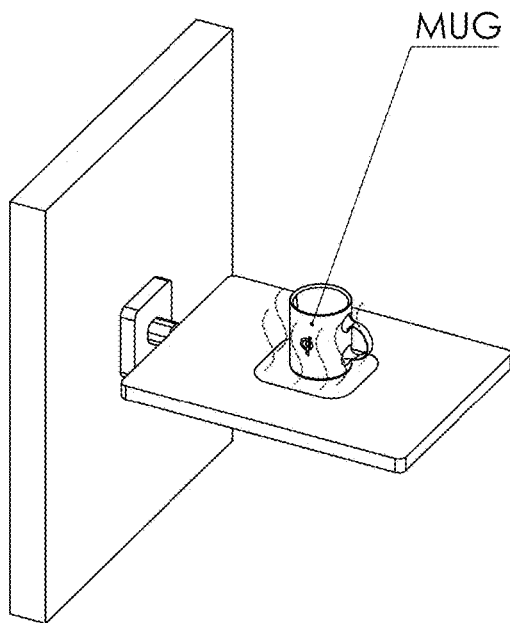
FIG. 32 shows a diagram illustrating a top perspective view of a charger shelf powering a heating device, according to an embodiment of the present disclosure.

FIG. 32 shows a diagram illustrating a top perspective view of a charger shelf powering a heating device, according to an embodiment of the present disclosure.

Referring to FIG. 32, the shelf 1 may wirelessly provide power to a heating station to heat a mug that is placed on a top surface of the shelf 1.

Figure 33:
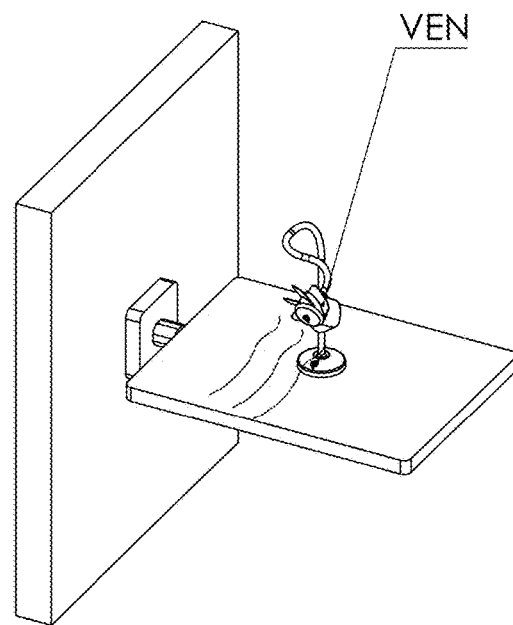
FIG. 33 shows a diagram illustrating a top perspective view of a charger shelf powering an air conditioning device, according to an embodiment of the present disclosure.

FIG. 33 shows a diagram illustrating a top perspective view of a charger shelf powering an air conditioning device, according to an embodiment of the present disclosure.

Referring to FIG. 33, the shelf 1 may wirelessly provide power to an air conditioning device VEN that is placed on a top surface of the shelf 1.

Figure 34:
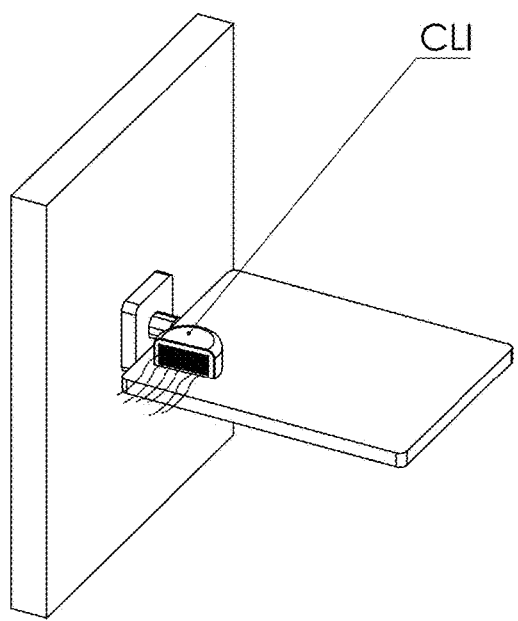
FIG. 34 shows a diagram illustrating a top perspective view of a charger shelf charging a climate control device, according to an embodiment of the present disclosure.

FIG. 34 shows a diagram illustrating a top perspective view of a charger shelf charging a climate control device, according to an embodiment of the present disclosure.

Referring to FIG. 34, the shelf 1 may wirelessly provide power to a climate control device CLI that is placed on a top surface of the shelf 1. The climate control device CLI may provide hot or cold air, may filter air, or may humidify air.

Figure 35:
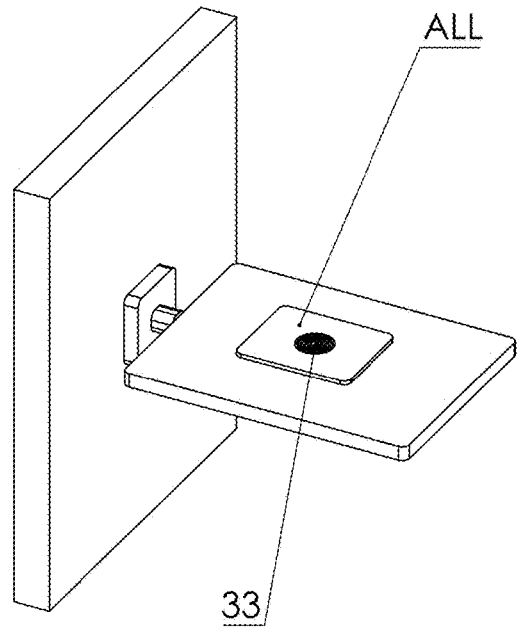
FIG. 35 shows a diagram illustrating a top perspective view of a charger shelf charging an inductively powered appliance, according to an embodiment of the present disclosure.

FIG. 35 shows a diagram illustrating a top perspective view of a charger shelf charging an inductively powered appliance, according to an embodiment of the present disclosure.

Referring to FIG. 35, the inductively powered appliance ALL may be placed on or around a charging coil 33 located within the shelf 1. Once in place, the inductively powered appliance ALL may receive power. The inductively powered appliance may be any appliance capable of receiving power from the shelf 1.

Figure 36:
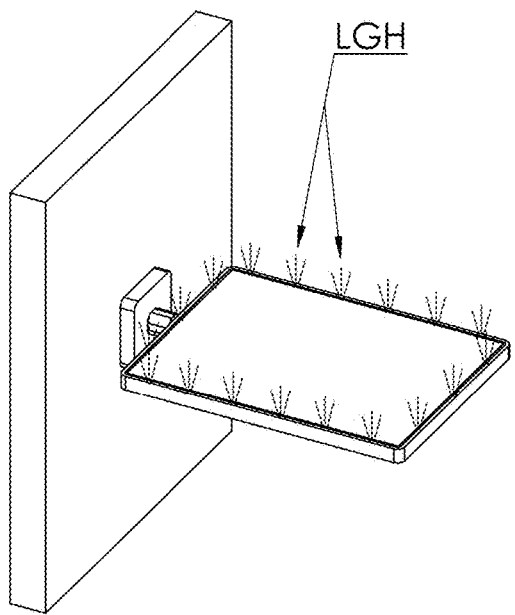
FIG. 36 shows a diagram illustrating a top perspective view of a charger shelf including perimeter illumination, according to an embodiment of the present disclosure.

FIG. 36 shows a diagram illustrating a top perspective view of a charger shelf including perimeter illumination, according to an embodiment of the present disclosure.

Referring to FIG. 36, the shelf 1 includes a perimeter backlight LGH along edges of the shelf 1 that upwardly projects light.

Figure 37:
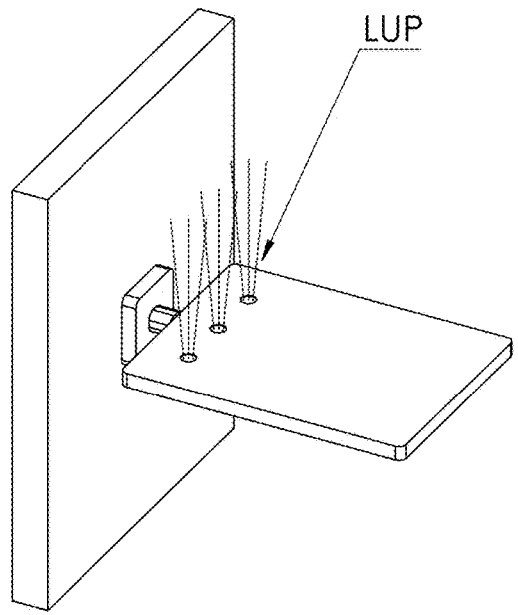
FIG. 37 shows a diagram illustrating a top perspective view of a charger shelf including illumination directed in an upward direction, according to an embodiment of the present disclosure.

FIG. 37 shows a diagram illustrating a top perspective view of a charger shelf including illumination directed in an upward direction, according to an embodiment of the present disclosure.

Referring to FIG. 37, the shelf 1 includes a backlight LUP positioned on one side of the top surface of the shelf 1 that upwardly projects light.

Figure 38:
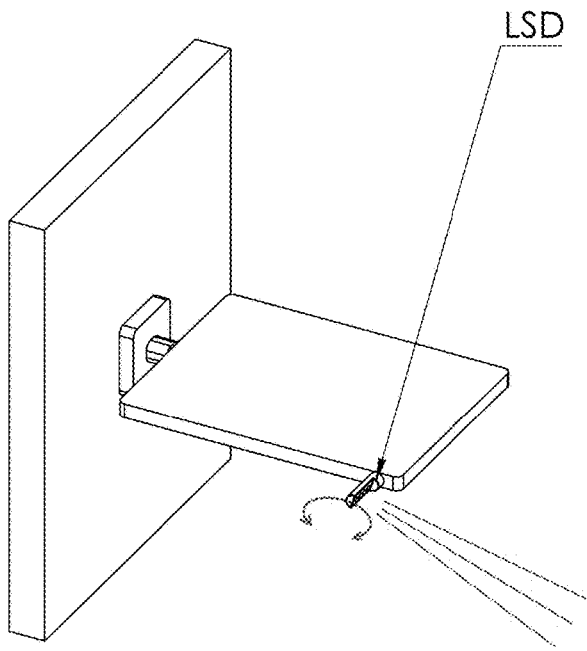
FIG. 38 shows a diagram illustrating a top perspective view of a charger shelf including illumination outwardly rotatable from a side of the panel device, according to an embodiment of the present disclosure.

FIG. 38 shows a diagram illustrating a top perspective view of a charger shelf including illumination outwardly rotatable from a side of the panel device, according to an embodiment of the present disclosure.

Referring to FIG. 38, the shelf 1 includes a backlight LSD extending from a side of the shelf 1 and is rotatable with respect to a surface of the shelf 1.

Figure 39:
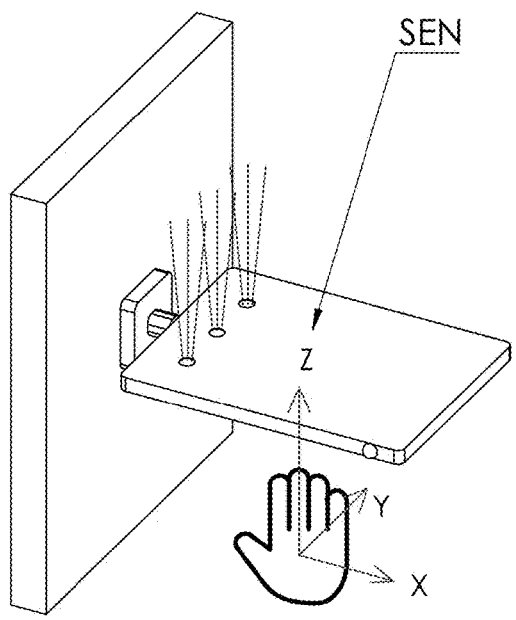
FIG. 39 shows a diagram illustrating a top perspective view of a charger shelf including multiple illumination modes with a motion detector, according to an embodiment of the present disclosure.

FIG. 39 shows a diagram illustrating a top perspective view of a charger shelf including multiple illumination modes with a motion detector, according to an embodiment of the present disclosure.

Referring to FIG. 39, the shelf 1 is equipped with a motion sensor SEN capable of being used to activate an illumination state of the shelf 1. For example, an illumination mode of the panel device may be in an inactive state (e.g., a sleep state), but may be switched to an active state when motion is detected.

Figure 40:
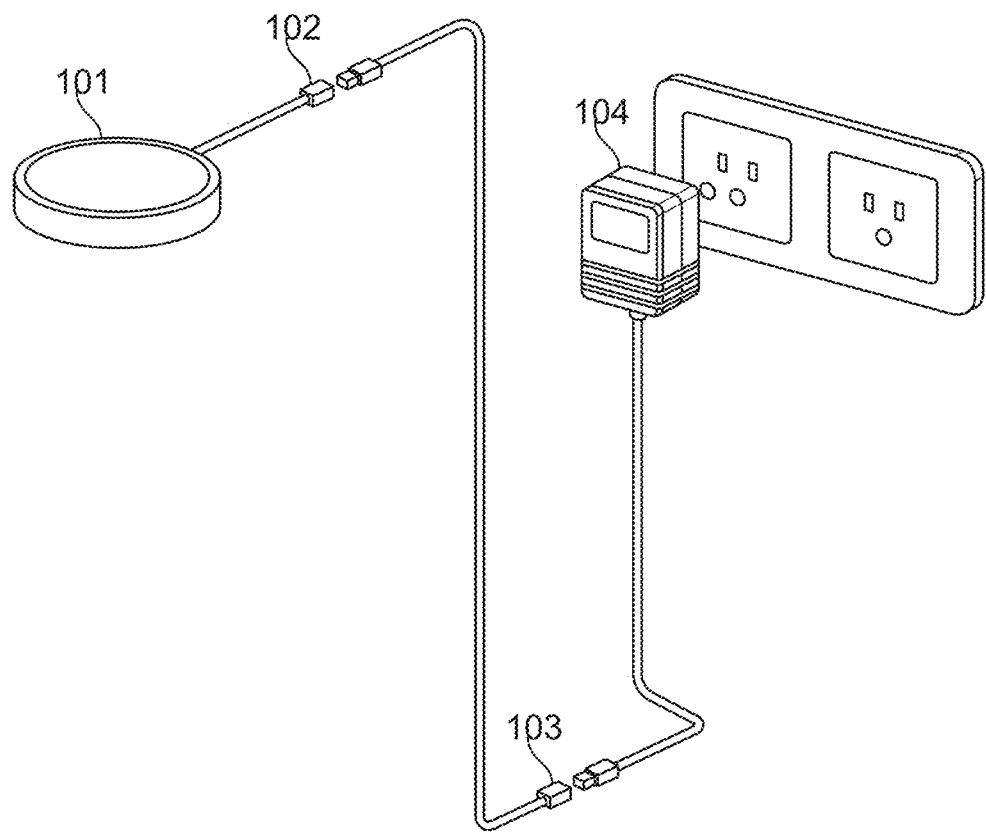
FIG. 40 shows a diagram illustrating a configuration of a wireless charger, according to an embodiment of the present disclosure.

FIG. 40 is a diagram illustrating a configuration of a wireless charger, according to an embodiment of the present disclosure.

The wireless charger of FIG. 40 includes a charging pad 101. The charging pad 101 may include a coil capable of producing an electromagnetic field that extends outward from the charging pad 101. The coil may be embedded inside the charging pad 101 so that an electronic device can be placed in an electromagnetic field by being placed on top of or near a surface of the charging pad 101. The charging pad 101 may be attached to a first cable (i.e., wire) which connects to a first electrical connector 102.

The first electrical connector 102 is connected to a second cable which is connected to a second electrical connector 103. The second electrical connector 103 is connected to a third cable which connects to the wall power supply 104. The first electrical connector 102 and the second electrical connector 103 are detachable such that each may be used to connect or disconnect the charging pad 101 from the wall power supply 104.

The wall power supply 104 may connect to a standard United States power supply of 120 volts (V) at 60 hertz (Hz), or may be connected to other power supply voltages and/or frequencies (i.e., alternating current and/or direct current power).

The first electrical connector 102 and the second electrical connector 103 are detachable, therefore the charging pad 101 may be detached from the second cable, the third cable, and the wall power supply 104. Likewise, the wall power supply 104 may be detached from the second cable, the first cable, and the wireless charger.

An electrical connector may be any device capable of forming an electrical connection among two or more electronic circuits. That is, when an electrical connector is in a disconnected state, the two or more electronic circuits may not be electronically coupled to each other. When an electrical connector is in a connected state, the two or more electronic circuits may be electronically coupled to each other.

Figure 41:
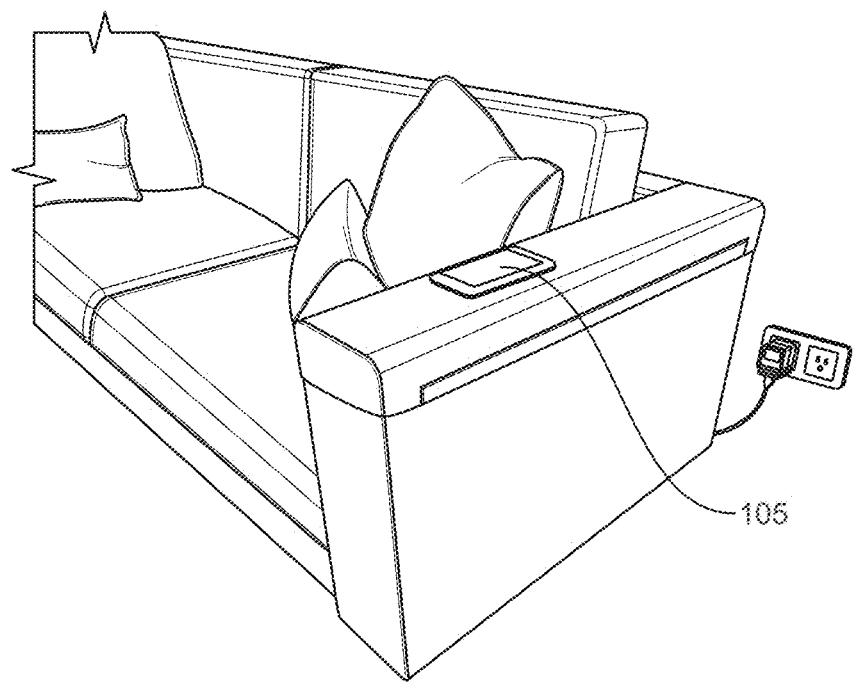
FIG. 41 shows a diagram illustrating a sofa armrest with a wireless charger embedded therein, according to an embodiment of the present disclosure.

FIG. 41 shows a diagram illustrating a sofa armrest with a wireless charger embedded therein, according to an embodiment of the present disclosure.

Referring to FIG. 41, the wireless charger is embedded into the armrest of the sofa such that an electronic device 105 may be wirelessly charged by being placed on top of the armrest near the embedded wireless charger.

By embedding the wireless charger inside of the armrest of the sofa, many of the wires of the wireless charger are hidden from view such that the charging configuration is aesthetically pleasing.

Figure 42:
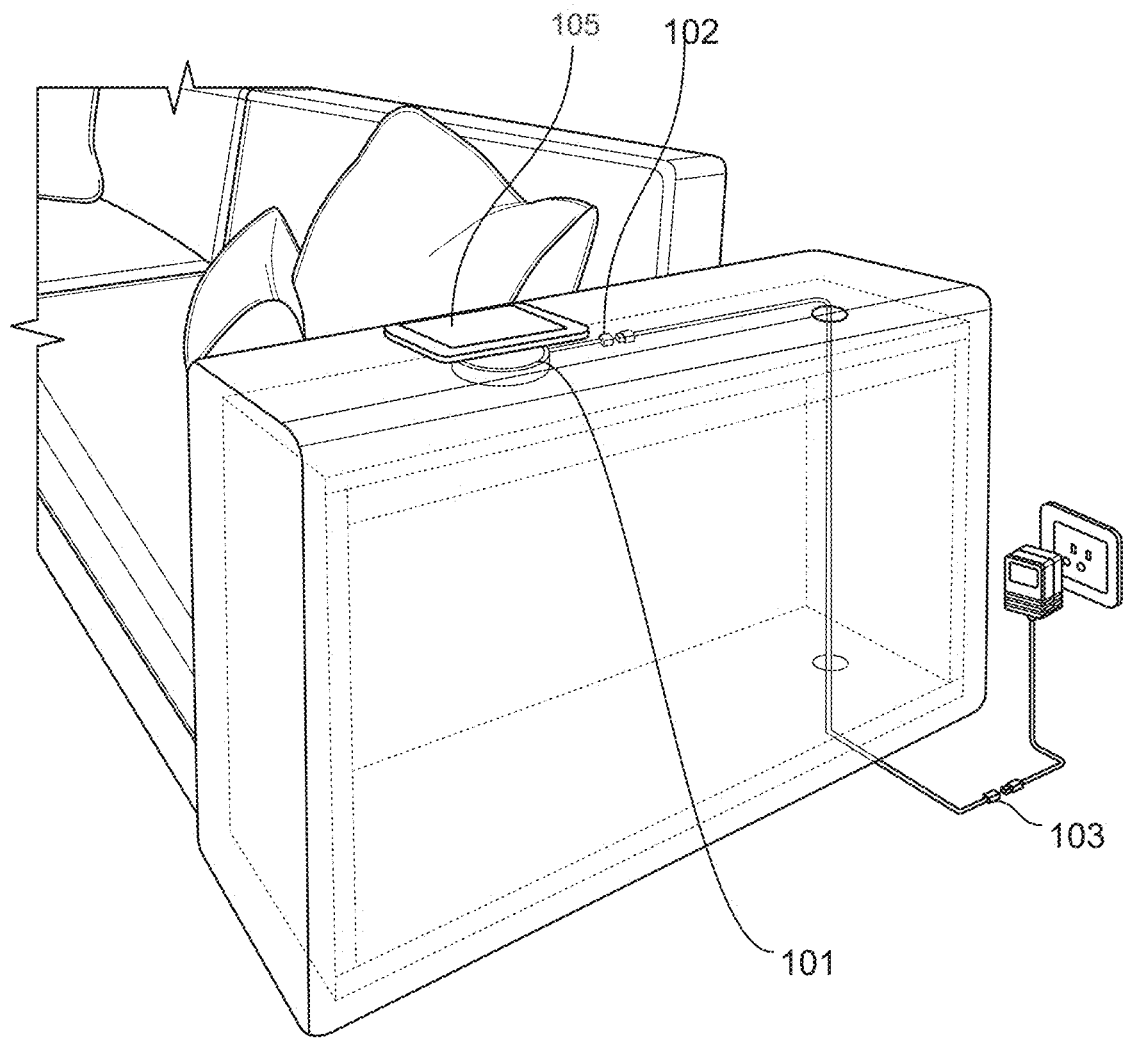
FIG. 42 shows a diagram illustrating a transparent view of a configuration of a wireless charger embedded in a sofa armrest, according to an embodiment of the present disclosure.

FIG. 42 shows a diagram illustrating a transparent view of a configuration of a wireless charger embedded in a sofa armrest, according to an embodiment of the present disclosure.

In particular, the positioning of the charging pad 101, the first electrical connector 102, and the second electrical connector 103 within the armrest is revealed by the transparent armrest.

The charging pad 101 is located a predetermined distance (i.e., 2.7 to 3.3 millimeter) below the top surface of the armrest. The first electrical connector 102 is located inside of a top portion of the armrest and the second electrical connector 103 is located outside of the armrest such that the second electrical connector 103 can easily be accessed without having to disassemble, reconfigure, or open the sofa armrest. Thus, the charging pad 101, which is embedded in the sofa armrest, may be disconnected from the wall power source by adjusting the second electrical connector 103 to be in a disconnected state (i.e., opening the second electrical 103).

Figure 43:
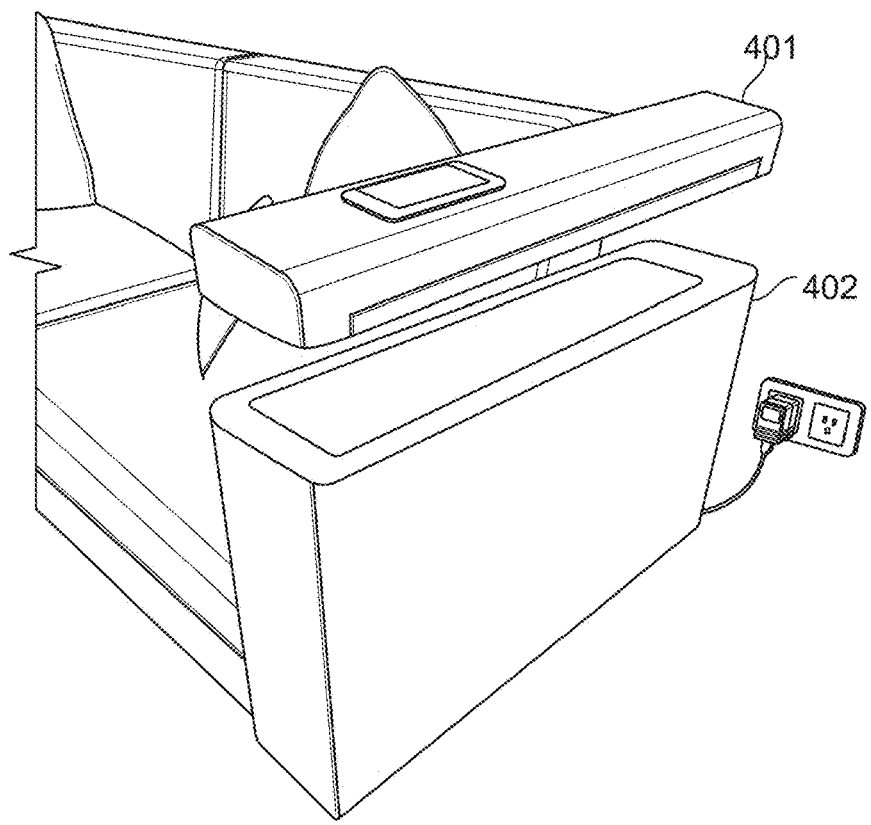
FIG. 43 shows a diagram illustrating accessing an interior of a sofa armrest via a service access point, according to an embodiment of the present disclosure.

FIG. 43 shows a diagram illustrating accessing an interior of a sofa armrest via a service access point, according to an embodiment of the present disclosure.

The service access point enables a top portion 401 of the armrest to be separated from a lower portion 402. The service access point may be a zipper or other means (i.e., a magnet or a locking mechanism) for attaching/detaching the top portion 401 to the lower portion 402. Alternatively, rather than completely separating a top portion 401 of the armrest from a lower portion 402 of the armrest, a service access point may be accessed through a pocket, hole, or window, which may be opened using a zipper, magnet, or a locking mechanism.

The service access point provides access to the charging pad 101, the first electrical connector 102, and/or the second electrical connector 103 when they are located inside of the armrest.

According to the present disclosure, a power charger can easily be replaced by using the service access point. For example, a user may notice that his or her electronic device (i.e. mobile phone) is not properly charging, and he or she may be inclined to attempt to fix the wireless charger. If the charger continues to not be working properly, then the user may decide that it is necessary to gain access to the charging pad 101 to troubleshoot it and/or replace it. Alternatively, if the user cannot gain access to the charging pad 101, then the user may decide it is necessary to replace the entire piece of furniture which houses the charging pad 101.

The service access point provides access to the interior of the sofa armrest, thereby allowing the user to troubleshoot and/or replace a portion of the wireless charger. For example, the first electrical connector 102 and/or the second electrical connector 103 may be switched to a disconnected state so that the top portion 401 of the armrest can be separated from the lower portion 402 of the armrest without wires limiting physical access to the service access point.

Thus, the service access point may allow a user to replace the wireless charger without having to replace the sofa armrest. In other words, if the wireless charger is built into the sofa armrest and cannot easily be accessed, then a user may be inclined to replace the sofa armrest and/or the sofa if the wireless charger is not operating properly.

Figure 44:
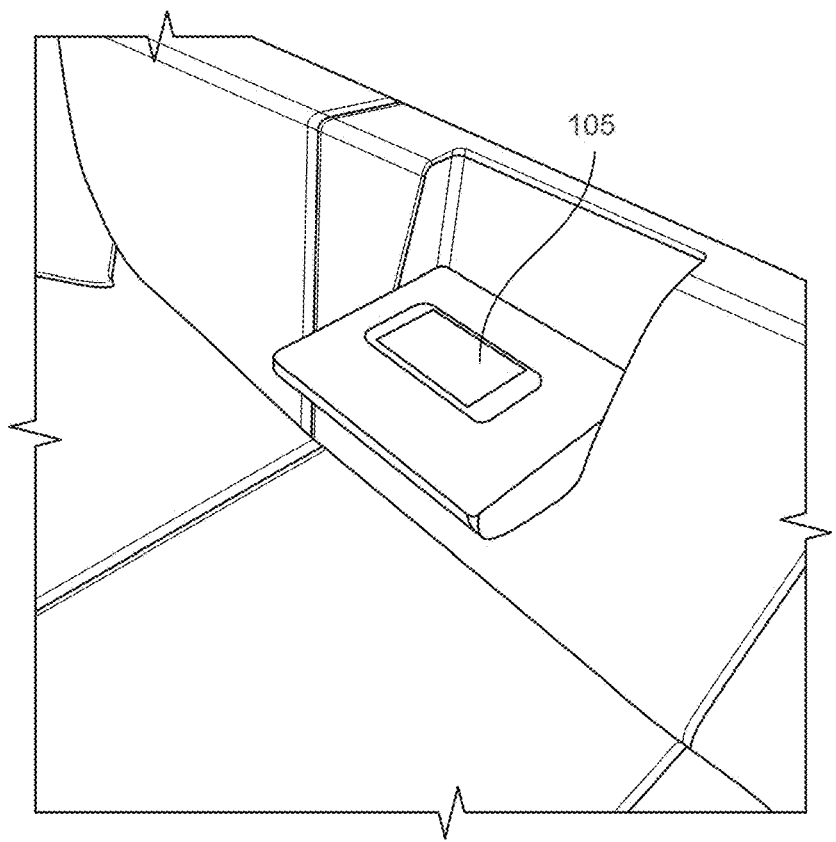
FIG. 44 shows a diagram illustrating a sofa cushion with a wireless charger embedded therein, according to an embodiment of the present disclosure.

FIG. 44 shows a diagram illustrating a configuration of a wireless charger embedded in a sofa cushion, according to an embodiment of the present disclosure.

Referring to FIG. 44, the sofa cushion may flip down to provide access to the embedded wireless charger. That is, the charging pad 101 of the wireless charger can be located in a sofa cushion that may be opened from a first position to a second position. The first position may be a regular sofa orientation which a sofa cushion can be ordinary used (i.e., by allowing the user to sit on or against it). The second position may be a flipped down position of a portion of the sofa cushion which may provide an area for an electronic device 105 to be placed such that a wireless charger embedded in the flipped down portion of the sofa provides wireless charging to the electronic device 105.

Figure 45:
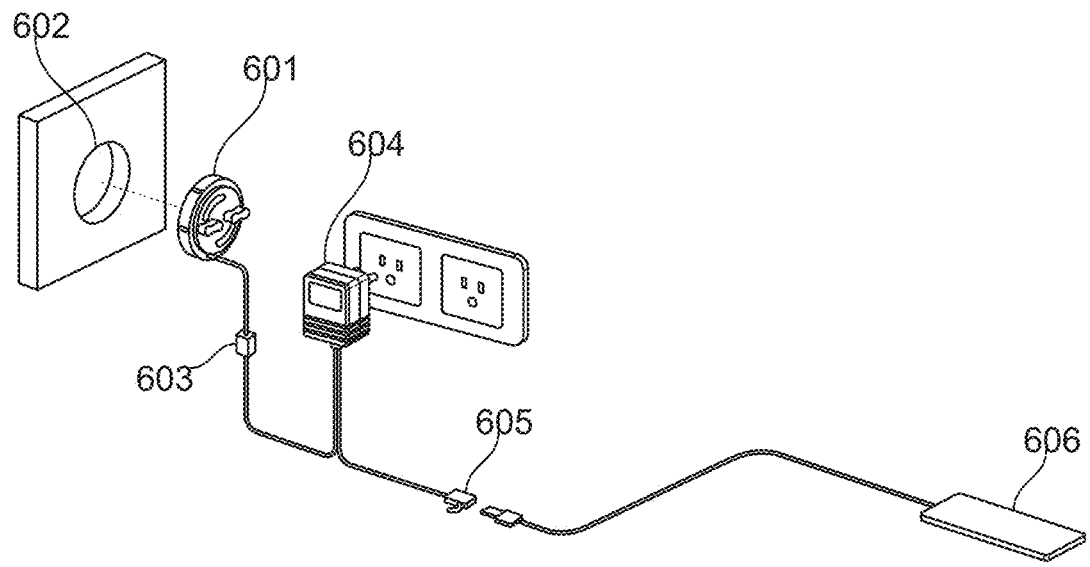
FIG. 45 shows a diagram illustrating a configuration of a charger, according to an embodiment of the present disclosure.

FIG. 45 shows a diagram illustrating a configuration of a charger, according to an embodiment of the present disclosure.

Referring to FIG. 45, a wireless charging pad (i.e., a coil for electromagnetic induction) may be located inside of a locking mechanism 601. The coil may be wound around a central point for generating an electromagnetic field. The locking mechanism 601 may snugly fit inside of a pre-bored hole 602. The locking mechanism 601 including the wireless charging pad can then be placed into a section of the sofa.

Sofas and other furniture for use with a wireless charging pad may contain pre-bored holes, which may be custom-made by a furniture factory. The pre-bored holes may be located on the bottom of, on the side of, on the top of, inside of, or outside of furniture to accommodate the wireless charging device. For example, a wireless charging device having a locking mechanism 601 may be placed into one of the pre-bored holes 602 and placed into a locked position such that an edge of the furniture is flush. Additionally, a furniture cover may be placed over the locking mechanism 601 in the pre-bored hole 602.

When the locking mechanism 601 is placed into a pre-bored hole, a user may lock the locking mechanism 601 into place to affix a charger to the furniture. When it is desirable to remove the charger, a customer may unlock the locking mechanism 601 to remove it from the furniture. The locking mechanism 601 may include part or all of the charger. The charger may be a wired charger or a wireless charger.

The locking mechanism 601 may be connected by a first wire to an electrical connector 603, which is connected to a wall power supply 604. A USB power extension may be connected to the wall power supply 604 such that power can simultaneously be output to the wireless charging pad in the locking mechanism 601 through the electrical connector 603, and to the USB power extension 605. An electronic device 606 may be connected to the USB power extension 605 to receive a charge.

In order to attach the locking mechanism 601 to the furniture, the locking mechanism 601 may be placed into a pre-bored (previously drilled) mounting hole in the furniture. Next, a twist-lock turning part of the locking mechanism 601 may be twisted in a predetermined direction (e.g., clockwise). When the locking mechanism 601 is twisted in the predetermined direction, elastic latches may protrude in a direction away from the center of the locking mechanism 601, causing the diameter of the locking mechanism 601 to increase. In this manner, the diameter of the locking mechanism 601 in the unlocked position may be less than the diameter of the locking mechanism 601 in the locked position.

By increasing the diameter of the locking mechanism 601 in the locked position, the locking mechanism 601 may be affixed to the interior walls of the pre-bored hole in the furniture. In this way, the locking mechanism 601 may be securely attached to the furniture when placed in the locked position.

Alternatively, the locking mechanism 601 may be attached to the pre-bored hole in the furniture using adhesive, latches, sliders, or clamps to fasten the wireless charger mounting mechanism into an intended position.

Accordingly, a user may make an installation decision regarding whether or not to install the locking mechanism 601 with a charging device in his/her furniture. This solution of reduces the risk of returning expensive furniture due to unsatisfactory performance of charging devices because a user may replace and/or reinstall part or all of a charging device associated with the furniture.

Figure 46:
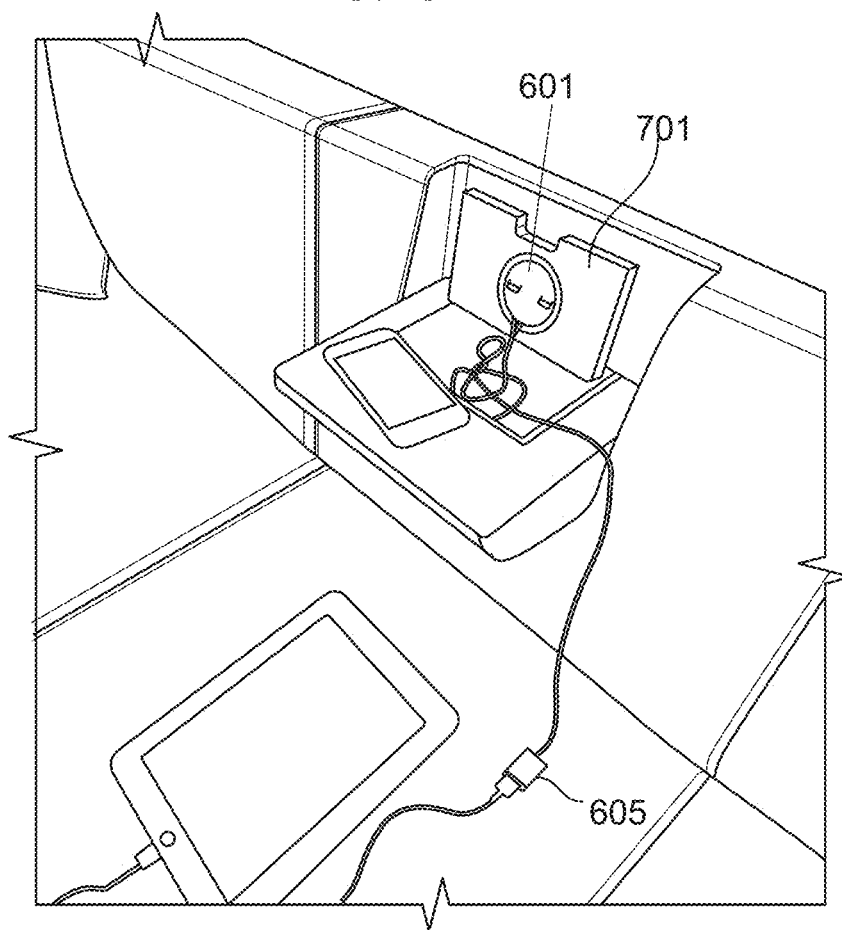
FIG. 46 shows a diagram illustrating a configuration of a charger embedded in a sofa cushion with a USB extension, according to an embodiment of the present disclosure.

FIG. 46 shows a diagram illustrating a configuration of a charger embedded in a sofa cushion with a USB extension, according to an embodiment of the present disclosure.

Referring to FIG. 46, the locking mechanism 601 may be locked into place inside of a portion of a sofa cushion. As illustrated in FIG. 46, a portion of the sofa cushion can be flipped down from a first position (i.e., closed position) to a second position (open position). The locking mechanism 601 may be in a locked position in a pre-bored hole. The pre-bored hole may be a part of a cover 701 which may be opened or closed to access an inside section of the portion of the flipped-down sofa cushion. The inside section of the portion of the sofa cushion may be used to place wires (i.e., USB power extension 605) when it is not being used.

Thus, a user may flip down a portion of a sofa cushion, thereby gaining access to the locking mechanism 601 having an embedded wireless charging pad. A user may charge a first electronic device by placing it on or near the locking mechanism 601 having the embedded wireless charging pad. The user may simultaneously charge a second electronic device by connecting it to the USB power extension 605.

Figure 47:
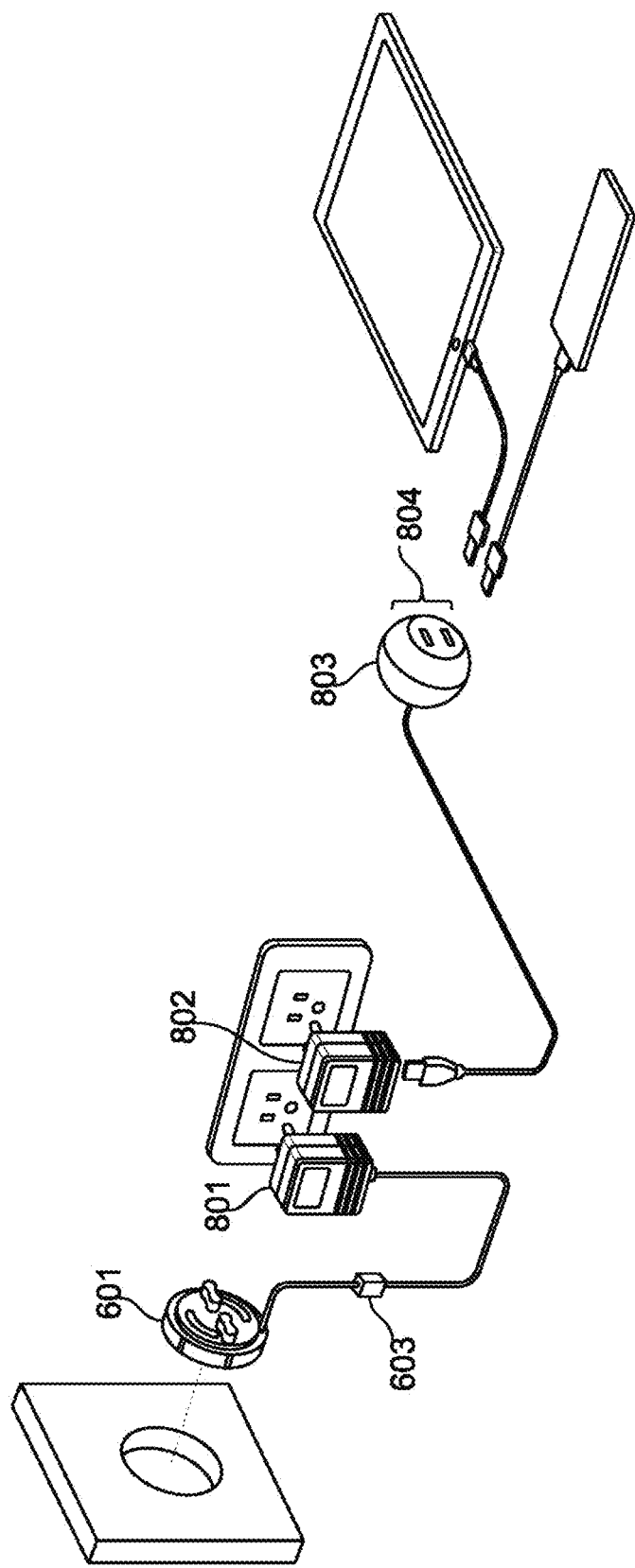
FIG. 47 shows a diagram illustrating a configuration of a wireless charger and a configuration of a wired ball USB charger, according to an embodiment of the present disclosure.

FIG. 47 shows a diagram illustrating a configuration of a wireless charger and a configuration of a wired ball USB charger, according to an embodiment of the present disclosure.

Referring to FIG. 47, a locking mechanism 601, including a wireless charging pad embedded therein, is connected to the power supply 801 through the electrical 603. The power supply 801 connects directly to the electrical 603 to provide power to the wireless charging pad embedded in the locking mechanism 601.

Additionally, a second power supply 802 may provide power to a USB ball charger 803. The USB ball charger 803 may be detachable from the second power supply 802 and may have two USB ports 804 for simultaneously charging two electronic devices through the two USB ports 804. In this manner, the USB ball charger 803 can easily be moved and placed in the best suited location for charging electronic devices.

Figure 48:
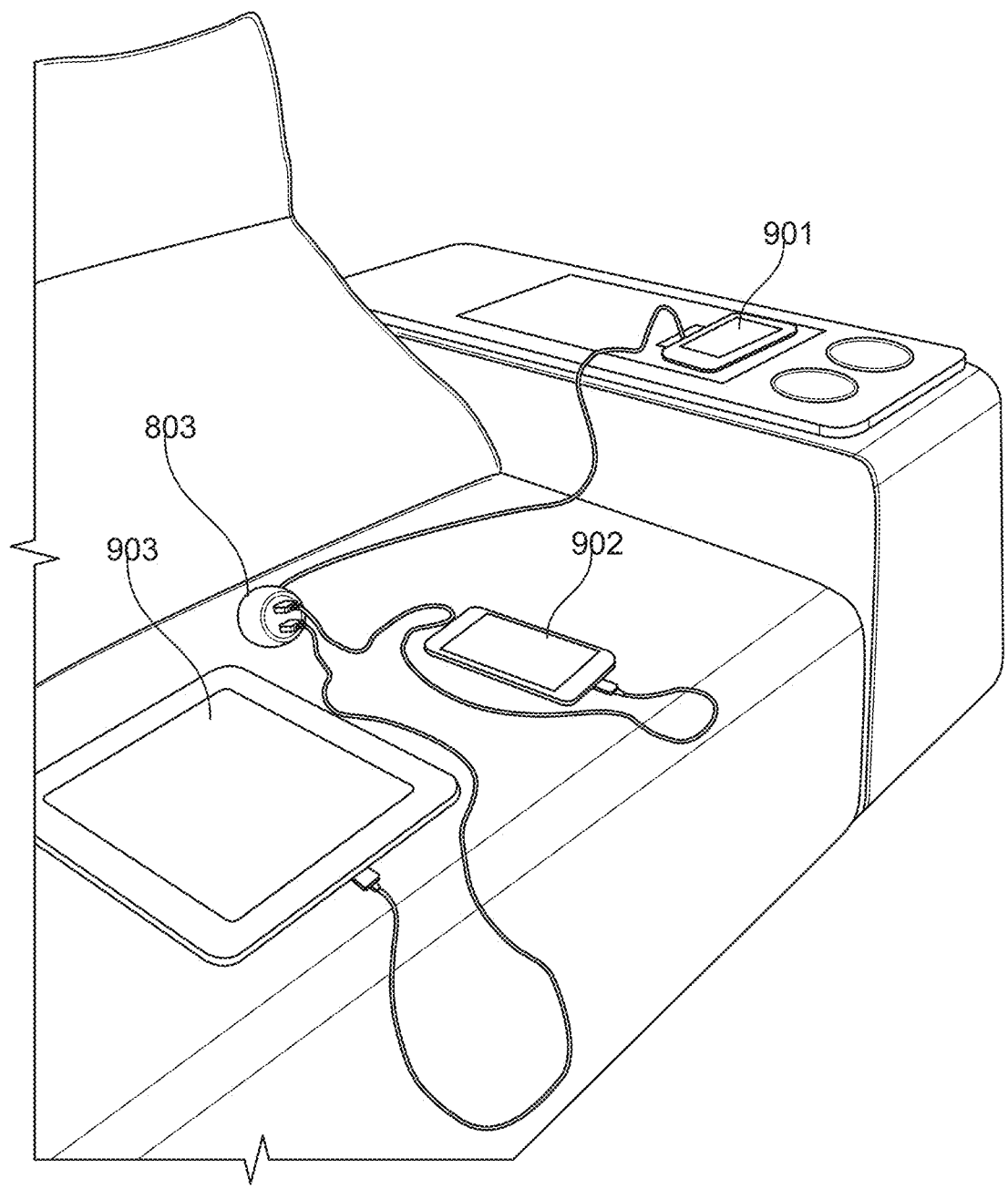
FIG. 48 shows a diagram illustrating a configuration of a charger embedded in a middle section with additional power outlets and a wired ball USB splitter, according to an embodiment of the present disclosure.

FIG. 48 shows a diagram illustrating a configuration of a charger embedded in a middle section with additional power outlets and a wired ball USB splitter, according to an embodiment of the present disclosure.

Referring to FIG. 48, three electronic devices may simultaneously be charged. A first electronic device 901 may wirelessly be charged through a wireless charging pad embedded into a middle section of a sofa. The first electronic device 901 may be placed on a portion of the middle section of the sofa that has a wireless charging pad embedded thereunder. For example, a wireless charging pad may be embedded into a locking mechanism, which can be inserted into a pre-bored hole. The locking mechanism may be hidden from view when the middle section of the sofa is in the closed position. That is, the pre-bored hole may be located on an inner surface of a door and/or flap such that the side of the door and/or flap opposite the locking mechanism provides a flush surface on which an electronic device 901 can wirelessly be charged.

Additionally, a second electronic device 902 and a third electronic device 903 can simultaneously be charged through the ball charger 803. The second electronic device 902 and the third electronic device 903 can be simultaneously charged while the first electronic device 901 is wirelessly being charged.

Figure 49:
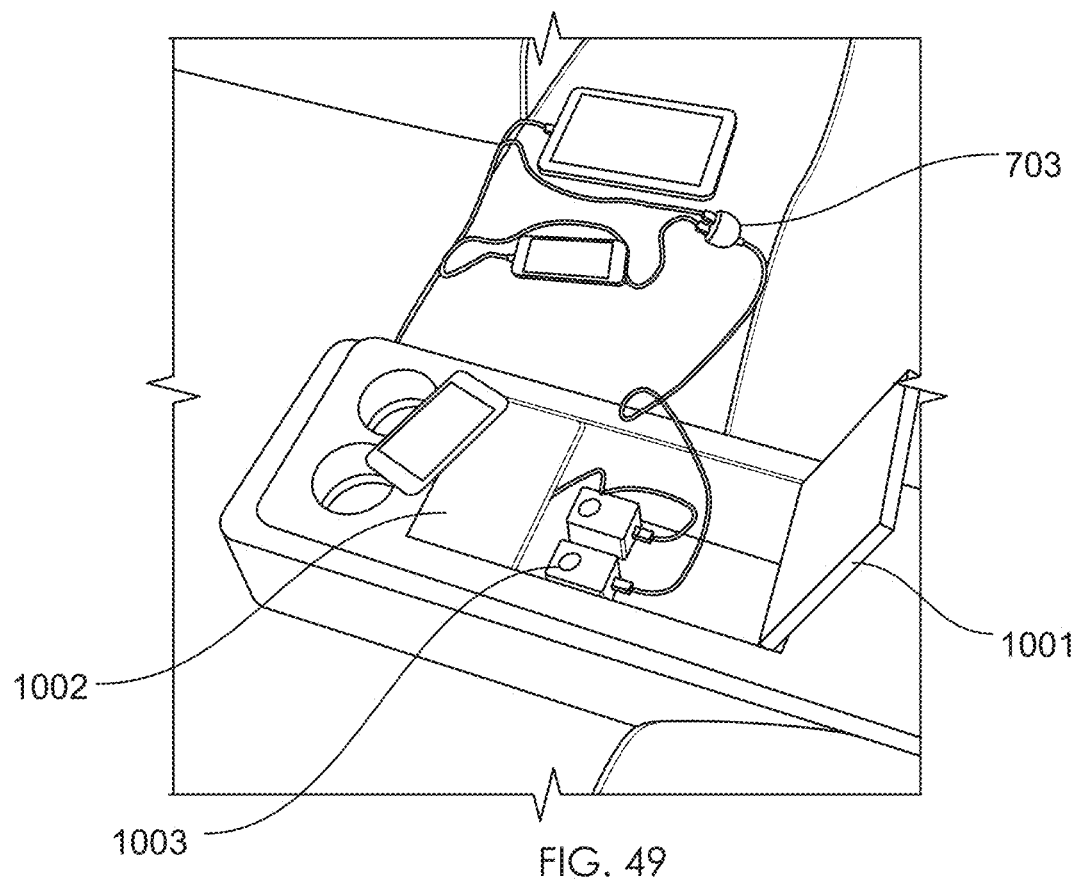
FIG. 49 shows a diagram illustrating an interior configuration of a charger embedded in a middle section with additional power outlets and a wired ball USB splitter, according to an embodiment of the present disclosure.

FIG. 49 shows a diagram illustrating an interior configuration of a charger embedded in a middle section with additional power outlets and a wired ball USB splitter, according to an embodiment of the present disclosure.

The middle section of the sofa may include hidden power outlets 1003 which are accessible by flipping open a small door 1001. The middle section may also include a wireless charger 1002 embedded therein.

Figure 50:
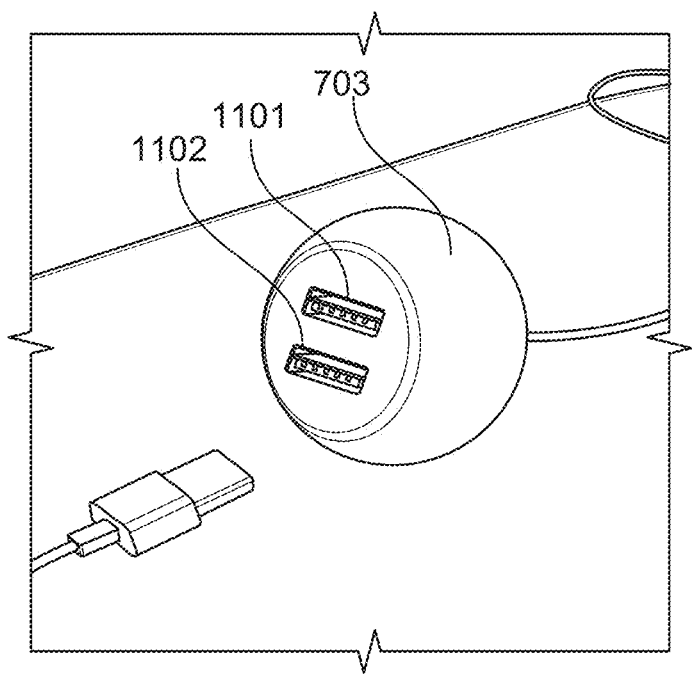
FIG. 50 shows a diagram illustrating a wired ball USB splitter, according to an embodiment of the present disclosure.

FIG. 50 shows a diagram illustrating a wired ball USB splitter, according to an embodiment of the present disclosure.

Referring to FIG. 50, the USB splitter may be a USB ball charger 803 (i.e., a half moon charger) capable of providing different power outputs to a first USB output socket 1101 and a second USB output socket 1102 according to what type of electronic device is plugged into each output socket.

The USB ball charger may include one or more custom integrated circuits (ICs) which may include a large variety of standards and protocols to communicate with many different types of electronic devices. For instance, when a first type of electronic device is connected to the USB output socket 1101, a custom IC may identify the type of electronic device by communicating with an external IC of the first electronic device and determine a first output power for charging. When a second type of electronic device is connected to the second USB output socket 1102, the custom IC may identify the second type of electronic device by communicating with an external IC of the second electronic device and determine a second output power for charging.

Additionally, the custom ICs may prioritize charging. For instance, when a first type of electronic device requires a relatively large power usage for charging when compared to a second type device, then the custom IC may distribute power in a way to ensure that both devices are charged according to their factory specifications. This may mean that the lower power usage device (i.e., the second type device) may first be charged completely and the higher power usage device may be charged after the lower power usage device is finished charging.

Figure 51:
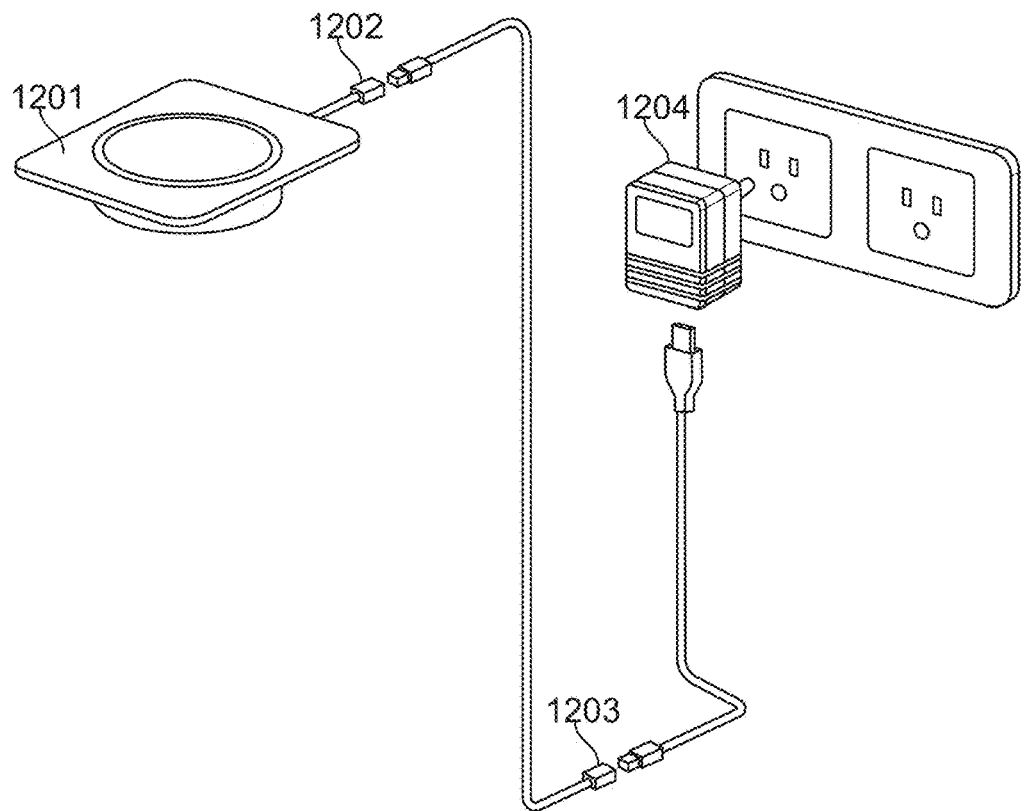
FIG. 51 shows a diagram illustrating a configuration of a wireless charger, according to an embodiment of the present disclosure.

FIG. 51 shows a diagram illustrating a configuration of a wireless charger, according to an embodiment of the present disclosure.

The wireless charger of FIG. 51 includes a charging pad 1201. The charging pad 1201 includes a coil capable of producing an electromagnetic field that extends outward from the charging pad 1201. The coil may be embedded inside the charging pad 1201 so that an electronic device may be positioned in the electromagnetic field by being placed on top of the surface of the charging pad 1201. The charging pad 1201 may be attached to a first cable which connects to a first electrical connector 1202.

The first electrical connector 1202 is connected to a second cable which is connected to a second electrical connector 1203. The second electrical connector 1203 is connected to a third cable which connects to the wall power supply 1204. The first electrical connector 1202 and the second electrical connector 1203 are detachable such that either one may be used to connect or disconnect the charging pad 1201 from the wall power supply 1204. Additionally, the third cable may be detachable from the wall power supply 1204 such that the wall power supply 1204 may be disconnected from the second electrical connector 1203.

In particular, the wall power supply 1204 may include a USB port for the third cable to be connected to. The wall power supply 1204 may connect to a standard United States power supply of 120 volts (V) at 60 hertz (Hz), or may be connected to other power supply voltages and/or frequencies (i.e., alternating current and/or direct current power).

The first electrical connector 1202 and the second electrical connector 1203 are detachable, therefore the wireless charger may be detached from the second cable, the third cable, and the wall power supply 1204. Likewise, the wall power supply 1204 may be detached from the second cable, the first cable, and the wireless charger.

Figure 52:
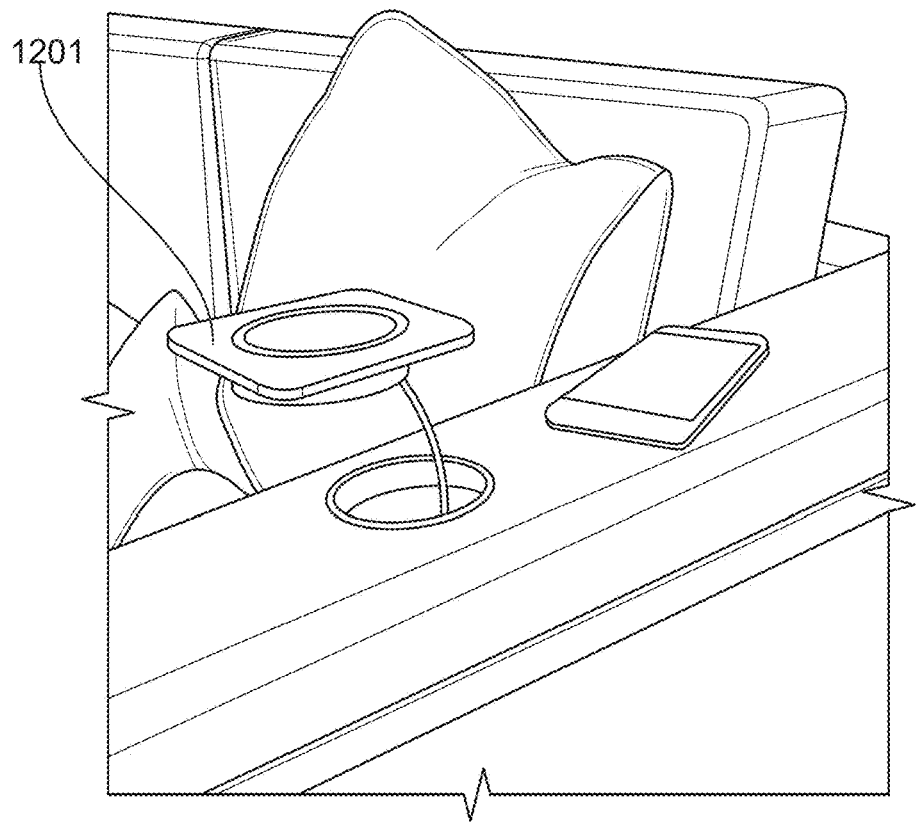
FIG. 52 shows a diagram illustrating a configuration of a wireless charging pad placed in a drink holder of an armrest, according to an embodiment of the present disclosure.

FIG. 52 shows a diagram illustrating a configuration of a wireless charging pad placed in a drink holder of an armrest, according to an embodiment of the present disclosure.

Referring to FIG. 52, the wireless charging pad 1201 may be formed to fit into a cup holder on an armrest of the sofa. Specifically, the bottom side of the wireless charging pad 1201 may be a shaped circularly so as to fit inside of the cup holder on the armrest of the sofa. In this manner, the wireless charging pad 1201 may appear to be attached to the armchair of the sofa because the wireless charging pad 1201 can be fitted to the cup holder. Additionally, the cable which attaches the wireless charging pad 1201 to the first electrical may run through the cup holder to access the interior of the sofa armchair. Therefore, the cable will not be visible when the wireless charger 1201 is placed into the cupholder.

Figure 53:
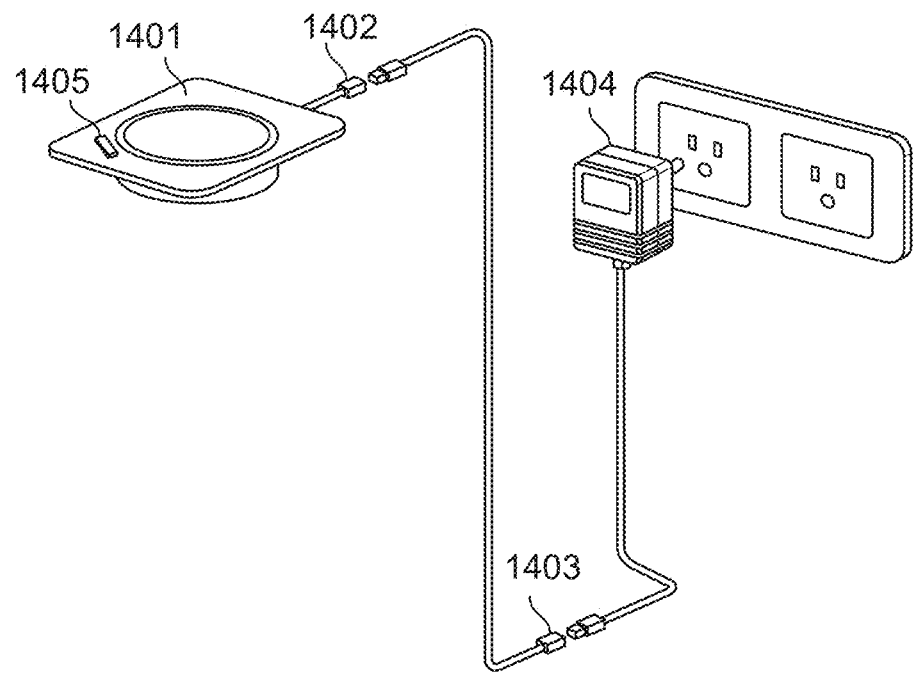
FIG. 53 shows a diagram illustrating a configuration of a wireless charger with a USB port for wired charging, according to an embodiment of the present disclosure.

FIG. 53 shows a diagram illustrating a configuration of a wireless charger with a USB port for wired charging, according to an embodiment of the present disclosure.

Referring to FIG. 53, the wireless charger includes a charging pad 1401. The charging pad 1401 includes a coil capable of producing an electromagnetic field that extends outward from the charging pad 1401. The coil may be embedded inside the charging pad 1401 so that an electronic device may be positioned in the electromagnetic field by being placed on top of the surface of the charging pad 1401.

In addition to including a wireless charger embedded therein, the charging pad 1401 may also include a USB port 1405 positioned on the exterior of the charging pad 1401. This configuration may allow for a user to wirelessly charge a first electronic device on the charging pad 1401 and to simultaneously charge a second electronic device through the USB port 1405.

The charging pad 1401 may be attached to a first cable which connects to a first electrical connector 1402. The first electrical connector 1402 may be connected to a second cable which may be connected to a second electrical connector 1403. The second electrical connector 1403 may be connected to a third cable which connects to the wall power supply 1404. The first electrical connector 1402 and the second electrical connector 1403 may be detachable such that either one may be used to connect or disconnect the charging pad 1401 to the wall power supply 1404.

The wall power supply 1404 may connect to a standard United States power supply of 120 volts (V) at 60 hertz (Hz), or may be connected to other power supply voltages and/or frequencies (i.e., alternating current and/or direct current power).

The first electrical connector 1402 and the second electrical connector 1403 may be detachable, therefore the wireless charger may be detached from the second cable, the third cable, and the wall power supply 1404. Likewise, the wall power supply 1404 may be detached from the second cable, the first cable, and the wireless charger.

Figure 54:
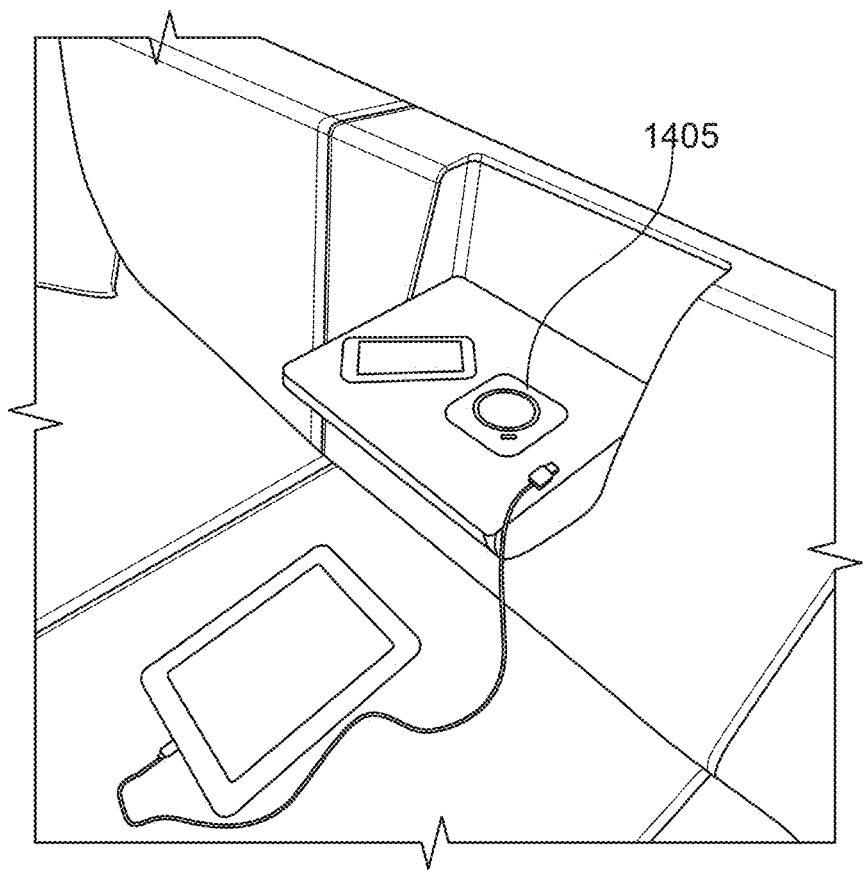
FIG. 54 shows a diagram illustrating a sofa cushion with a wireless charger positioned on a flip-down portion of a cushion, according to an embodiment of the present disclosure.

FIG. 54 shows a diagram illustrating a sofa cushion with a wireless charger positioned on a flip-down portion of a cushion, according to an embodiment of the present disclosure.

Referring to FIG. 54, the sofa cushion may flip down to provide access to the wireless charger. That is, the charging pad 1405 of the wireless charger can be located in a sofa cushion that may be opened from a first position to a second position. The first position may be a regular sofa orientation which a user can sit and/or ordinarily use a cushion. The second position may provide an area for an electronic device to be placed such that a wireless charger embedded in or placed on the flipped down portion of the sofa provides wireless charging to the electronic device.

Figure 55:
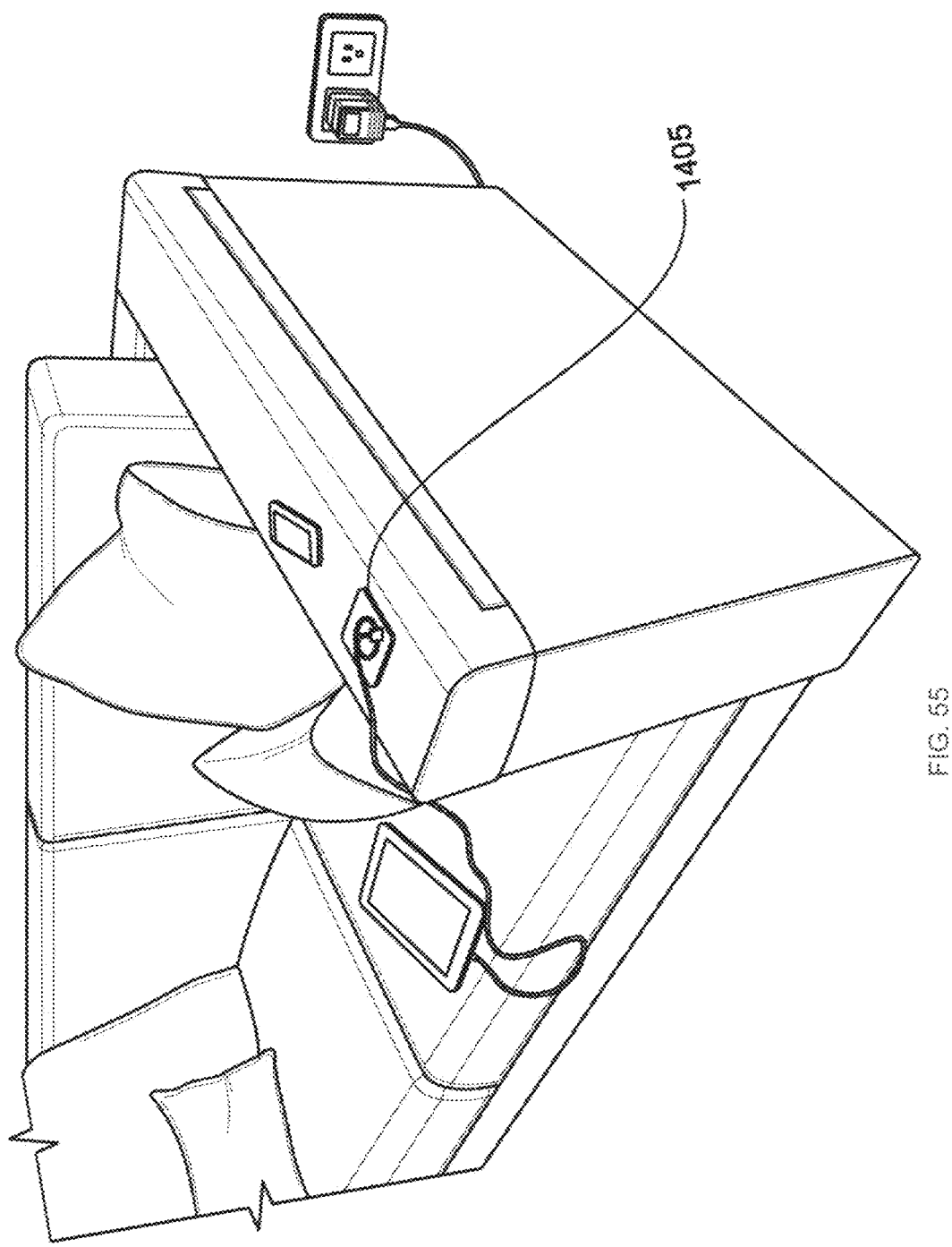
FIG. 55 shows a diagram illustrating a sofa armrest with a wireless charger with a USB port, according to an embodiment of the present disclosure.

FIG. 55 shows a diagram illustrating a sofa armrest with a wireless charger with a USB port, according to an embodiment of the present disclosure.

Referring to FIG. 55, the charging pad 1405 of the wireless charger can be positioned on top of the sofa armrest. The charging pad 1405 can wirelessly charge a first electronic device by placing it near or on top of the charging pad 1405. Additionally, the charging pad 1405 can charge a second electronic device through a USB port located on the surface of the charging pad 1405.

FIGS. 56-60 are directed to a structure and operation of a charging system that performs charging through a non-transparent furniture panel. For example, the non-transparent furniture panel may not allow visible light and/or infrared radiation to visibly pass through a surface thereof.

Figure 56:
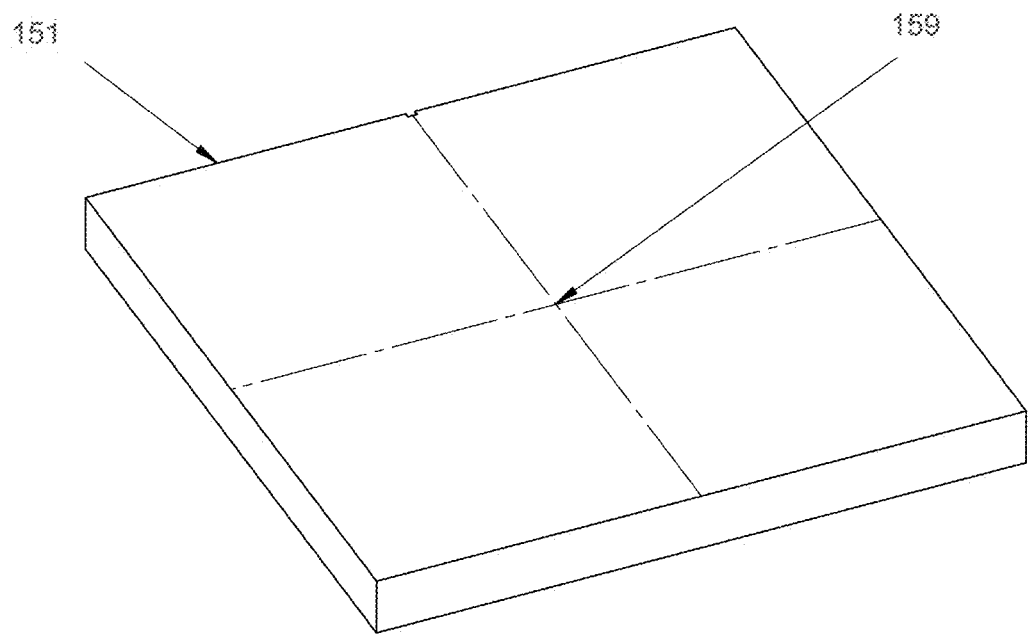
FIG. 56 shows a perspective view of a charging system through a furniture panel that is non-transparent to visible and infrared light, according to an embodiment of the present disclosure.
Figure 57:
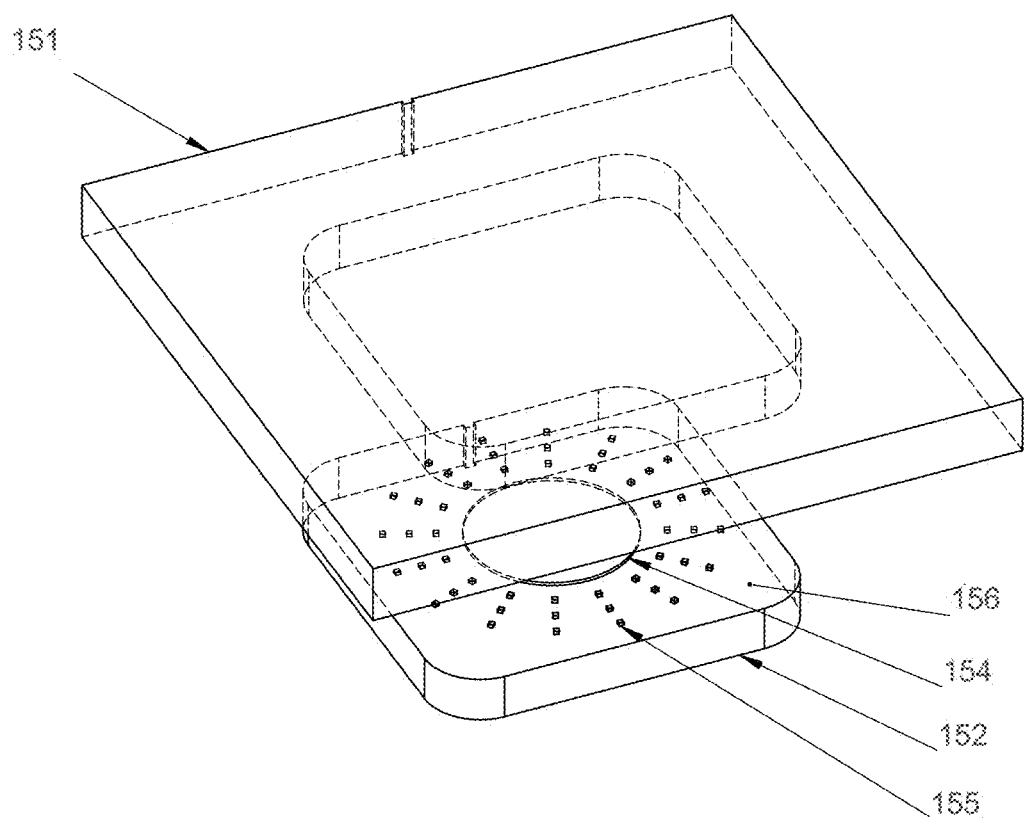
FIG. 57 shows an exploded perspective view of a charging system with a charging module, according to an embodiment of the present disclosure.
Figure 58:
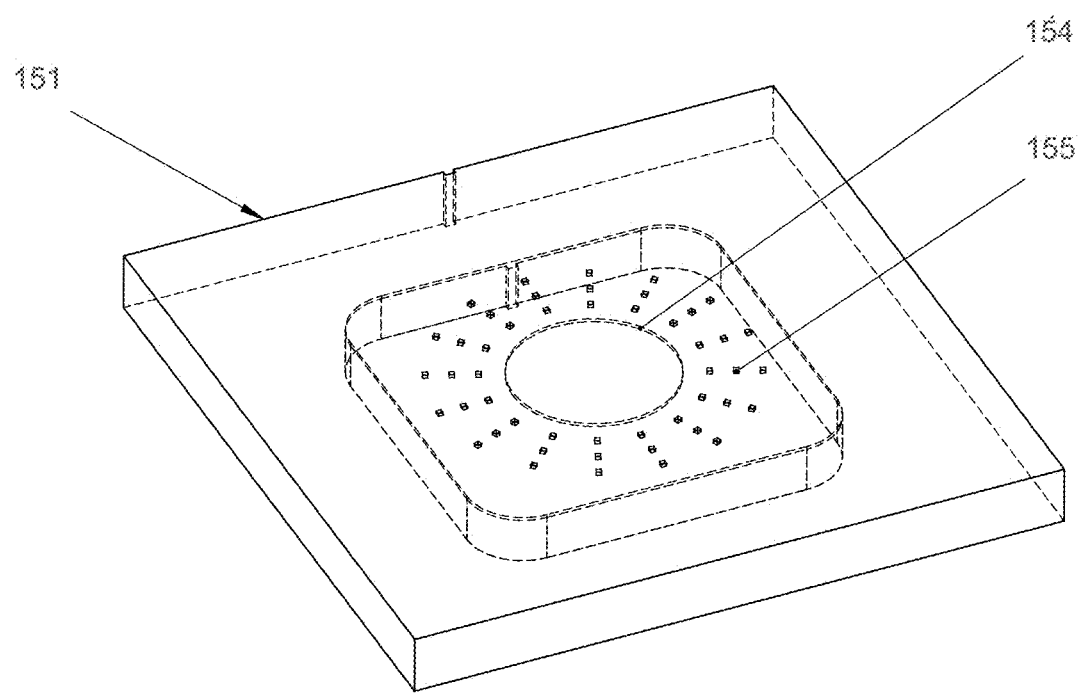
FIG. 58 shows an exploded perspective view of a loading system with a loading module shown, according to an embodiment of the present disclosure.
Figure 59:
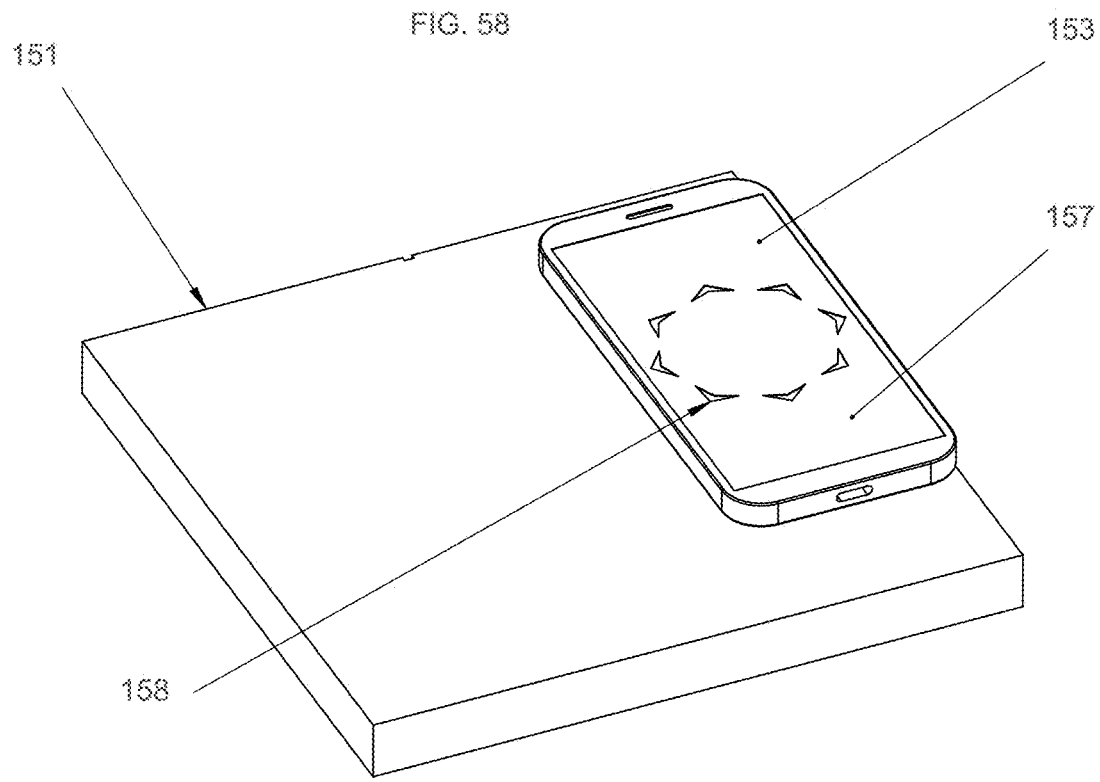
FIG. 59 shows a perspective view of a charging system that is performing charging through a furniture panel with details of the charging displayed on the energy receiver, according to an embodiment of the present disclosure.
Figure 60:
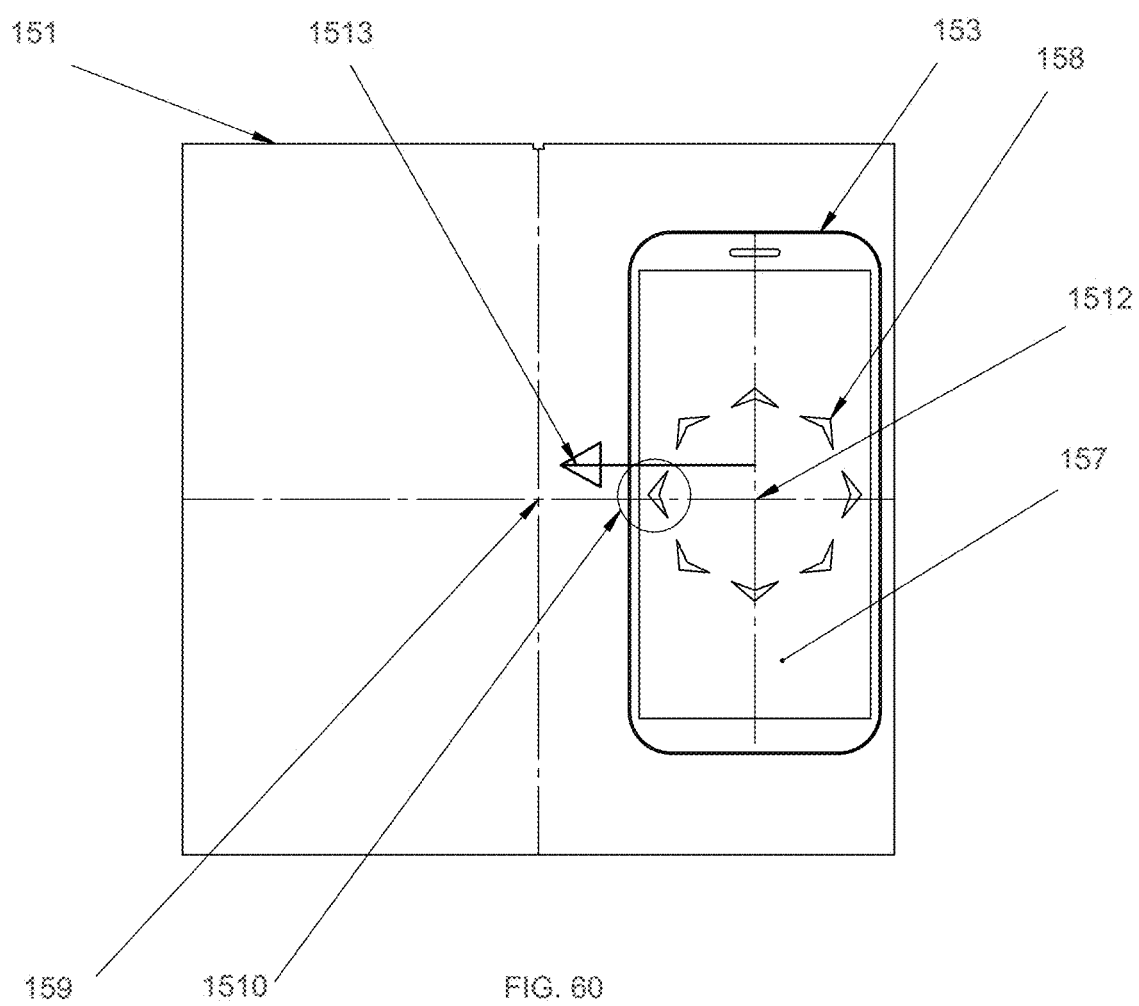
FIG. 60 shows a view illustrating a function of a positioning system, according to an embodiment of the present disclosure.

FIG. 56 shows a perspective view of a charging system through a furniture panel that is non-transparent to visible and infrared light, according to an embodiment of the present disclosure. FIG. 57 shows an exploded perspective view of a charging system with a charging module, according to an embodiment of the present disclosure. FIG. 58 shows an exploded perspective view of a loading system with a loading module shown, according to an embodiment of the present disclosure. FIG. 59 shows a perspective view of a charging system that is performing charging through a furniture panel with details of the charging displayed on the energy receiver, according to an embodiment of the present disclosure. FIG. 60 shows a view illustrating a function of a positioning system, according to an embodiment of the present disclosure.

Referring to FIGS. 56-60, a charging system may include of a furniture board 151 (e.g., a non-transparent, wooden, and/or solid board) that provides a charging and mounting location for the charging module 152 (e.g., a portable wireless communication device). The charging module 152 may be mounted (e.g., positioned) on the bottom of the board 1 and equipped with an energy transmitter 154 (e.g., an induction coil for transmitting wireless power) and a matrix 156 of position sensors 155. The position sensors 155 may be arranged in a predetermined pattern such that each position sensor 155 is spaced apart from each other position sensor 155 by a specified distance. In response to the board 151 not being transparent, the applied position sensors 155 operate according to capacitive signals, radio signals or other principle signals which permit transmission through a non-transparent board material (e.g., wood).

The wireless energy transmitter and wireless energy receiver most efficiently operate when placed at an ideal orientation at a center 159 of the transmitter (e.g., the board 151) and a center 1512 of the receiving device 153. The correct arrangement of the above-mentioned system elements is possible thanks to the installation of an internal smartphone application 157 in the receiving device 153, which will enable a display on the receiving device 153 to display suggestions (e.g., direction arrows that suggest a movement and/or point towards the center 159) 158 of the movement 1513 in relation to the board 151.

The display of the receiving device 153 may display a position correction icon 1510 (e.g., a direction arrow that is illuminated or highlighted) when an energy receiver included in the device 153 is positioned within a predetermined distance along the surface of the board 151 in relation to the transmitter 154. For example, if the device 153 moves 1513 in a direction towards the center 159 of the board 151, and a horizontal distance from the transmitter 154 to the device 153 is less than a predetermined number (e.g., 5 centimeters), then the device 153 may display the position correction icon 1510 indicating a direction towards the center 159. Accordingly, the application 157 may notify the user of the correct positioning of the transmitter means with respect to the power receiver. Additionally or alternatively, the application 157 may provide an audible notification.

FIGS. 61-65 are directed to a structure and operation of a charging system that performs charging through a transparent furniture panel. For example, the transparent furniture panel may allow visible light and/or infrared radiation to visibly pass through a surface thereof.

Figure 61:
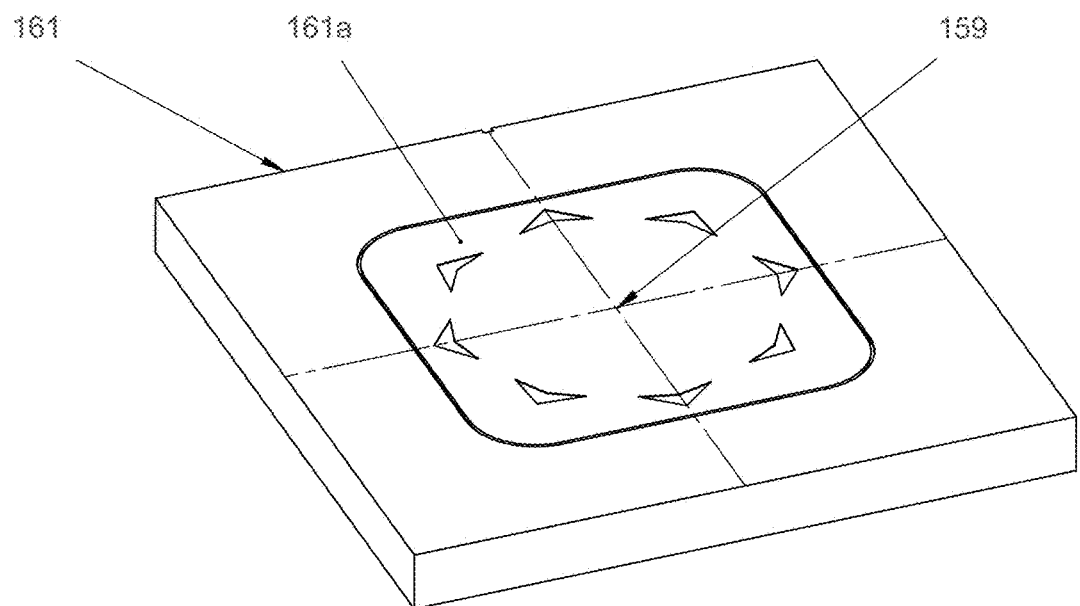
FIG. 61 shows a perspective view of a charging system performing charging through a furniture panel and a transparent decorative element, according to an embodiment of the present disclosure.
Figure 62:
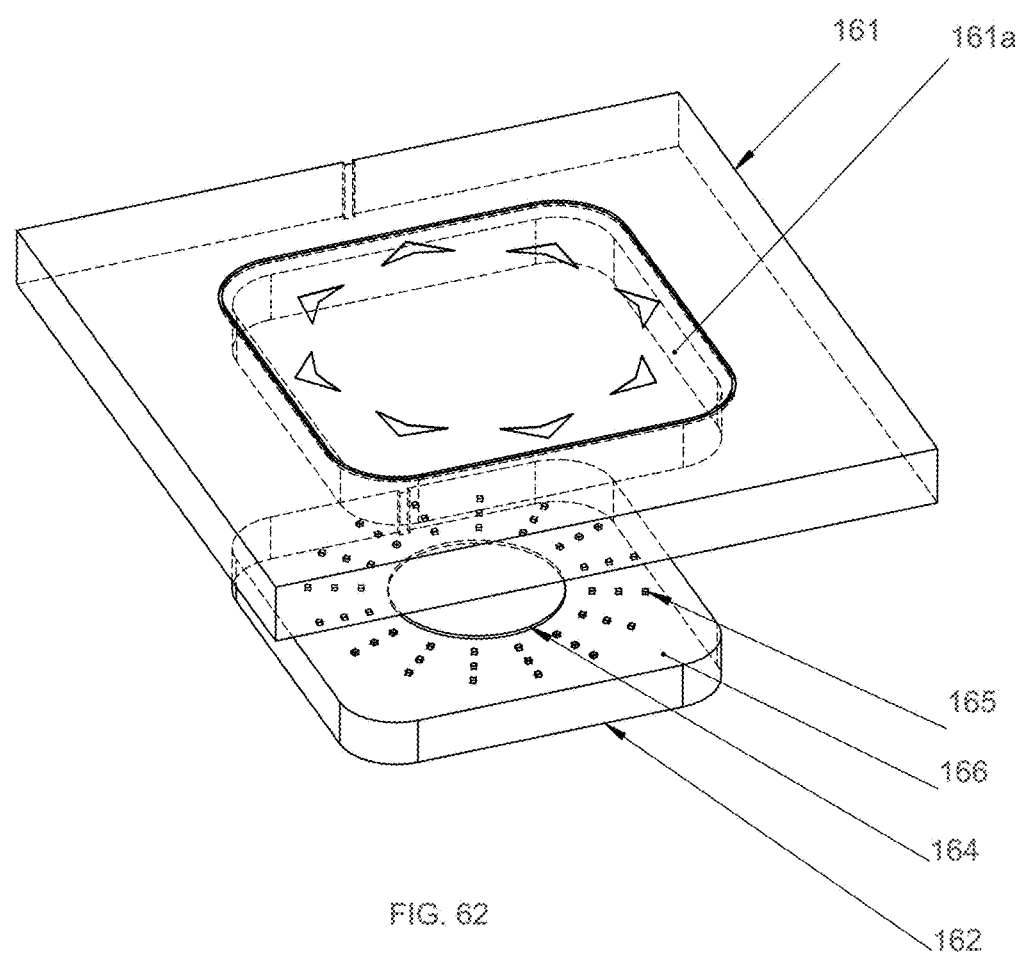
FIG. 62 shows an exploded perspective view of a charging system with a charging module, according to an embodiment of the present disclosure.
Figure 63:
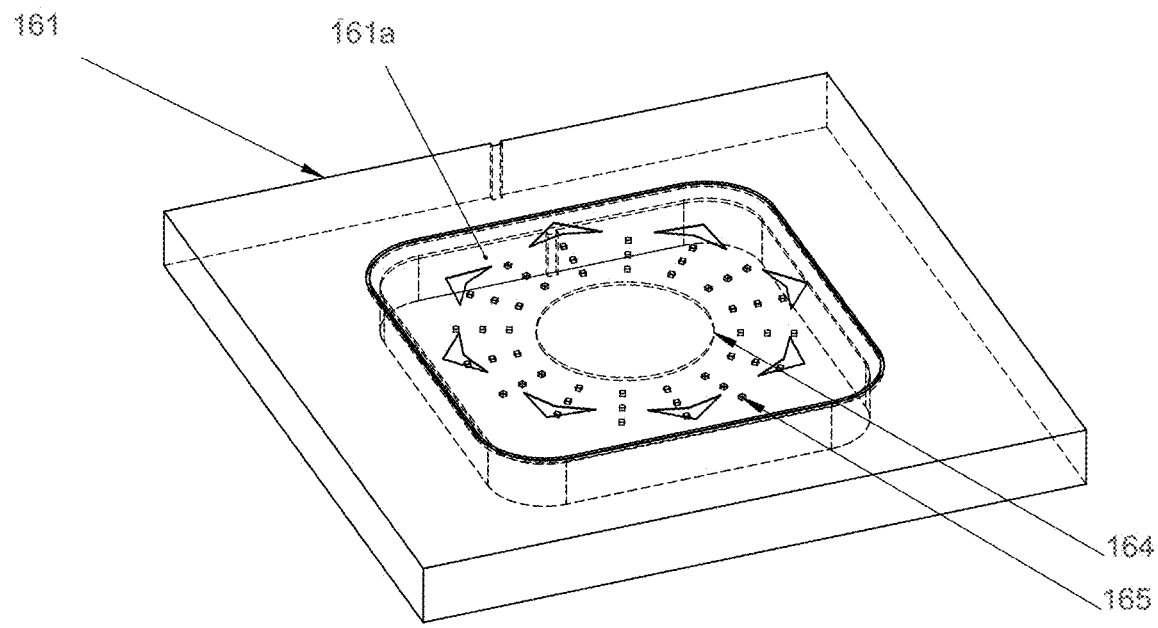
FIG. 63 shows an exploded perspective view of a loading system with a loading module shown, according to an embodiment of the present disclosure.
Figure 64:
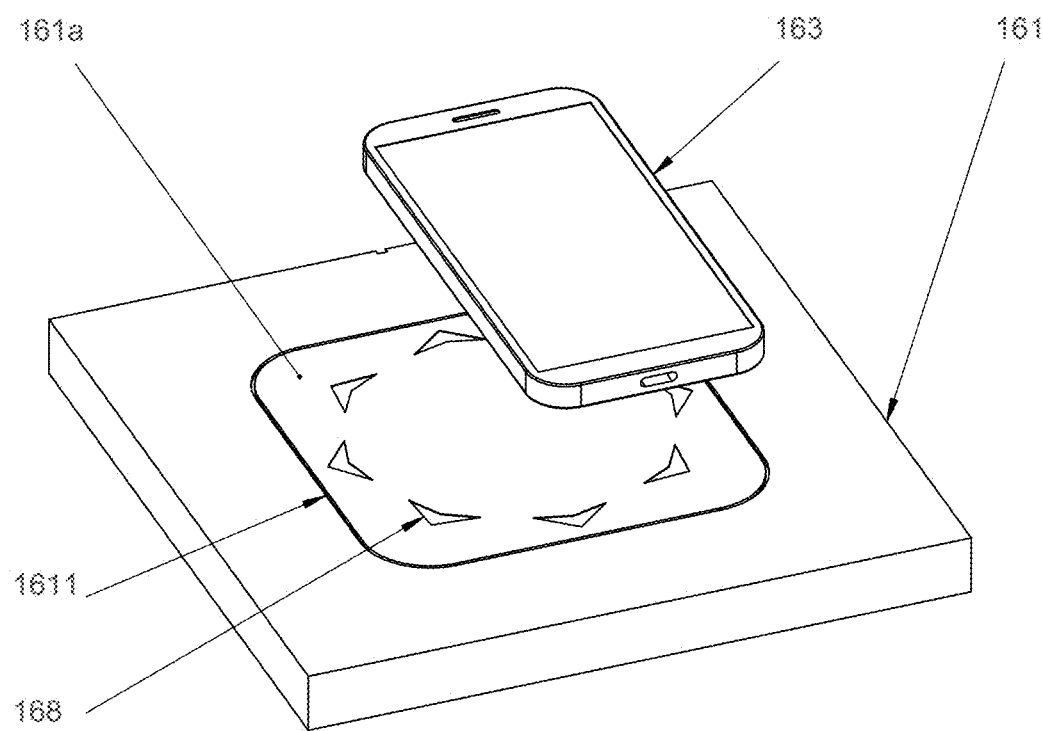
FIG. 64 shows a perspective view of a charging system performing charging through a furniture panel and a transparent decorative element, according to an embodiment of the present disclosure.
Figure 65:
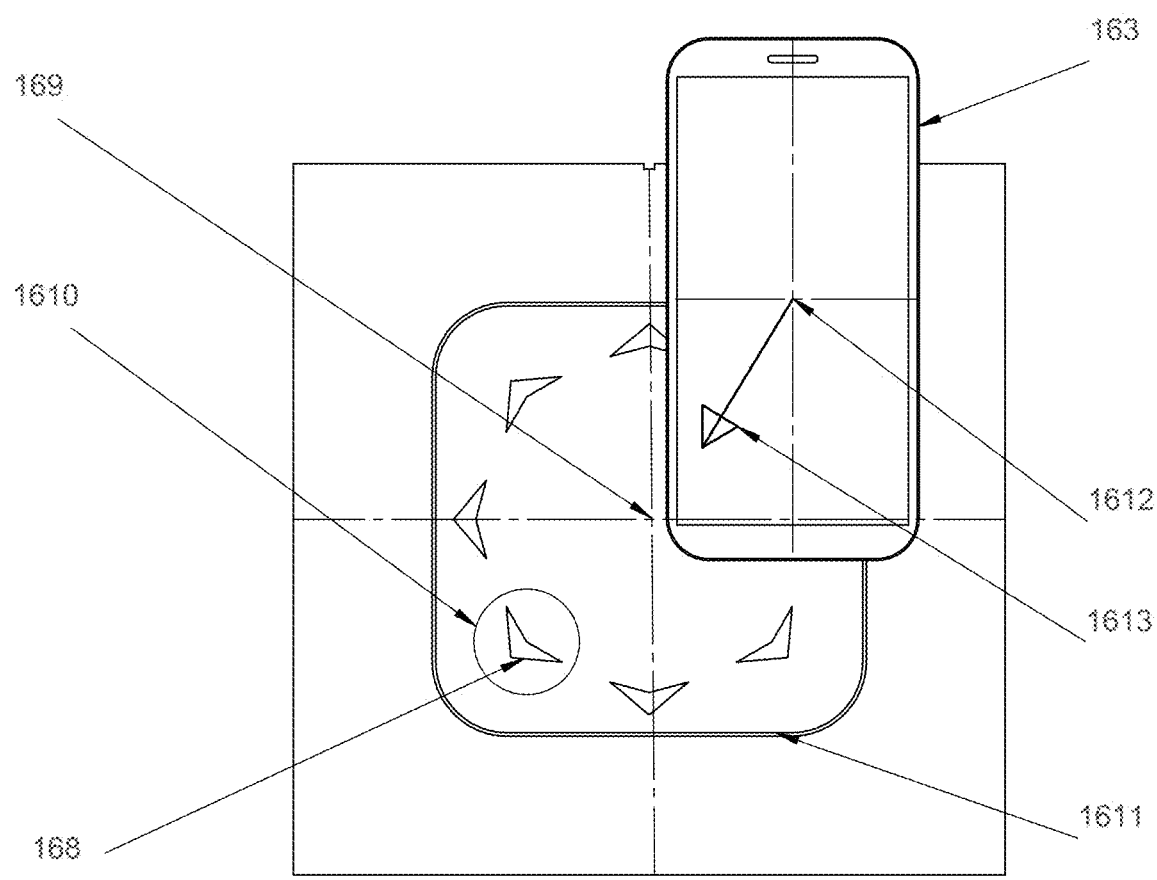
FIG. 65 shows a view illustrating a function of a positioning system, according to an embodiment of the present disclosure.
Figure 66:
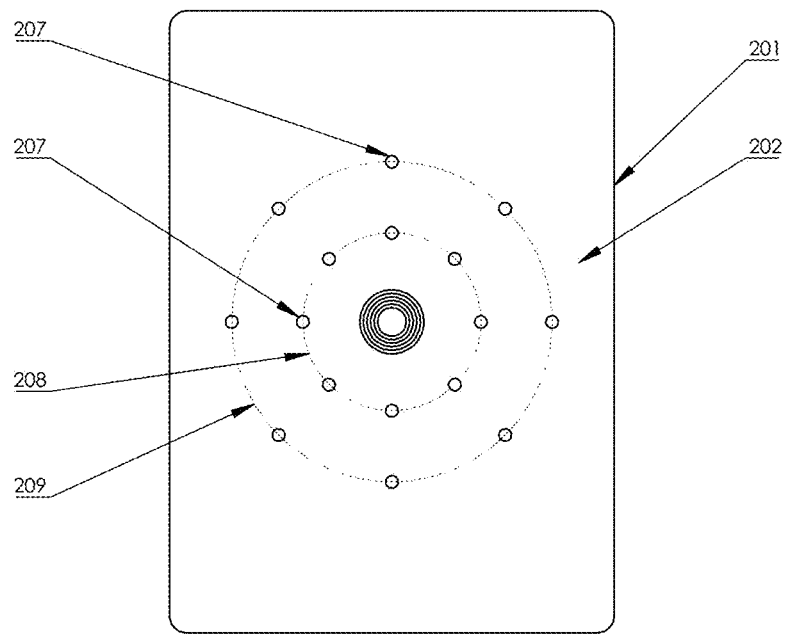
FIG. 66 shows a near navigation system for determining a position of a device, according to an embodiment of the present disclosure.
Figure 67:
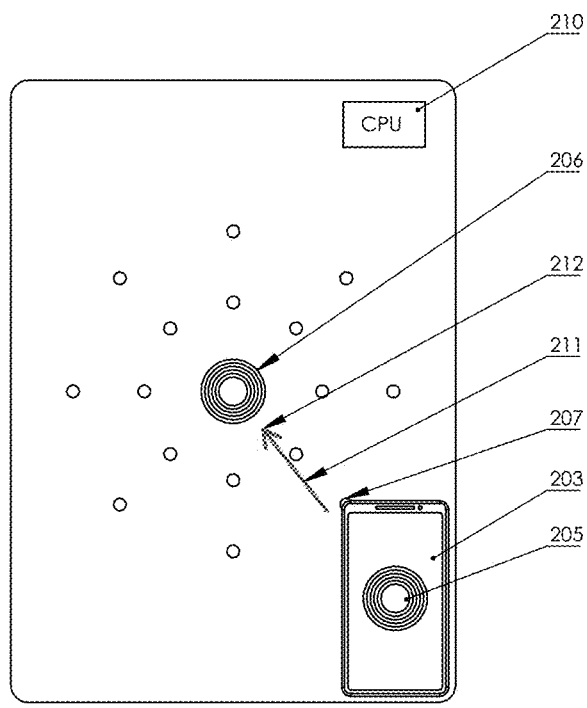
FIG. 67 shows a near navigation system for determining a position of a device, according to an embodiment of the present disclosure.
Figure 68:
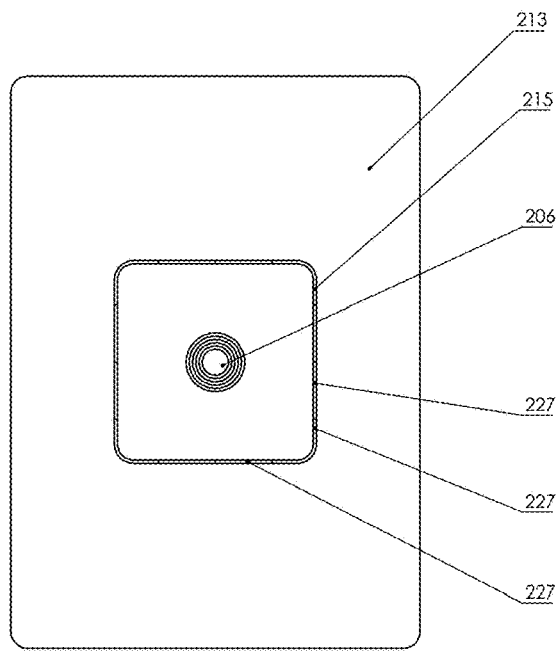
FIG. 68 shows a near navigation system for determining a position of a device, according to an embodiment of the present disclosure.
Figure 69:
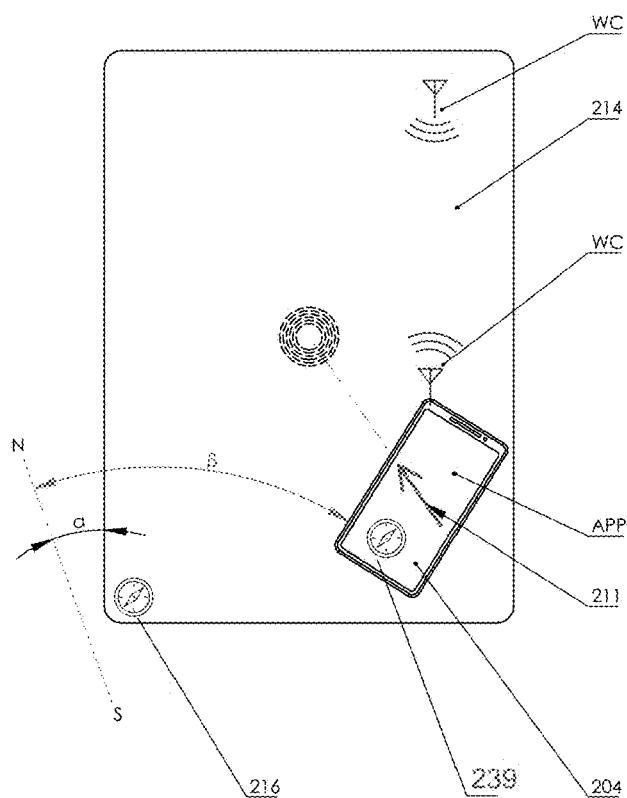
FIG. 69 shows a near navigation system for determining a position of a device, according to an embodiment of the present disclosure.
Figure 70:
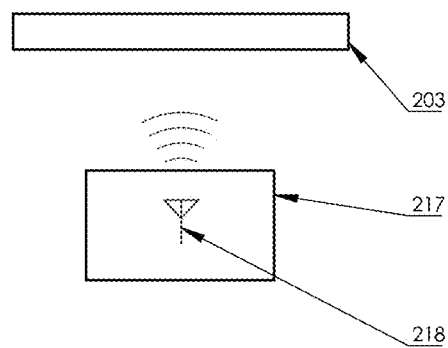
FIG. 70 shows a sensor of a near navigation system, according to an embodiment of the present disclosure.
Figure 71:
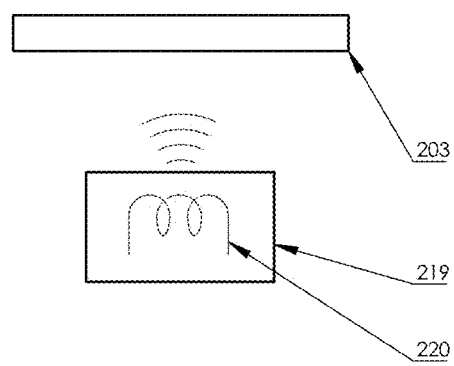
FIG. 71 shows a sensor of a near navigation system, according to an embodiment of the present disclosure.
Figure 72:
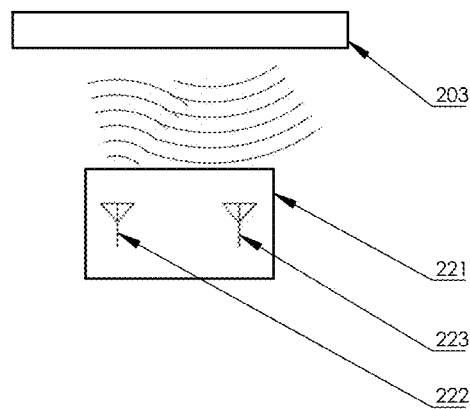
FIG. 72 shows a sensor of a near navigation system, according to an embodiment of the present disclosure.
Figure 73:
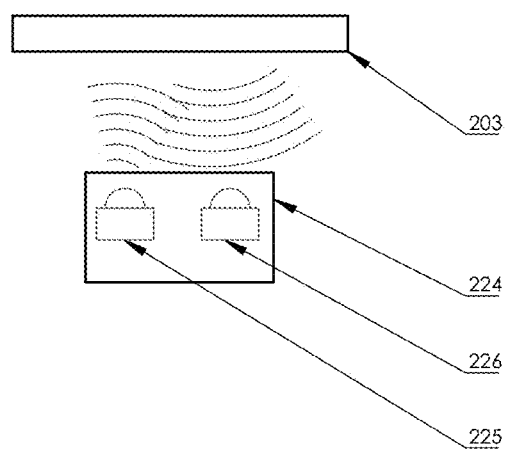
FIG. 73 shows a sensor of a near navigation system, according to an embodiment of the present disclosure.

FIG. 61 shows a perspective view of a charging system performing charging through a furniture panel and a transparent decorative element, according to an embodiment of the present disclosure. FIG. 62 shows an exploded perspective view of a charging system with a charging module, according to an embodiment of the present disclosure. FIG. 63 shows an exploded perspective view of a loading system with a loading module shown, according to an embodiment of the present disclosure. FIG. 64 shows a perspective view of a charging system performing charging through a furniture panel and a transparent decorative element, according to an embodiment of the present disclosure. FIG. 65 shows a view illustrating a function of a positioning system, according to an embodiment of the present disclosure.

Referring to FIGS. 61-65, a charging system may include of a furniture board 161 (e.g., a non-transparent, wooden, and/or solid board) that provides a charging and mounting location for the charging module 162 (e.g., a portable wireless communication device). In addition, the board 161 may include an additional central flat element 161a that is transparent and may allow visible light and/or infrared radiation to visibly pass through a surface thereof. In other words, the furniture board 161 may not be transparent (e.g., the furniture board 161 may be made of wood), and the central flat element 161a may be transparent (e.g., the central flat element 161a may be made of a clear plastic material). The charging module 162 may be mounted (e.g., positioned) on the bottom of the board 1 and/or flat element 161a and equipped with an energy transmitter 164 (e.g., an induction coil for transmitting wireless power) and a matrix 166 of position sensors 165. The position sensors 165 may be arranged in a predetermined pattern such that each position sensor 165 is spaced apart from each other position sensor 165 by a specified distance. In response to the board 161 and/or flat element 161a being transparent, visible light, infrared radiation, or other wireless transmission signals may be transmitted through the board 161. That is, the board 161 and/or flat element 161a may include a transparent surface and display information through the transparent surface.

The wireless energy transmitter and wireless energy receiver most efficiently operate when placed at an ideal orientation at a center 169 of the transmitter (e.g., the board 161) and a center 1612 of the receiving device 163. The correct arrangement of the above-mentioned system elements is possible without necessarily installing a smartphone application in the receiving device 163. Rather, a display may be included in the board 161 and/or flat element 161a to display suggestions (e.g., direction arrows that suggest a movement and/or point towards the center 169) 168 of the movement 1613 in relation to the board 161.

The display of the board 161 and/or flat element 161a may display a position correction icon 1610 (e.g., a direction arrow that is illuminated or highlighted) when an energy receiver included in the device 163 is positioned within a predetermined distance along the surface of the board 161 in relation to the transmitter 164. For example, if the device 163 moves 1613 in a direction towards the center 169 of the board 161, and a horizontal distance from the transmitter 164 to the device 163 is less than a predetermined number (e.g., 5 centimeters), then the board 161 and/or flat element 161a may display the position correction icon 1610 indicating a direction towards the center 169. Additionally or alternatively, the board 161 and/or flat element 161a may project light signals from a light ring 1611 on the surface of the board 161 and/or flat element 161a.

According to an embodiment, a wireless charging navigation system is disclosed that aims to enhance the charging experience by determining the optimal alignment (orientation) of a mobile device with a charging coil on a charger panel, thereby achieving efficient wireless charging.

FIGS. 66-69 show near navigation systems for determining a position of a device, according to embodiments of the present disclosure.

Referring to FIGS. 66-69, the charger 201 features a usable surface 202 (e.g., a surface for wireless charging) where the user places the device 203 (e.g., a mobile device, tablet, computer, or other electronic device capable of wireless charging) for charging. The device 203 includes a display screen 204 and a receiving coil 205 that operate in conjunction with the transmitting coil 206 in the charger to enable wireless charging.

The near navigation system identifies the position of the device 203 using parameters determined based on the receiving coil 205 in relation to the transmitting coil 206 of the charger. The near navigation system may, therefore, provide information to assist a user to position the device 203 in a predetermined area based on the identified position. Precisely positioning the coils 205 and 206 maximizes charging efficiency and minimizes energy losses. Additionally, the near navigation system also determines the position of the device 203 in relation to an ideal charging position in the predetermined area when using a charger with a non-transparent usable surface 202.

The near navigation system comprises various sensors 207 arranged on the surface 202, including capacitive, inductive, radio, optical (visible light), and infrared sensors. These sensors are organized into two circles: a smaller circle 208 and a larger circle 209. Both circles have sensors placed at equal angular distances, ensuring omnidirectional functionality.

Once the device 203 approaches a sensor, the sensor detects its presence and undergoes a state change (e.g., switching from an inactive state to an active state). A programmed CPU microprocessor 210 analyzes the activated sensors, constructs a map of the device's location on the plane where the wireless charging transmitting coil 206 is located, and calculates the displacement vector 211 relative to the charger's transmitting coil 206. The displacement vector 211 is a parameter that provides a direction (e.g., an angle) and a distance (e.g., a length) of the device 203 (or the receiving coil 205 of the device 203) relative to the transmitting coil 206. In this manner, the displacement vector 211 "points to" the area considered to be the ideal charging position. Calculation of the displacement vector 211 occurs in real-time, multiple times per second, to provide up-to-date and actionable information for further processing.

The resulting displacement vector 211 is utilized to generate visual, audible, or other forms of feedback on a user interface. This feedback informs the user about the necessary direction 212 in which to move the device 203 for achieving the optimal alignment of the wireless charging system's coils 205 and 206.

Depending on the material properties of the charger's surface, two types of planes can be distinguished: transparent planes 213 (e.g., a transparent surface) and non-transparent planes 214 (e.g., a non-transparent surface).

In the case of the charger's surface including transparent planes 213, the feedback about the displacement vector 211 is presented through a segmented circumferentially illuminated indicator 215 (e.g., a charger indicator light) located centrally along the main axis of the wireless charging transmitting coil 206. The segments 227 of the indicator 215 are selectively lit by the microprocessor circuit 210 to provide clear guidance on the required direction of movement for the device 203.

In the case of non-transparent planes 214, the screen 204 of the device 203 itself serves as the medium for displaying the displacement vector 211. Utilizing one or more transceivers for wireless communication WC, the displacement vector 211 is transmitted from the navigation system to the device 203, where it is displayed through an application APP on the device's screen 204, offering clear instructions to the user regarding the required direction and/or distance for moving the device 203 to the optimal charging position.

In addition, the navigation system incorporates an earth's magnetic field sensor 216, for determining the magnetic inclination angle $\alpha$ (e.g., an inclination of the charging system) and the relative direction of the navigation system's position vector with respect to the device 203, which also includes a built-in earth magnetic field sensor 239. By considering the inclination angle $\beta$ (e.g., an inclination between field vectors) between the magnetic field vectors, the navigation system corrects the displacement vector 211 to provide accurate information about the spatial relationship between the two systems (e.g., the coils 205 and 206). For example, the direction of the displacement vector 211 may be corrected based on an angle between the charging panel and the device 203, as shown in Equation 1, below.

$$\text{angle between charging panel and device} = \text{inclination angle } \beta - \text{inclination angle } \alpha \quad \text{Equation 1}$$

In more detail, the present application relates to a near navigation system that utilizes a variety of sensors to accurately determine the position of a device 203 within a given space. The system may include two or more distinct groups of sensors, each tailored to different types of surfaces and operating principles (e.g., capacitive sensors, inductive sensors, optical sensors, sensors for transparent surfaces and/or for non-transparent surfaces).

FIGS. 70-73 show sensors of a near navigation system, according to various embodiments of the present disclosure.

Referring to FIGS. 70-73, a first group of sensors utilizes the phenomena of capacitance and inductance changes, as well as wave detection around radio antennas, to enable precise positioning. For example, capacitive sensors 217 are employed during system startup to measure the capacitance of an antenna 218 (e.g., a capacitive sensor antenna). A capacitance measured with the capacitive sensors 217 is stored as a reference value in the system memory. When a device 203 is moved into a position that modifies the capacitance of the antenna, the computing system analyzes the capacitance difference between the real-time measurement and the stored reference value. Based on a predetermined minimum repeatable difference (e.g., a difference between the real-time (variable) measurement and the stored (constant) reference value), the system determines an output signal as a logical 0 or 1.

Inductive sensors 219 operate based on changes in the inductance around a magnetic element 220. Similar to the capacitive sensors 217, the inductance of the magnetic element 220 is measured and stored as a reference value during system startup. When a device 203 is moved into a position that alters the inductance, the computing system compares the real-time inductance measurement with the stored reference value. Based on a predetermined minimum repeatable difference, the system determines an output signal as a logical 0 or 1.

Radio sensors 221 may also be employed and utilize electromagnetic waves with millimeter wavelengths (e.g., frequencies above 70 gigahertz (GHz)). Radio sensors 221 include at least one transmitting antenna 222 and at least one receiving antenna (designated as 223). The transmitting antenna 222 emits a signal at a specific frequency, and the direction and nature of the radiation are determined by the antenna's construction. When a device 203 enters the operating range of the transmitted beam (e.g., an area in which the device 203 may receive and perform a designated function based on the transmitted beam), the device reflects the electromagnetic wave, which is subsequently received by the system's receiving antenna 223. The computing system performs calculations to determine a distance between the tested object (e.g., the device 203) and the antennas 222 and/or 223.

The second group of sensors may include optical sensors 224, which rely on the reflection of waves in the visible and infrared light range. These sensors are specifically designed to work with surfaces transparent to visible and infrared light waves. A light emitter 225 may emit a beam of light in a predetermined direction with specific characteristics, while a light detector 226 captures a reflected light beam. By analyzing the strength of the reflected light beam or a phase shift of the reflected light beam with respect to the transmitted light beam within the visible or infrared range, the computing system may accurately determine the distance between the object and the emitter.

Accordingly, the near navigation system described herein incorporates capacitive, inductive, radio, and optical sensors to enable precise positioning of mobile devices in various environments. The system's ability to adapt to different surface types and leverage different sensing principles ensures accurate and reliable near navigation capabilities.

Figure 74:
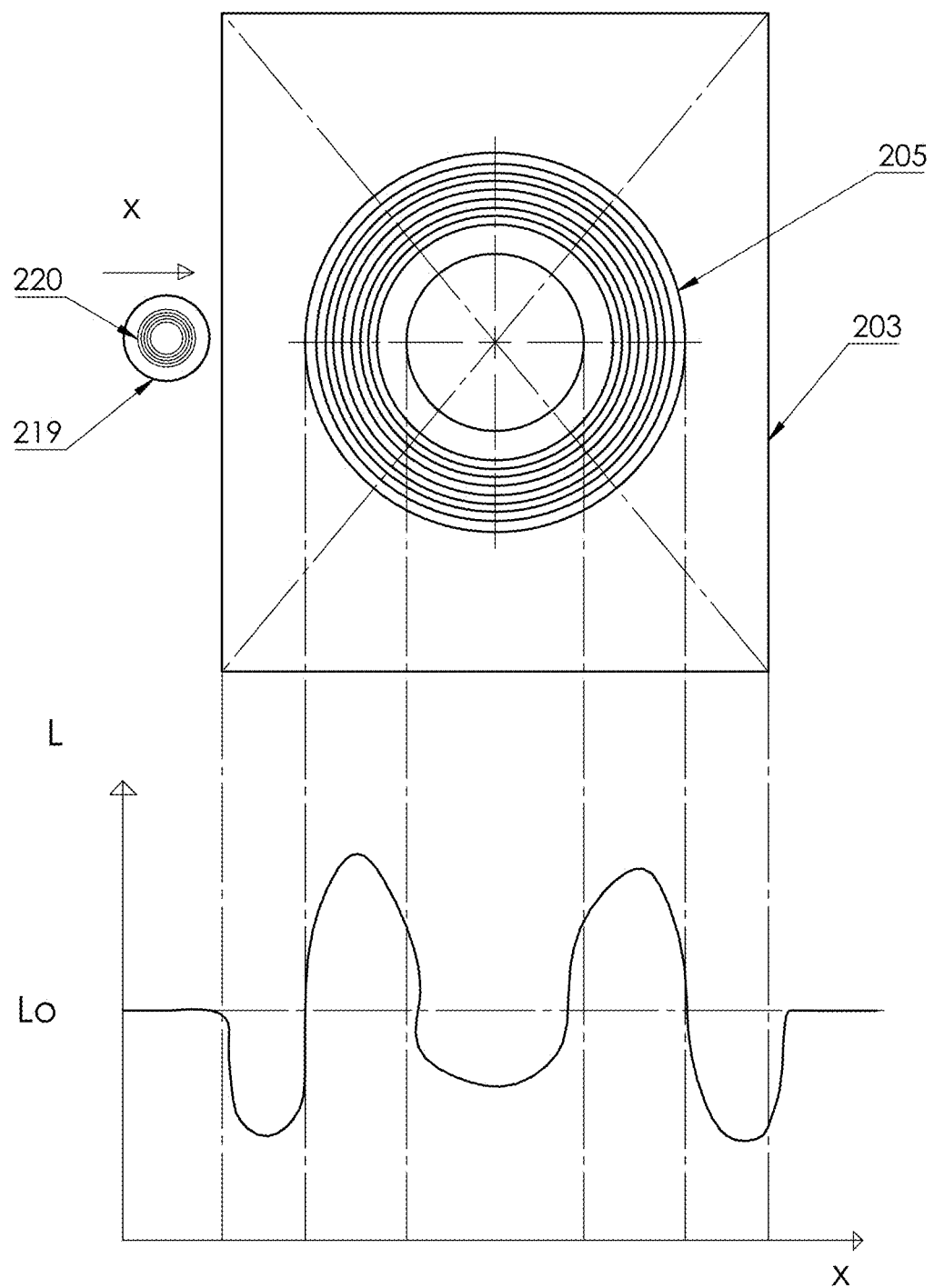
FIG. 74 shows an inductive sensor, according to an embodiment of the present disclosure.

FIG. 74 shows an inductive sensor, according to an embodiment of the present disclosure.

Referring to FIG. 74, the sensor 219 may be used to determine the position of the receiving coil 205, not the device 203 (e.g., an electronic device or mobile device) itself. The device 203 is equipped with a built-in wireless charging receiving coil 205. However, simpler circuits, for example, that analyze the mobile device's contour in relation to the transmitting coil 206 may lack the necessary precision to achieve efficient wireless charging. To address this, a specialized inductive sensor 219 is employed in the near navigation system to accurately detect the position of the receiving coil 205.

To accomplish accurate detection of the receiving coil 205, the inductive sensor 219 may be slid along the underside of the device 203, allowing it to detect changes in inductance using its own inductive sensor coil 220 (including a magnetic element). When the sensor 219 is moved over an area of the device's 203 housing where there is no receiving coil 205 present (e.g., a position in which there is no receiving coil 205 present above or below the sensor 219), the inductance readings (L) decrease compared to a reference level labeled as "Lo." Conversely, as the inductive sensor coil 219 is glided close to (e.g., above or below a position in which there is a receiving coil 205 present) the windings of the wireless charging receiving coil 205, the inductance readings (L) rise and surpass the "Lo" reference value. This behavior of inductance variations may be utilized to accurately determine the precise position of the built-in receiving coil 205, regardless of the shape or contour of the device 203.

The user interface of the device 203, e.g., a smartphone, integrates advanced graphical capabilities through the installed application APP to visually guide the user towards the ideal charging position based on the device's displacement vector 211. The user may receive graphical notifications via pointers, described below.

FIGS. 75-79 show different types of pointers of a near navigation system, according to various embodiments of the present disclosure.

Figure 75:
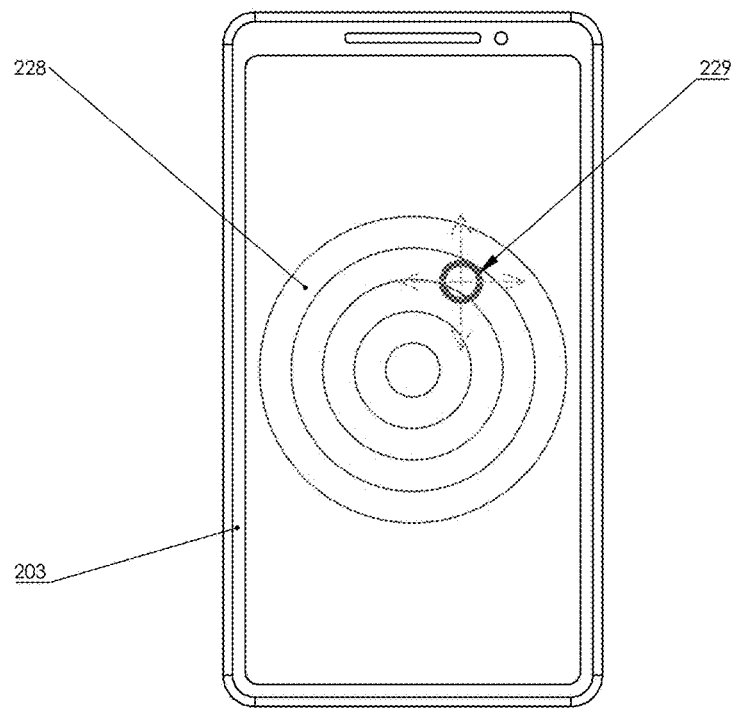
FIG. 75 shows a pointer of a near navigation system, according to an embodiment of the present disclosure.

FIG. 75 shows a pointer of a near navigation system, according to an embodiment of the present disclosure.

Referring to FIG. 75, an eye level pointer is illustrated. A fixed grid 228 comprised of numerous circles with varying diameters and a shared center serves as a map element that indicates shift directions, such as up-down and left-right. A mobile pointer 229, in the form of a circle imitating a particle of air in water, is present on this map's surface. The mobile pointer 229 moves across the map in tandem with the movements of the device 203 on the usable surface 202 of the charger 201. The motion of the mobile pointer 229 indicates the suggested direction for moving the device 203 to an ideal charging location (e.g., towards a charging coil).

During a final positioning phase of the device 203 in near navigation, when the transmitting coil 206 and receiving coil 205 overlap but aren't precisely aligned, the wireless charging process may be initiated, albeit with reduced efficiency. At this stage, the user may be informed through auditory, visual, or alternative means that the wireless charging process has commenced but with low efficiency. Thus, the device 203 may output a sound or graphic after wireless charging has commenced with a voltage and/or amplitude that is below a predefined threshold (e.g., charging efficiency is below a predefined threshold).

The additional end navigation feature enables precise alignment of the device 203 so that the transmitting coil 206 and receiving coil 205 are perfectly matched, resulting in optimal charging efficiency. The attainment of this ideal coil positioning is signified by a distinct sound, visual cue, or other means that differentiates it from an earlier notification, allowing the user to discern the different processes. In other words, a first sound or graphic may be output after wireless charging has commenced with a voltage and/or amplitude that is below a predefined threshold (e.g., charging efficiency is below a predefined threshold, and a second sound or graphic may be output when an ideal position of the device 203 is achieved (e.g., when a voltage, amplitude, and/or charging efficiency is equal to or greater than a predefined threshold). As illustrated in FIG. 10, the mobile pointer 229 may change color in accordance with the navigation phase it is in.

Figure 76:
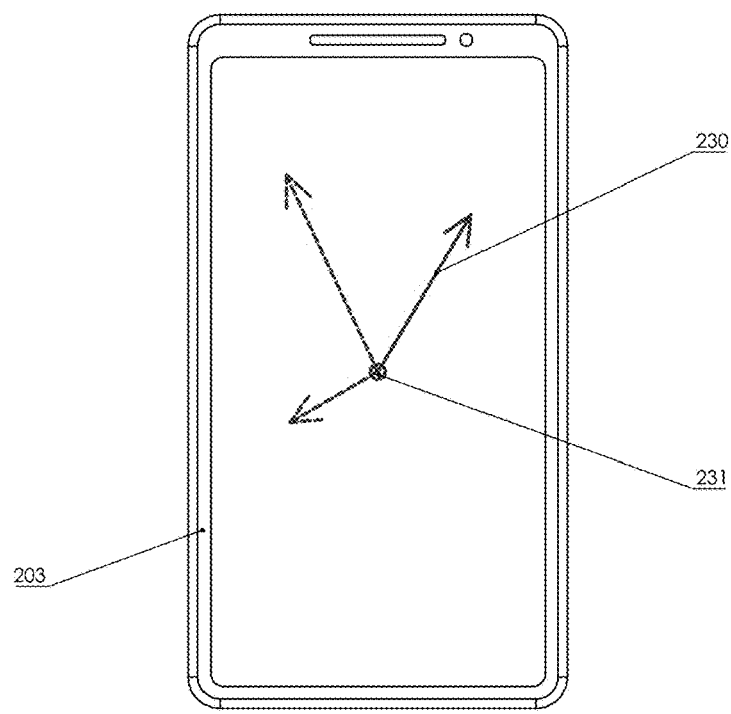
FIG. 76 shows a pointer of a near navigation system, according to an embodiment of the present disclosure.

FIG. 76 shows a pointer of a near navigation system, according to an embodiment of the present disclosure.

Referring to FIG. 76, an arrow-vector pointer is illustrated. A vector pointer 230 is anchored at a stationary point 231 in the middle of the application screen. The length and direction of the vector pointer 230 may dynamically evolve, mirroring the movements of the device 203 on the usable surface 202 of the charger 201. The varying length and direction of the vector pointer 230 indicate the recommended movement direction for the device 203 during the charging process.

Figure 77:
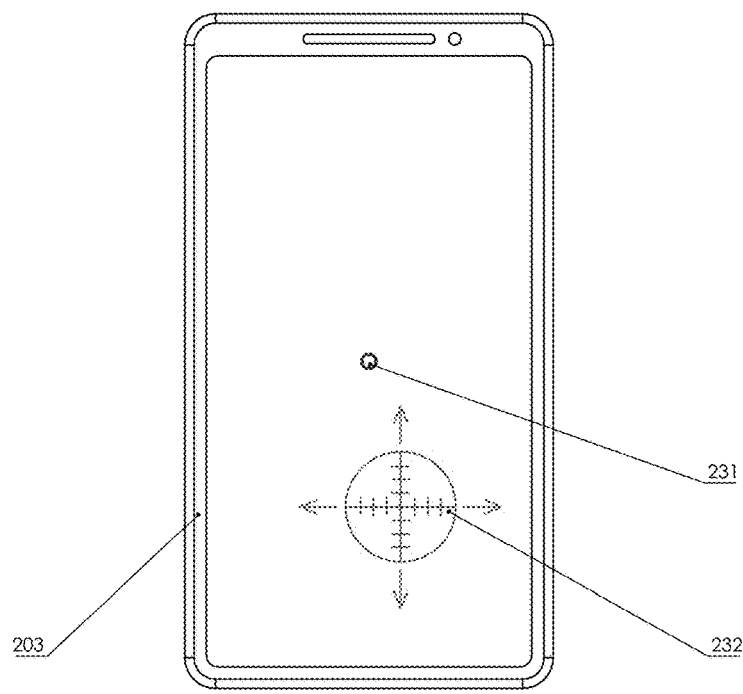
FIG. 77 shows a pointer of a near navigation system, according to an embodiment of the present disclosure.

FIG. 77 shows a pointer of a near navigation system, according to an embodiment of the present disclosure.

Referring to FIG. 77, a reticle type indicator is illustrated. More particularly, a fixed point 231 is shown on the application screen. The reticle pointer 232, functioning as a dynamic component within an application, exhibits time-dependent movements that are intricately tied to the motions of the device 203 on the usable surface 202 of the charger 201. By observing the distance and direction of the crosshair's center from the fixed point, the intended movement direction for the charging device 203 is indicated.

Figure 78:
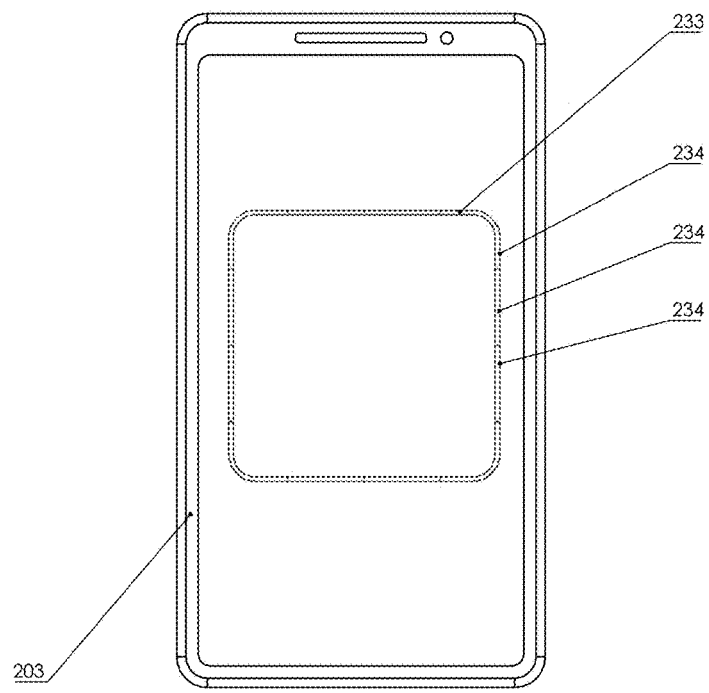
FIG. 78 shows a pointer of a near navigation system, according to an embodiment of the present disclosure.

FIG. 78 shows a pointer of a near navigation system, according to an embodiment of the present disclosure.

Referring to FIG. 78, a segment pointer is illustrated. More specifically, the application screen displays a centrally positioned segmented luminous pointer 233 (e.g., a mobile device pointer) along its axis. One or more edges of the segmented luminous pointer 233 are parallel to one or more edges of the device 203. This luminous pointer 233 is divided into equally spaced segments 234 encircling its circumference. These segments 234 are actively and distinctly illuminated by the microprocessor 210, following a characteristic pattern. Their illumination provides the user with valuable information regarding the recommended movement direction for the device 203 being charged.

Figure 79:
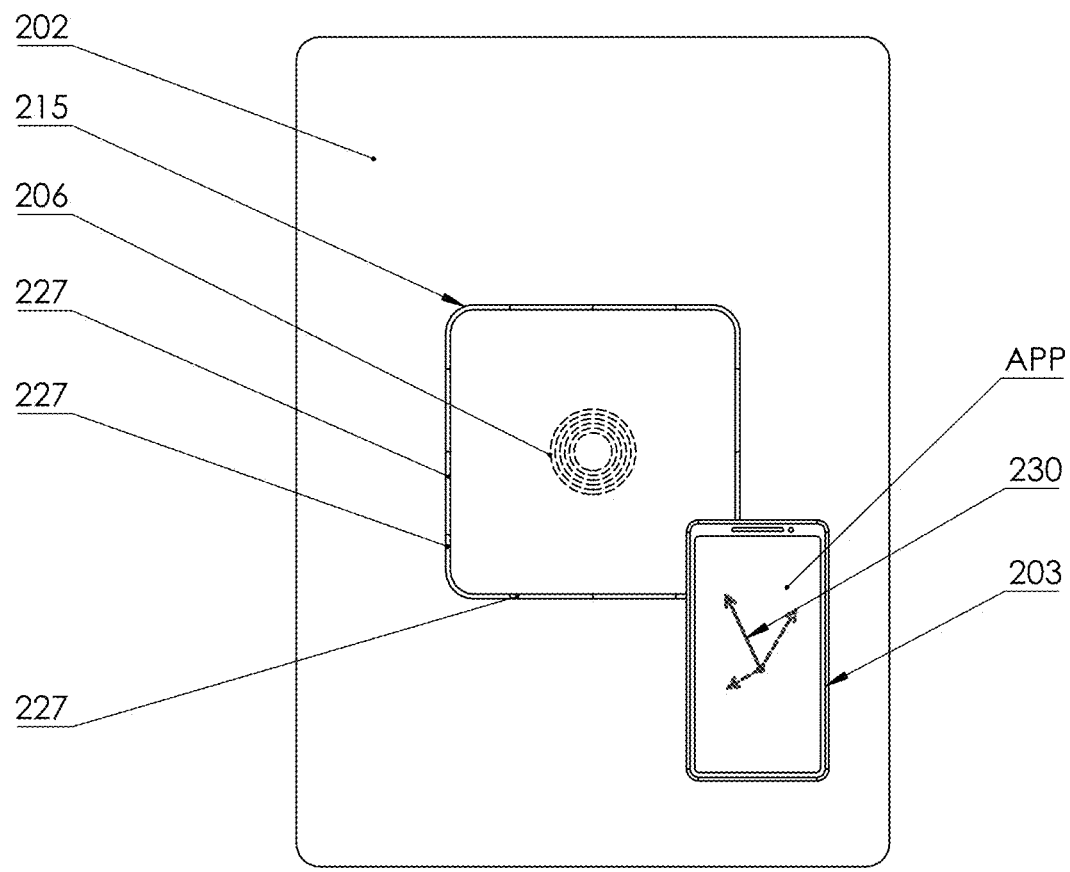
FIG. 79 shows a pointer of a near navigation system, according to an embodiment of the present disclosure.

FIG. 79 shows a pointer of a near navigation system, according to an embodiment of the present disclosure.

Referring to FIG. 79, a hybrid pointer is illustrated. When employing a transparent usable surface, navigation information can be presented in two or more different types of display methods.

A first method involves utilizing a segmented light indicator 215, positioned centrally along the main axis of the wireless charging transmit coil 206 on the charger's usable surface 202 (e.g., a surface that may be used for wireless charging). This luminous indicator 215 is divided into equal segments 227 of the luminous indicator 215 along its circumference. These segments 227 are activated and illuminated in a characteristic manner by the microprocessor circuit 210, which communicates precise information to the user regarding the movement direction for the device 203 necessary to improve charging efficiency.

A second method entails simultaneously displaying the indicator 215 on the charger's usable surface 202 and displaying any of the aforementioned pointers (eye level, vector arrow, reticle, or segments) on the screen of a mobile device (such as a smartphone) through the installed controlling application APP. This allows for simultaneous presentation of navigational information on the charger's usable surface 202 and on the device 203. By employing this parallel and simultaneous approach, the functionality becomes more flexible, enabling enhanced utilization of the navigation features.

Figure 80:
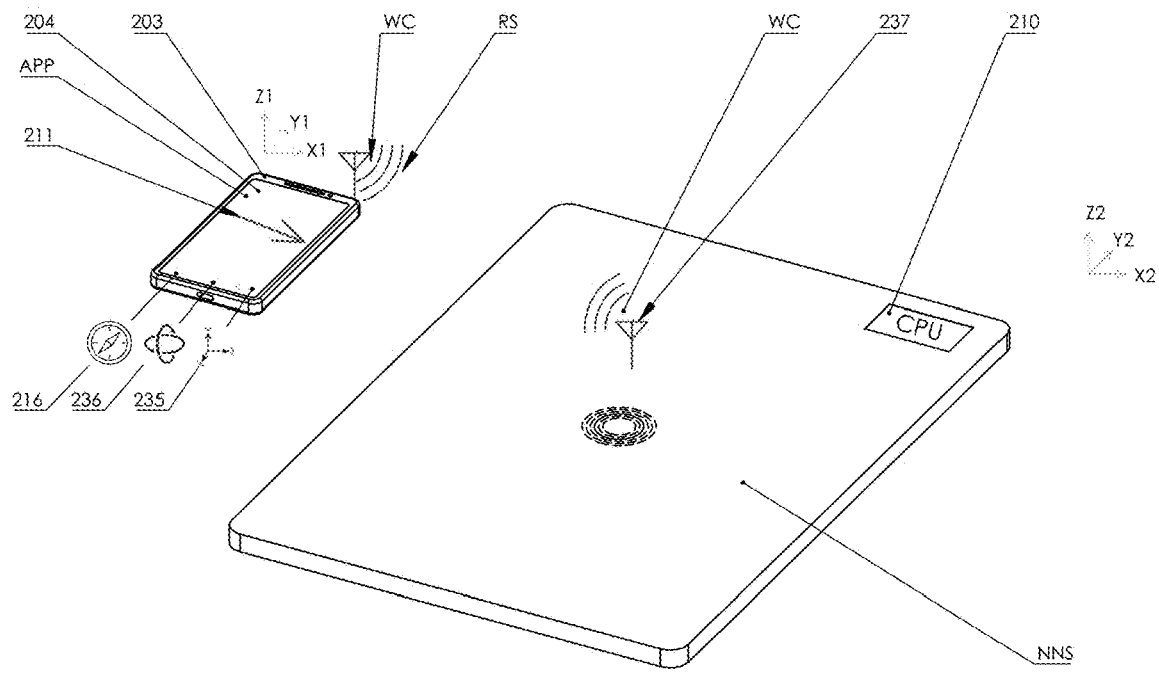
FIG. 80 shows a far navigation system for determining a position of a device, according to an embodiment of the present disclosure.
Figure 81:
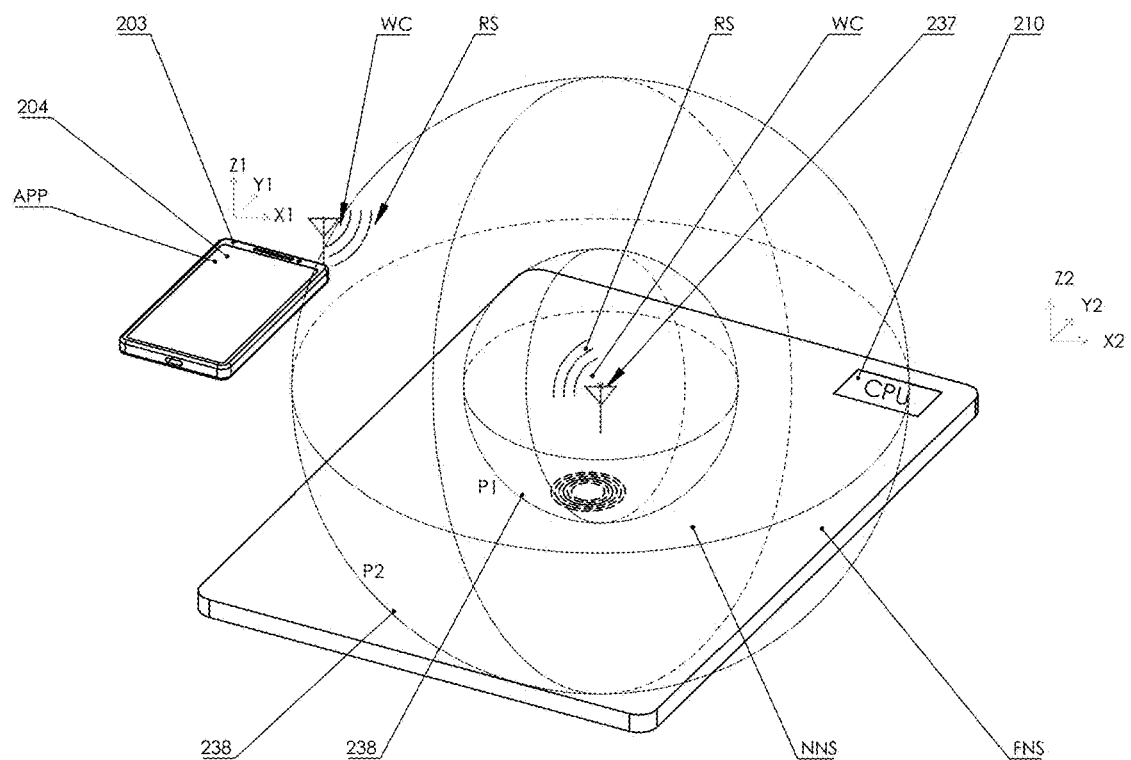
FIG. 81 shows a far navigation system for determining a position of a device, according to an embodiment of the present disclosure.

FIGS. 80-81 show far navigation systems for determining a position of a device, according to various embodiments of the present disclosure.

Referring to FIGS. 80-81, the position of a mobile device relative to a charging transmitter may be determined.

A far navigation system (FNS) is designed to provide an approximate determination of the near navigation system (NNS) location within a functional space. By utilizing radio communication and the properties of electromagnetic waves, such as wave propagation and phase shifts, the FNS enables long-distance navigation.

Once the FNS establishes radio communication with the device 203, such as a smartphone, it continuously measures the strength of the radio signal RS in real-time. Concurrently, the FNS collects data from the mobile device's 203 built-in sensors, including the earth's magnetic field sensor 216, accelerometer 235, and gyroscope 236. By utilizing the programmed microprocessor system 210, the FNS calculates the mobile device's 203 position relative to the antenna 237 of the long-range navigation radio system in three-dimensional space using the collected data.

The desired displacement vector 211 is transmitted between the far navigation system and the mobile device via wireless communication WC. The mobile device's screen 204 serves as the medium for displaying the displacement vector information. The displacement vector 211 is displayed by the installed application APP on the device's screen 204, providing a clear indication to the user regarding the intended movement direction of the device 203.

By utilizing the FNS, the user is informed of the direction in which to move the device 203 to obtain information about the location of the NNS. Once the NNS is located, the NNS takes over the navigation tasks automatically, providing precise commands to the user regarding the accurate positioning for charging mobile device. Accordingly, the FNS may automatically deactivate when the NNS is activated.

A simplified variant of the long-distance navigation system involves calculating information for the user interface solely based on the strength of the radio signal RS. In this simplified approach, the system constructs a spherical signal strength map 238. The signal strength map 238 is displayed on the mobile device's screen 204 via the installed application APP, providing clear information to the user about the approximate distance to the NNS antenna 237. This enables the user to assess whether their current motion brings the device 203 closer or farther away from the central part of the NNS. Additionally, the simplified system relies on the user's intuitive behavior to locate the radio signal RS with the highest amplitude, thereby determining the precise position of the NNS within the functional space.

Figure 82:
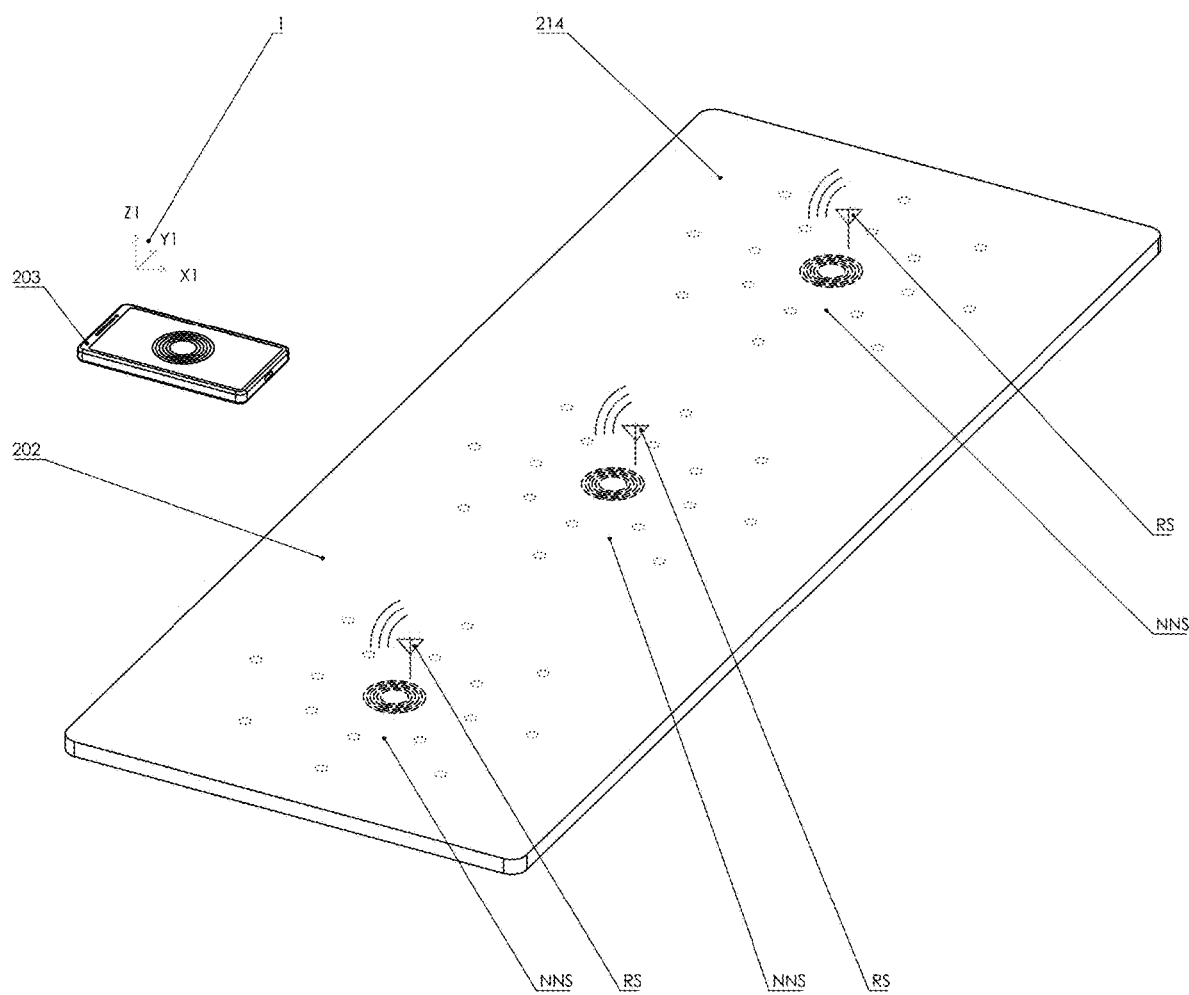
FIG. 82 shows a navigation system in which two or more navigation systems are used, according to an embodiment of the present disclosure.

FIG. 82 shows a navigation system in which two or more navigation systems are used, according to an embodiment of the present disclosure.

Referring to FIG. 82, three wireless charging systems are illustrated on one surface of the charger. More or less wireless charging systems may be employed.

In a large functional space, the installation of multiple navigation systems with wireless charging may be necessary. It is possible to have multiple charging systems situated within a single usable area 202, which are not visibly apparent on the non-transparent surface 214. In such scenarios, the user is informed through the installed device 203 application APP about the presence of additional navigation systems equipped with wireless charging functionality. The user can then choose the system that suits their needs at that moment.

When there are multiple radio signal RS sources available, triangulating the signals enables a more precise determination of the mobile device's position in space. The FNSs engage in communication with each other and with the device 203. Through an intra-system negotiation process, the negotiation function identifies the main unit with the highest operational priority (e.g., the transmitting coil with the highest operational priority that will most efficiently provide charging). This main unit can be any navigation system or application installed on the mobile device. As a result of these operations, the selected main unit receives data from individual external systems, performs navigation calculations, and provides feedback to the application APP installed on the device 203.

Figure 83:
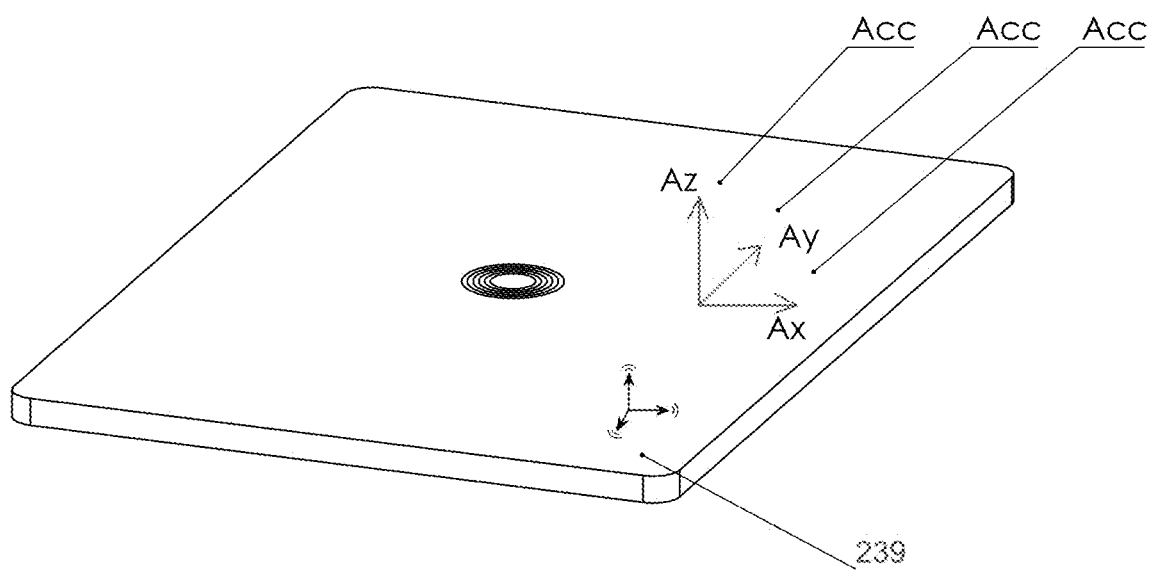
FIG. 83 shows a charging system in which functions are controlled by making the surface vibrate, according to an embodiment of the present disclosure.

FIG. 83 shows a charging system in which functions are controlled by making the surface vibrate, according to an embodiment of the present disclosure.

Referring to FIG. 83, the wireless charging navigation system includes a built-in accelerometer 239. The operating system functions gather acceleration values Acc from the accelerometer, capturing movement parameters in three-dimensional space. These acceleration values, along with their variations in different directions, determine the activation of specific additional functions controlled by changes in the acceleration experienced by the navigation system.

The described operational principle effectively expands the number of virtual buttons, denoted as Ax, Ay, Az, within the device. Due to the combinational nature of the generated acceleration changes over time, the number of different combinations of virtual buttons becomes virtually limitless in number. These virtual buttons, namely Ax, Ay, and Az, are utilized to control various functions, such as adjusting brightness, activating or deactivating red green blue white (RGBW) lighting, and other related operations. The changes in acceleration may be induced by user behavior, such as tapping, touching, or shifting the usable surface 202 of the device in different axes and directions. These actions create identifiable vibrations that are detected by the accelerometer 239.

While the disclosure has been shown and described with reference to a certain preferred embodiment thereof, it will be understood by those skilled in the art that various changes in form and details may be made therein without departing from the spirit and scope of the disclosure.

The invention claimed is:

1. A wireless charging navigation system comprising:
  a charger panel comprising a usable surface and a transmitting coil, and
  an electronic device comprising a display screen, a receiving coil, and a processor,
  wherein the processor is configured to execute instructions for establishing a near navigation system that cause the electronic device to:
  determine, at least one of, a distance from the transmitting coil to the receiving coil or an angle between the transmitting coil and the receiving coil, and output a notification based on the distance from the transmitting coil to the receiving coil or the angle between the transmitting coil and the receiving coil,
wherein the electronic device further comprises a first magnetic field sensor for determining the angle or direction with respect to a second magnetic field sensor embedded in the charger panel.

2. The wireless charging navigation system of claim 1, wherein the processor is further configured to output the notification on the display screen, and
wherein the notification on the display screen comprises an object indicating a direction or distance.

3. The wireless charging navigation system of claim 1, further comprising an inductive sensor comprising an inductive sensor coil configured to detect changes in inductance as the inductive sensor is moved towards or away from the receiving coil,
wherein the at least one of the distance from the transmitting coil to the receiving coil or the angle between the transmitting coil and the receiving coil is determined based on the changes detected in the inductance.

4. The wireless charging navigation system of claim 1, wherein the processor is further configured to:
determine whether the electronic device is positioned in a charging area after the notification is output, and
output an additional notification when it is determined that the electronic device is positioned in the charging area.

5. The wireless charging navigation system of claim 1, wherein the processor is further configured to execute instructions for establishing a far navigation system that cause the electronic device to:
establish communication with the electronic device using radio signals,
collect position data by continuously measuring the strength of the radio signals in real-time, and
determine a position of the electronic device in a three dimensional space using the position data.

6. The wireless charging navigation system of claim 5, wherein the processor is further configured to:
display a displacement vector on the display screen indicating a direction in which to move the electronic device to obtain information about a location of the near navigation system, and
once the near navigation system is located, automatically transfer navigation tasks from the far navigation system to the near navigation system and provide commands to a user regarding an accurate position of the electronic device.

7. The wireless charging navigation system of claim 1, wherein the processor is further configured to:
in response to the usable surface of the charger panel comprising a transparent usable surface, output the notification on the display screen while additional navigation information is simultaneously output through the transparent usable surface.

8. The wireless charging navigation system of claim 1, wherein the charger panel further comprises a plurality of sensors arranged on a surface of the charger panel,
wherein at least one of the plurality of sensors is configured to detect a presence of the electronic device.

9. A method for operating a wireless charging navigation system comprising a charger panel having a usable surface and a transmitting coil and an electronic device having a display screen, a receiving coil, and a processor, wherein the method is performed by the electronic device to establish a near navigation system and comprises:
determining at least one of a distance from the transmitting coil to the receiving coil or an angle between the transmitting coil and the receiving coil,
outputting a notification based on the determined distance from the transmitting coil to the receiving coil or the angle between the transmitting coil and the receiving coil, and
determining the angle or direction with respect to a magnetic field sensor embedded in the charger panel.

10. The method of claim 9, further comprising:
outputting the notification on the display screen of the electronic device,
wherein the notification on the display screen comprises an object indicating a direction or distance.

11. The method of claim 9, further comprising:
detecting changes in inductance as an inductive sensor comprising an inductive coil is moved towards or away from the receiving coil,
wherein the at least one of the distance from the transmitting coil to the receiving coil or the angle between the transmitting coil and the receiving coil is determined based on the changes detected in the inductance.

12. The method of claim 9, further comprising:
determining whether the electronic device is positioned in a charging area after the notification is output, and
outputting an additional notification when it is determined that the electronic device is positioned in the charging area.

13. The method of claim 9, further comprising, establishing a far navigation system by:
establishing communication with the electronic device using radio signals,
collecting position data by continuously measuring the strength of the radio signals in real-time, and
determining a position of the electronic device in a three-dimensional space using the collected position data.

14. The method of claim 13, further comprising:
displaying a displacement vector on the display screen of the electronic device indicating a direction in which to move the electronic device to obtain information about a location of the near navigation system, and
once the near navigation system is located, automatically transferring navigation tasks from the far navigation system to the near navigation system and providing commands to a user regarding an accurate position of the electronic device.

15. The method of claim 9, further comprising:
in response to the usable surface of the charger panel comprising a transparent usable surface, outputting the notification on the display screen while additional navigation information is simultaneously output through the transparent usable surface.

16. The method of claim 9, wherein determining the at least one of the distance from the transmitting coil to the receiving coil or the angle between the transmitting coil and the receiving coil comprises detecting a presence of the electronic device using at least one of a plurality of sensors arranged on a surface of the charger panel.

17. A wireless charging navigation system comprising:
an electronic device comprising a display screen and a receiving coil, and
a charger panel comprising a usable surface, a transmitting coil, and a processor,
wherein the processor is configured to execute instructions for establishing a near navigation system that causes the charger panel to:

determine at least one of a distance from the transmitting coil to the receiving coil or an angle between the transmitting coil and the receiving, output a notification based on the distance from the transmitting coil to the receiving coil or the angle between the transmitting coil and the receiving coil, and determine the angle or a direction with respect to a magnetic field sensor embedded in the charger panel.

18. The wireless charging navigation system of claim 17, wherein the charger panel further comprises an accelerometer configured to detect vibrations, and wherein the processor is further configured to control a function of the wireless charging navigation system based on one or more of the detected vibrations.

* * * * *